(12) United States Patent
Hensley et al.

(10) Patent No.: US 12,049,597 B2
(45) Date of Patent: Jul. 30, 2024

(54) HIGH OCTANE SYNTHETIC FUELS

(71) Applicant: Alliance for Sustainable Energy, LLC, Golden, CO (US)

(72) Inventors: Jesse Evan Hensley, Arvada, CO (US); Daniel Ruddy, Arvada, CO (US); Joshua A. Schaidle, Arvada, CO (US); Connor Patrick Nash, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 164 days.

(21) Appl. No.: 17/098,785

(22) Filed: Nov. 16, 2020

(65) Prior Publication Data

US 2021/0207048 A1 Jul. 8, 2021

Related U.S. Application Data

(60) Provisional application No. 62/935,692, filed on Nov. 15, 2019.

(51) Int. Cl.
*C10L 1/06* (2006.01)
*B01J 29/72* (2006.01)
*C10L 10/10* (2006.01)

(52) U.S. Cl.
CPC ............. *C10L 1/06* (2013.01); *B01J 29/7215* (2013.01); *C10L 10/10* (2013.01); *C10L 2200/0415* (2013.01); *C10L 2230/04* (2013.01)

(58) Field of Classification Search
CPC ... B01J 29/7215; B01J 29/7615; C10L 10/10; C10L 1/04; C10L 1/06; C10L 2200/0415; C10L 2230/04
See application file for complete search history.

(56) References Cited

U.S. PATENT DOCUMENTS

| 2,944,097 | A | * | 7/1960 | Starnes | ................. | C07C 5/2724 |
| | | | | | | 585/751 |
| 3,894,102 | A | | 7/1975 | Chang et al. | | |
| 4,481,305 | A | | 11/1984 | Jorn et al. | | |
| 4,520,216 | A | | 5/1985 | Skov et al. | | |
| 7,825,287 | B2 | | 11/2010 | Ahn et al. | | |
| 9,714,387 | B2 | | 7/2017 | Hensley et al. | | |

(Continued)

FOREIGN PATENT DOCUMENTS

WO 2012064844 A2 5/2012
WO WO-2012134484 A1 * 10/2012 .............. B01J 21/04

OTHER PUBLICATIONS

Ahn et al., "Selective Homologation Routes to 2,2,3-Trimethylbutane on Solid Acids", Angewandte Chemie—International Edition, May 11, 2009, vol. 48, No. 21, pp. 3814-3816.

(Continued)

*Primary Examiner* — Ellen M Mcavoy
*Assistant Examiner* — Chantel Graham
(74) *Attorney, Agent, or Firm* — Michael A. McIntyre

(57) ABSTRACT

The present disclosure relates to a mixture that includes a first portion that includes at least one of a paraffin and/or a naphthene having between 5 carbons and 13 carbons, inclusively, at a first concentration between about 75 wt % and about 99 wt %, and a second portion that includes hydrocarbons having greater than 13 carbons at a second concentration of less than 0.05 wt %.

17 Claims, 15 Drawing Sheets

(56) References Cited

U.S. PATENT DOCUMENTS

| | | |
|---|---|---|
| 9,796,931 B1 | 10/2017 | Hensley et al. |
| 9,803,142 B1 | 10/2017 | Hensley et al. |
| 2017/0306244 A1* | 10/2017 | Hensley ............... C07C 41/01 |

OTHER PUBLICATIONS

Camacho-Bunquin et al., "Single-site zinc on silica catalysts for propylene hydrogenation and propane dehydrogenation: Synthesis and reactivity evaluation using an integrated atomic layer deposition-catalysis instrument", Journal of Catalysis, Jan. 2017, vol. 345, pp. 170-182.

Farberow et al., "Exploring Low-Temperature Dehydrogenation at Ionic Cu Sites in Beta Zeolite To Enable Alkane Recycle in Dimethyl Ether Homologation", ACS Catalysis, Apr. 2017, vol. 7, No. 5, pp. 3662-3667.

Ghosh et al., "Development of a Detailed Gasoline Composition-Based Octane Model", 2006, Industrial & Engineering Chemistry Research, vol. 45, pp. 337-345.

Grim et al., "Growing the Bioeconomy through Catalysis: A Review of Recent Advancements in the Production of Fuels and Chemicals from Syngas-Derived Oxygenates", ACS Catalysis, Apr. 2019, vol. 9, No. 5, pp. 4145-4172.

Schaidle et al., "Conversion of Dimethyl Ether to 2,2,3-Trimethylbutane over a Cu/BEA Catalyst: Role of Cu Sites in Hydrogen Incorporation", ACS Catalysis, Feb. 2015, vol. 5, No. 3, pp. 1794-1803.

Schweitzer et al., "Propylene Hydrogenation and Propane Dehydrogenation by a Single-Site Zn2+ on Silica Catalyst", ACS Catalysis, Feb. 2014, vol. 4, No. 4, pp. 1091-1098.

Simonetti et al., "Catalytic Co-Homologation of Alkanes and Dimethyl Ether and Promotion by Adamantane as a Hydride Transfer Co-Catalyst", ChemCatChem, Feb. 2011, vol. 3, No. 4, pp. 704-718.

Simonetti et al., "Mechanistic details of acid-catalyzed reactions and their role in the selective synthesis of triptane and isobutane from dimethyl ether", Journal of Catalysis, Jan. 2011, vol. 277, No. 2, pp. 173-195.

Simonetti et al., "Acid strength and solvation effects on methylation, hydride transfer, and isomerization rates during catalytic homologation of C1 species", Journal of Catalysis, 2012, vol. 285, pp. 19-30.

Tan et al., "Process Design and Economics for the Conversion of Lignocellulosic Biomass to Hydrocarbons via Indirect Liquefaction Thermochemical Research Pathway to High-Octane Gasoline Blendstock Through Methanol/Dimethyl Ether Intermediates", NREL Technical Report, Mar. 2015, TP-5100-62402, pp. 1-189.

Tan et al., "Conceptual process design and economics for the production of high-octane gasoline blendstock via Indirect liquefaction of biomass through methanol/dimethyl ether intermediates", Biofuels, Bioproducts and Biorefining, 2016, vol. 10, pp. 17-35.

Zhang et al., "Tetrahedral Nickel(II) Phosphosilicate Single-Site Selective Propane Dehydrogenation Catalyst", ChemCatChem, Mar. 2018, vol. 10, No. 5, pp. 961-964.

\* cited by examiner

HIGH OCTANE SYNTHETIC FUELS

CROSS-REFERENCE TO RELATED APPLICATIONS

This application claims priority from U.S. Provisional Patent Application No. 62/935,692 filed on Nov. 15, 2019, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

The transportation sector accounts for 70% of U.S. petroleum consumption, and a corresponding 35% of total U.S. $CO_2$ emissions. Despite the advent of electric vehicles, motor gasoline is expected to constitute up to more than 50% of the sector's total energy consumption in 2050. Thus, the challenge remains to improve gasoline fuel economy and develop economical pathways to incorporate renewable carbon without a blend limit. One approach to improved fuel economy is through increased fuel octane, since spark-ignition engines with reduced engine knock constraints can utilize high-octane fuels, ultimately reducing fleet fuel consumption. Advancements in the conversion of methanol and/or dimethyl ether (DME) to high-octane gasoline (HOG) over BEA zeolite catalysts may enable economical utilization of renewable and waste carbon (e.g., DME produced from biomass, municipal solid waste, or bio-gas) in a high-value hydrocarbon fuel product, with significant reduction in greenhouse gas (GHG) emissions compared to a petroleum gasoline benchmark. This process holds the potential to provide a renewable and sustainable fuel product with improved fuel properties, meeting two important market needs. Therefore, methods and catalysts for producing these bioderived liquid fuel with advantaged properties are needed.

SUMMARY

An aspect of the present disclosure is a mixture that includes a first portion that includes at least one of a paraffin and/or a naphthene having between 5 carbons and 13 carbons, inclusively, at a first concentration between about 75 wt % and about 99 wt %, and a second portion that includes hydrocarbons having greater than 13 carbons at a second concentration of less than 0.05 wt %. In some embodiments of the present disclosure, the first concentration may be between about 83 wt % and about 97 wt %. In some embodiments of the present disclosure, the second concentration may be between about 0.0001 wt % and about 0.05 wt %.

In some embodiments of the present disclosure, the naphthene may include at least one of a cyclopentane and/or a cyclohexane. In some embodiments of the present disclosure, the least one of the cyclopentane and/or the cyclohexane may be methylated. In some embodiments of the present disclosure, the cyclopentane may include at least one of methylcyclopentane, 1t,3-dimethylcyclopentane, 1c,3-dimethylcyclopentane, methylcyclohexane, 1,1,3-trimethylcyclopentane, ethylcyclopentane, 1c,2t,4-trimethylcyclopentane, 1,3-dimethyl-t-cyclohexane, 1-methyl-2-propyl-cyclopentane, i-butylcyclopentane, and/or 3c-ethylmethylcyclopentane. In some embodiments of the present disclosure, the cyclohexane may include at least one of 1,3-dimethyl-t-cyclohexane, 3c-ethylmethylcyclopentane, 1t,2-dimethylcyclohexane, 1c,4-dimethylcyclohexane, 1c,2-dimethylcyclohexane, 1,1,4-trimethylcyclohexane, 1c,3c,5-trimethylcyclohexane, 1-ethyl-4-methyl-trans-cyclohexane, 1,1,2-trimethylcyclohexane, 1-ethyl-4-t-methyl-cyclohexane, 1,2,3,5-c-tetramethylcyclohexane, propylcyclohexane, 1t-methyl-2-n-propylcyclohexane, and/or sec-butylcyclohexane.

In some embodiments of the present disclosure, the paraffin may include an iso-paraffin at a third concentration between about 60 wt % and about 99 wt %. In some embodiments of the present disclosure, the third concentration may be between about 64 wt % and about 96 wt %. In some embodiments of the present disclosure, the iso-paraffin may include at least one of i-pentane, 2,3-dimethylbutane, 2-methylpentane, 3-methylpentane, 2,4-dimethylpentane, 2,2,3-trimethylbutane, 3,3-dimethylpentane, 2-methylhexane, 3-methylhexane, 3-ethylpentane, 2,2,4-trimethylpentane, 2,2-dimethylhexane, 2,2,3-trimethylpentane, 2,5-dimethylhexane, 2,4-dimethylhexane, 3,3-dimethylhexane, 2,3,4-trimethylpentane, 2,3-dimethylhexane, 2-methylheptane, 4-methylheptane, 3,4-dimethylhexane, 3-methylheptane, 2,2,5-trimethylhexane, 2,3,5-trimethylhexane, 2,4-dimethylheptane, 2,2,3-trimethylhexane, 2,6-dimethylheptane, 2,5-dimethylheptane, 2-methyl-4-ethylhexane, 2,3-dimethylheptane, 3,3-diethylpentane, 3,4-dimethylheptane, 4-methyloctane, 2-methyloctane, 2,2,4-trimethylheptane, octane, 3,3-dimethyl-, 2,3-dimethyloctane, 2,3,6-trimethylheptane, 2,7-dimethyloctane, 2,4-dimethyloctane, 2,6-dimethyloctane, 3,6-dimethyloctane, 4-methylnonane, 2,2,6-trimethyloctane, 2-methylnonane, 3-ethyloctane, 3-ethyl-3-methylheptane, 2,5,6-trimethyloctane, and/or 3-ethylnonane.

In some embodiments of the present disclosure, the paraffin may include 2,2,3-trimethylbutane (TMB) and 2,4-dimethylpentane (DMP). In some embodiments of the present disclosure, the TMB and the DMP may be present at a first ratio (TMB:DMP) of greater than about 10:1. In some embodiments of the present disclosure, the first ratio may be between about 17:1 and about 31:1. In some embodiments of the present disclosure, the paraffin may include 2,2,3-trimethylbutane (TMB) and 2-methylhexane (MH). In some embodiments of the present disclosure, the TMB and the MH may be present at a second ratio (TMB:MH) of greater than about 5:1. In some embodiments of the present disclosure, the second ratio may be between about 6:1 and about 22:1. In some embodiments of the present disclosure, the first portion may include at least one of isopentane, 2,3-dimethylbutane, 2-methylpentane, 3-methylpentane, 2,4-dimethylpentane, 2,2,3-dimethylbutane, 2-methylhexane, 3-methylhexane, 2,2,4-trimethylpentane, 2,2,3-trimethylpentane, 2,5-dimethylhexane, 2,4-dimethylhexane, 2,3,4-trimethylpentane, 2,3-dimethylhexane, 2,2,5-trimethylhexane, and/or 2,2,4-trimethylheptane.

An aspect of the present disclosure is a mixture that includes a first portion that includes at least one of a paraffin and/or a naphthene having between 5 carbons and 9 carbons, inclusively, at a first concentration between about 98 wt % and about 99.999 wt %, and a second portion that includes hydrocarbons having greater than 9 carbons at a second concentration of less than 0.05 wt %.

An aspect of the present disclosure is a mixture that includes at least one of a paraffin and/or a naphthene at a first concentration between about 80 wt % and about 90 wt %, at least one of an olefin and/or an aromatic at a second concentration between about 5 wt % and about 15 wt %, and the mixture is substantially free of 2,2,3-trimethylbutane.

An aspect of the present disclosure is a composition that includes a BEA catalyst, copper and nickel, where the nickel is present at a concentration between greater than 0 wt % and about 2.0 wt %.

BRIEF DESCRIPTION OF DRAWINGS

Some embodiments are illustrated in referenced figures of the drawings. It is intended that the embodiments and figures disclosed herein are to be considered illustrative rather than limiting.

Figure 1:
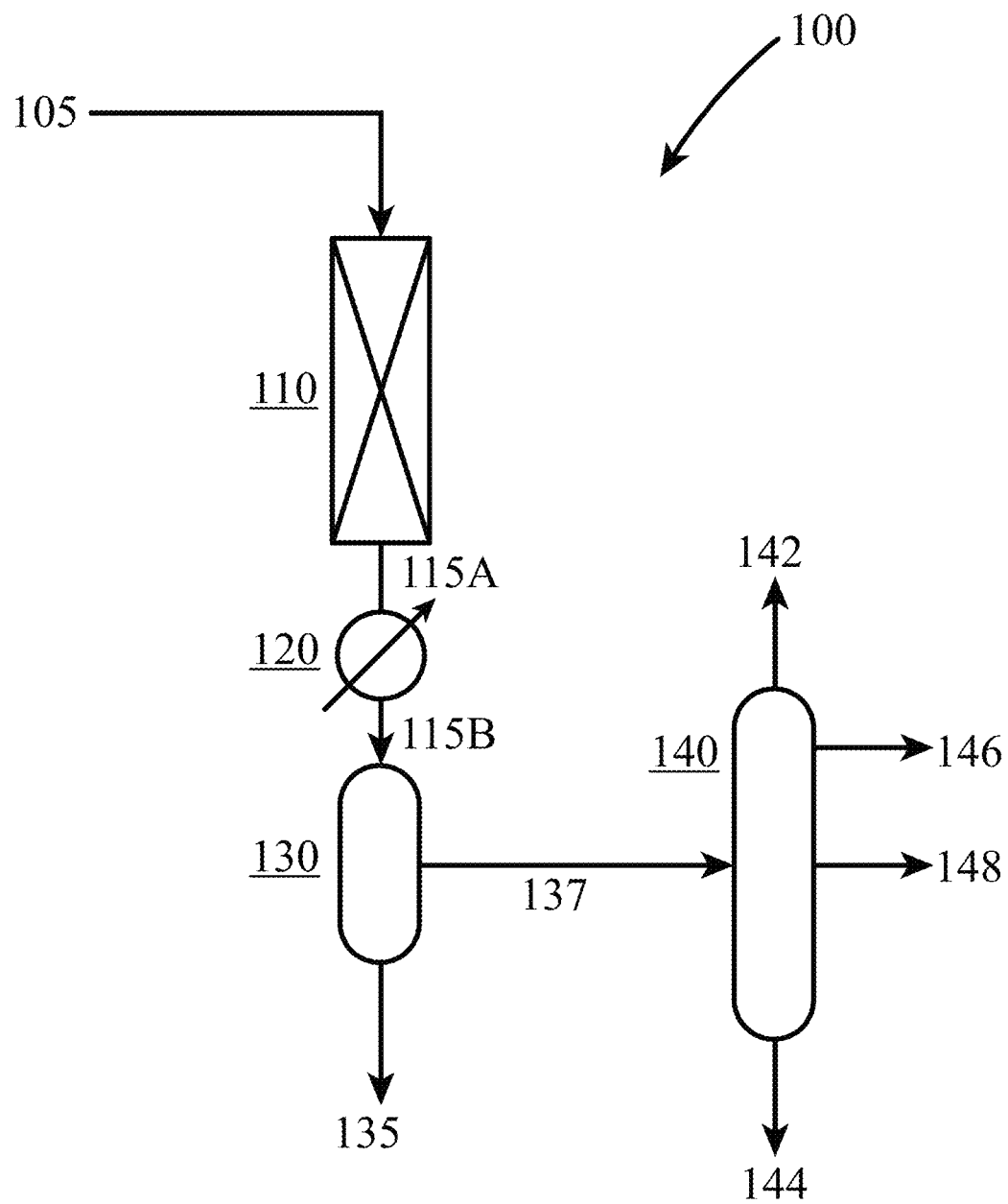
FIG. 1 illustrates a system and/or method for producing high octane synthetic fuels, according to some embodiment of the present disclosure.

| REFERENCE NUMERALS | |
|---|---|
| 100 | system |
| 105 | feed stream |
| 110 | reactor |
| 115 | intermediate stream |
| 120 | heat exchanger |
| 130 | phase separator |
| 135 | aqueous phase |
| 137 | crude product |
| 140 | distillation column |
| 142 | light compounds |
| 144 | heavy aromatic compounds |
| 146 | high octane gasoline (i.e. HOG) |
| 148 | jet fuel |

DETAILED DESCRIPTION

The embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to +1%, ±0.9%, ±0.8%, ±0.7%, ±0.6%, +0.5%, ±0.4%, ±0.3%, ±0.2%, or ±0.1% of a specific numeric value or target.

The present disclosure relates to, among other things, unique fuel compositions resulting from reacting at least one of dimethyl ether and/or methanol, over a copper-modified beta zeolite catalyst. In some embodiments of the present disclosure, hydrogen gas may be reacted with at least one of dimethyl ether and/or methanol, over a copper-modified beta zeolite catalyst. In some embodiments, such a zeolite catalyst may further include at least one of nickel, copper, gallium, and/or zinc. As shown herein, the resultant fuels are unique and different from gasoline derived from crude oil, the ExxonMobil "methanol to gasoline" process, the Haldor Topsoe "TIGAS" process, and other fuel manufacturing processes.

FIG. 1 illustrates a system 100 for converting a feed stream 105 containing hydrogen (diatomic $H_2$) and at least one of methanol, dimethyl ether (DME), and/or an alkane (e.g. isobutane) to high octane fuels, for example, high octane gasoline (HOG) 146 and/or jet fuel 148, according to some embodiments of the present disclosure. In some embodiments, at least one component of the feed stream 105 may be bioderived instead of derived from a "fossil fuel". As shown in FIG. 1, such a system 100 may begin with directing the feed stream 105 to a reactor 110, which converts at least a portion of the feed stream 105 to a first intermediate stream 115A. In some embodiments of the present disclosure, the feed stream 105 may include $H_2$ and a starting molecule that includes at least one of methanol, DME, and/or an alkane, with examples of alkanes including isobutane, ethane, propane, n-butane, n-pentane, 2-methylbutane, n-hexane, 2-methylpentane, 3-methylpentane, 2,3-dimethylbutane, 2,2-dimethylbutane, 2-ethylbutane, cyclohexane, methylcyclohexane, n-heptane, 2-methylhexane, 3-methylhexane, 2,2-dimethylpentane, 2,3-dimethylpentane, 2,4-dimethylpentane, 2-methyl-3-ethylbutane, 2,2,3-trimethylbutane, methylcyclohexane, dimethylcyclopentane, 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,5-dimethylhexane, n-octane, 1,2-dimethylcyclohexane, 1,3-dimethylcyclohexane, 1,1-dimethylcyclohexane, 2,2,3-trimethylpentane, 2,3,3-trimethylpentane, 2,3,4-trimethylpentane, and/or 2,2,4-trimethylpentane.

In some embodiments of the present disclosure, a reactor 110 may include a packed bed reactor containing a solid catalyst (e.g. a copper-modified beta zeolite catalyst; not shown). As described in more detail below, a solid catalyst contained within a reactor 110 may catalyze a variety of reactions including at least one of a hydrogenation reaction, a dehydrogenation reaction, and/or a homologation reaction. As defined herein, a homologation reaction refers to increasing at least one of a molecular weight, carbon number, and/or chain length of a starting molecule contained within the feed stream 105 and/or molecule derived from a starting molecule contained within the feed stream 105. For example, DME (a starting molecule contained within some embodiments of the feed stream 105) may undergo a homologation reaction with a reactant having two or more —$CH_2$— groups, as shown in Reaction 1 below. Reaction 1 is shown for illustrative purposes only and is not intended to be limiting.

Reaction 1

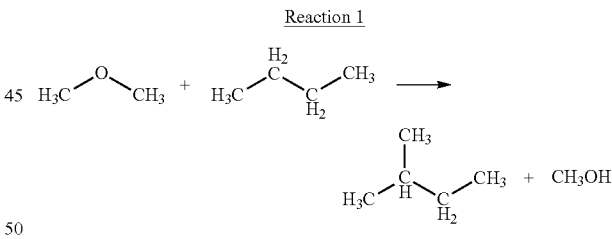

In some embodiments of the present disclosure, a reaction occurring in a reactor 110 like that shown in FIG. 1 may include the reaction of $H_2$ with DME. In some embodiments of the present disclosure, the feed stream 105 may also include at least one inert material such as argon and/or helium.

In some embodiments of the present disclosure, the reactions catalyzed by a catalyst contained within a reactor 110 may result in converting at least a portion of the starting molecules contained within the feed stream 105 and/or molecules derived from the starting molecules to a first intermediate stream 115A containing a variety of upgraded hydrocarbon molecules including at least one of a paraffin (i.e. alkane), an i-paraffin, an aromatic, a naphthene, and/or an olefin (i.e. alkene). In some embodiments of the present disclosure, the first intermediate stream 115A may include an upgraded hydrocarbon molecule having between four and ten carbon atoms (i.e. $C_{4-10}$) or between five and eight carbon atoms (i.e. $C_5$-s), with examples including at least one of 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,5-dimethylhexane, n-octane, 1,3-dimethylcyclohexane, 1,4-dimethylcyclohexane, trimethylcyclohexanes, tetramethylcyclohexanes, 2,2,3-trimethylpentane, 2,3,3-trimethylpentane, 2,3,4-trimethylpentane, 2,2,4-trimethylpentane, dimethylheptanes, tetramethylpentanes, trimethylheptanes, and/or tetramethylhexanes.

Referring again to FIG. 1, the reactions performed in a reactor 110 may be catalyzed using a catalyst constructed of a zeolite, with copper supported on the catalyst. In some embodiments of the present disclosure, a zeolite used to construct the catalyst may be a beta zeolite (i.e. BEA zeolite). In some embodiments of the present disclosure, as described in more detail below, a catalyst for performing the reactions described herein may include a BEA zeolite with copper supported on the BEA zeolite and further including at least one of nickel and/or zinc supported on the BEA zeolite. In some embodiments of the present disclosure, the reactions performed in the reactor 110 may be performed at a reaction temperature between about 100° C. and about 400° C. and at an absolute pressure between about 100 kPa and about 2,000 kPa. In some embodiments of the present disclosure, for the example where the feed stream 105 includes $H_2$ and DME, the DME may have a WHSV between about 0.1 $h^{-1}$ and about 100 $h^{-1}$ and where the partial pressure of the $H_2$ is between 1 mol % and 99 mol % of the absolute pressure of the reactor 110. Referring to FIG. 1, the reactor 110 is shown to have a top-down configuration where the feed stream 105 is directed to the top of the reactor 110 and flows in the same direction as gravity. This is for illustrative purposes, and in some embodiments of the present disclosure, a reactor 110 may be configured for bottom-up flow of the feed stream 105 through the reactor 110.

Referring again to FIG. 1, the first intermediate stream 115A exiting the reactor 110 may have a temperature equal to the range of the reactor's operating temperature; e.g. between about 100° C. and about 400° C. This relatively hot first intermediate stream 115A may then be directed to a heat exchanger 120 to cool and/or condense at least a portion of the first intermediate stream 115A, resulting in a cooled second intermediate stream 115B. For an example where the heat exchanger 120 provides cooling using cooling tower water having an inlet wet bulb temperature between about 18° C. and about 40° C., the second intermediate stream 115B may be cooled to a temperature having an approach temperature between about 1° C. and about 100° C. of the cooling tower water's inlet temperature. In some embodiments of the present disclosure, a heat exchanger 120 may be a plate-and-frame heat exchanger and/or a shell-and-tube heat exchanger.

In some embodiments of the present disclosure, the cooled second intermediate stream 115B may be directed to a phase separator 130 configured to separate the cooled second intermediate stream 115B into an aqueous phase 135 containing water and a crude product 137 including the remainder of the cooled second intermediate stream 115B.

Figure 11:
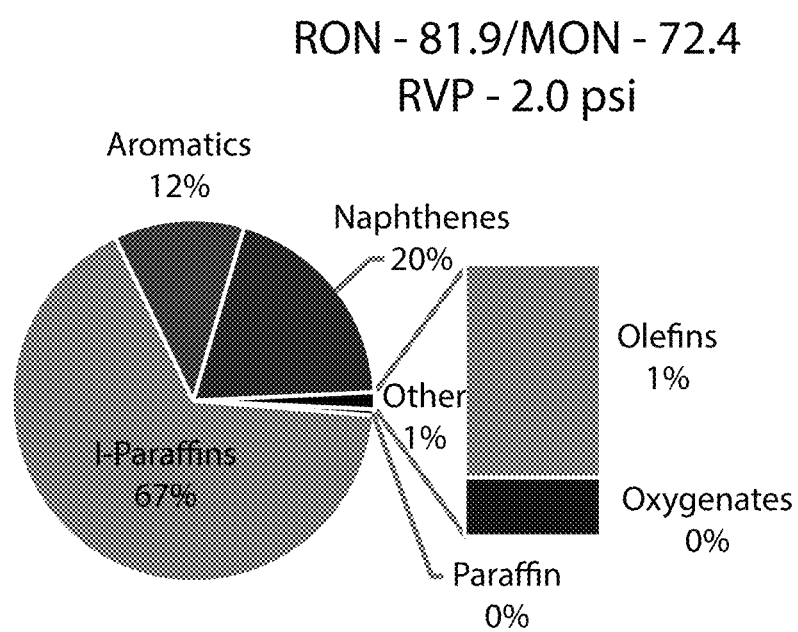
FIG. 11 illustrates compound types (e.g., paraffins, isoparaffins, aromatics, etc.) making up crude product sample no. 6776-026-05 as determined by GC using a flame ionization detector (FID), according to some embodiments of the present disclosure.
Figure 12:
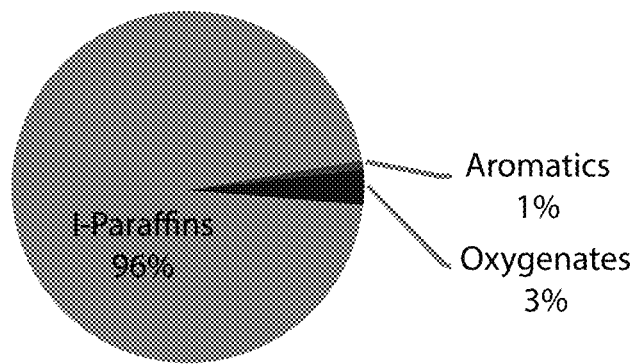
FIG. 12 illustrates compound types (e.g., paraffins, isoparaffins, aromatics, etc.) making up crude product sample no. 6776-031-16 as determined by GC using a flame ionization detector (FID), according to some embodiments of the present disclosure.

In some embodiments of the present disclosure, an aqeuous phase 135 may include water and/or methanol. Further details of exemplary crude products 137 are summarized in Tables 5, 6, 12, and 13 below and in FIGS. 11 and 12. As shown in FIG. 1, a crude product 137 may be directed to a distillation column 140 configured to separate the crude product 137 into at least four separate streams: light compounds 142, heavy aromatic compounds 144, high octane gasoline (HOG) 146, and/or jet fuel 148. Examples of HOG 146 are summarized in Tables 7, 8, 14, and 15 below. Examples of jet fuels 148 are summarized in Tables 9 and 16 below. Examples of heavy and aromatic compounds 144 are summarized in Tables 10 and 17 below. In some embodiments of the present disclosure, a distillation column 140 may be operated at a pressure of about 5 bar absolute, an overheads temperature of about −20° C. and a bottoms temperature of about 138° C. These distillation column 140 operating conditions are provided for illustrative purposes and one of ordinary skill in the art can define other distillation columns, operating at different conditions, also capable of completing the separation described above. These other potential separation options fall within the scope of the present disclosure.

The paraffin-to-olefin (P:O) ratio is an important metric that affects gasoline fuel properties and the corresponding engine efficiency, where improved efficiency is achieved with increased olefin content (i.e., decreased P:O ratio). As shown herein, in the conversion of dimethyl ether (DME) to high-octane hydrocarbons over BEA (i.e. beta) zeolite catalysts, the P:O ratio can be controlled through catalyst design. Some of the examples described herein demonstrate the controlled introduction of Zn and/or Ni species to balance the dehydrogenation and hydrogenation activity of a Cu-modified BEA zeolite (Cu/BEA) during DME homologation with co-fed $H_2$.

In an effort to decrease the P:O ratio of the branched hydrocarbon HOG product from DME homologation, catalysts with greater alkane dehydrogenation activity were sought. Isobutane dehydrogenation serves as a relevant probe reaction due to its branched structure and the high selectivity to isobutane over BEA catalysts in DME homologation reactions. The trends observed for the dehydrogenation of isobutane are anticipated to apply to the dehydrogenation of other alkanes, including ethane, propane, n-butane, n-pentane, 2-methylbutane, n-hexane, 2-methylpentane, 3-methylpentane, 2,3-dimethylbutane, 2,2-dimethylbutane, 2-ethylbutane, cyclohexane, methylcyclohexane, n-heptane, 2-methylhexane, 3-methylhexane, 2,2-dimethylpentane, 2,3-dimethylpentane, 2,4-dimethylpentane, 2-methyl-3-ethylbutane, 2,2,3-trimethylbutane, methylcyclohexane, dimethylcyclopentane, 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,5-dimethylhexane, n-octane, 1,2-dimethylcyclohexane, 1,3-dimethylcyclohexane, 1,1-dimethylcyclohexane, 2,2,3-trimethylpentane, 2,3,3-trimethylpentane, 2,3,4-trimethylpentane, and/or 2,2,4-trimethylpentane.

For example, ionic zinc and/or nickel species may act as dehydrogenation active sites for light ($C_2$-$C_4$) alkanes. To assess the activity of Zn and Ni sites relative to Cu, mono-metallic catalysts were prepared via ion-exchange (IE) of proton-form BEA zeolite with Cu, Ni, and/or Zn salts followed by oxidation at 500° C. Comparable molar metal loadings were targeted, and the resulting loadings ranged between about 135 μmol $g_{cat}^{-1}$ and about 153 μmol $g_{cat}^{-1}$ (see Table 1A below). X-ray absorption spectroscopy (XAS) was utilized to identify the metal oxidation states following reduction at 300° C. (see Table 1A and Table 1). The IE-Cu/BEA used in this study contained exclusively Cu(1+) after reduction without any contribution from Cu—Cu second-shell scattering, indicating that Cu(1+) ions were isolated and not part of a Cu—O—Cu cluster or lattice. The IE-NiCBEA and IE-ZnBEA remained in the 2+ oxidation state after reduction, and no Ni—Ni or Zn—Zn second-shell scattering was observed, consistent with the ion-exchange of isolated Ni(2+) and Zn(2+) ions at Brønsted acid sites. Notably, no metallic Cu, Ni, or Zn was observed after reduction at these low weight loadings.

TABLE 1A

Metal loadings and oxidation states of the IE metal-BEA catalysts determined from the XAS edge energy.

| Catalyst | Metal loading (wt %, $μmol_M\, g_{cat}^{-1}$) | M oxidation state |
| --- | --- | --- |
| IE-Cu/BEA | 0.876, 138 | 1+ |
| IE-Ni/BEA | 0.792, 135 | 2+ |
| IE-Zn/BEA | 1.00, 153 | 2+ |

TABLE 1B

Fraction of metal oxidation states in monometallic and bimetallic catalysts after in situ treatment in air and hydrogen determined by linear combination XANES fits.[a]

| Catalyst | Treatment | Cu(2+) (%) | Cu(1+) (%) | Cu(0) (%) | Zn(2+) (%) | Ni(2+) (%) | Ni(0) (%) |
| --- | --- | --- | --- | --- | --- | --- | --- |
| IE-Cu/BEA | 150° C., 20% $O_2$/He | 100 | 0 | 0 | — | — | — |
|  | 300° C., 3.5% $H_2$/He | 39 | 61 | 0 | — | — | — |
| IW-Cu/BEA | 500° C., 20% $O_2$/He | 100 | 0 | 0 | — | — | — |
|  | 300° C., 3.5% $H_2$/He | 10 | 8 | 82 | — | — | — |
| IE-Ni/BEA | 300° C., 20% $O_2$/He | — | — | — | — | 100 | 0 |
|  | 300° C., 3.5% $H_2$/He | — | — | — | — | 100 | 0 |
| IW-Cu-IE-Ni/BEA | 300° C., 20% $O_2$/He | 100 | 0 | 0 | — | 100 | 0 |
|  | 300° C., 3.5% $H_2$/He | 10 | 10 | 80 | — | 76 | 24 |
| IE-Zn/BEA | 300° C., 20% $O_2$/He | — | — | — | 100 | — | — |
|  | 300° C., 3.5% $H_2$/He | — | — | — | 100 | — | — |
| IW-Cu-IE-Zn/BEA | 300° C., 20% $O_2$/He | 100 | 0 | 0 | 100 | — | — |
|  | 300° C., 3.5% $H_2$/He | 14 | 20 | 66 | 100 | — | — |

[a]Spectra were collected at room temperature in He

Figure 2:
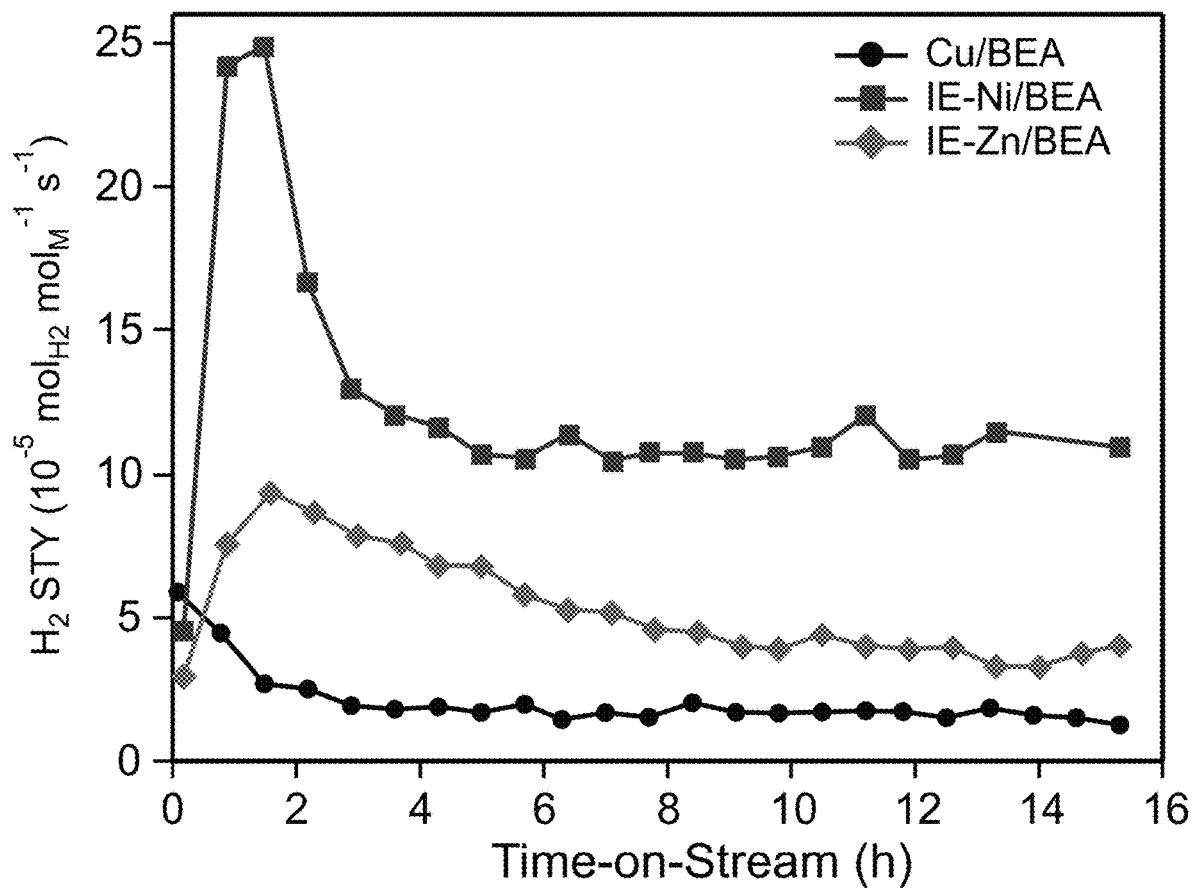
FIG. 2 illustrates site-time yield (STY) of $H_2$ over IE-M/BEA catalysts during isobutane dehydrogenation as a function of time-on-stream (TOS), according to some embodiments of the present disclosure. Reactions were performed at 300° C., 195 kPa, isobutane weight hourly space veolocity (WHSV) of 0.10 $g_{isobutane}$ $g_{cat}^{-1}$ $h^{-1}$, and $p_{isobutane}$=84 kPa.

The isobutane dehydrogenation activity of each catalyst was evaluated at 300° C., 195 kPa, and an isobutane weight hourly space velocity (WHSV) of 0.10 $g_{isobutane}\, g_{cat}^{-1}\, h^{-1}$ ($p_{isobutane}$=84 kPa). $H_2$ production was assumed to be a quantitative indicator of dehydrogenation activity, and the site-time yield (STY) of $H_2$ was calculated for each IE-M/BEA catalyst (see FIG. 2).

Comparing at ca. 8 hours time-on-stream (TOS), the STY values indicate markedly greater dehydrogenation activity for IE-Ni/BEA ($10.6 \times 10^{-5}$ $mol_{H2}\, mol_M^{-1}\, s^{-1}$) and IE-Zn/BEA ($4.6 \times 10^{-5}$ $mol_{H2}\, mol_M^{-1}\, s^{-1}$) compared to IE-Cu/BEA ($1.5 \times 10^{-5}$ $mol_{H2}\, mol_M^{-1}\, s^{-1}$). These results support our initial hypothesis that Ni- and Zn-based active sites out-perform Cu in alkane dehydrogenation under these relatively mild conditions.

In addition to identifying Zn(2+) and Ni(2+) alkane dehydrogenation sites that out-perform Cu(1+), the activation of co-fed $H_2$ by metallic Cu species during the reaction of DME to products (see Reaction 1) is an important function of the Cu/BEA catalyst that leads to increased activity. To this end, bimetallic catalysts were synthesized with a two-step method, where the nickel or zinc was first incorporated at a low metal loading (<1 wt %) by the ion-exchange (IE) method described above. After oxidation of the IE-M/BEA material at 500° C., copper was deposited via incipient wetness impregnation (IW) at a higher metal loading (4-5 wt %) to promote the formation of metallic copper after oxidation at 500° C. and subsequent reduction at 300° C. This method yielded bimetallic materials, Cu—Ni/BEA and Cu—Zn/BEA, with the resultant mass loadings reported in Table 2. Acid site quantification was performed and compared to the typical values for mono-metallic Cu/BEA. The catalysts possessed similar total acid site densities (between about 1660 μmol $g^{-1}$ and about 1770 μmol $g^{-1}$) and Brønsted:Lewis ratios (between about 2.3 and about 2.7), consistent with the addition of Lewis-acidic ionic metal species to the zeolite that reduce Brønsted acidity as observed for Cu/BEA.

TABLE 2

Metal loadings, acid site densities and Brønsted/Lewis acid site ratios for the IW-Cu-IE-M/BEA catalysts.

| Catalyst | Metal loading of Cu; M (wt %) | Acid site density (μmol $g^{-1}$) | B:L ratio (mol $mol^{-1}$) | B site density (μmol $g^{-1}$) | L site density (μmol $g^{-1}$) |
| --- | --- | --- | --- | --- | --- |
| Cu/BEA | 4.3 | 1770 | 2.3 | 1230 | 540 |
| Cu—Ni/BEA | 4.6; 0.71 | 1710 | 2.4 | 1210 | 500 |
| Cu—Zn/BEA | 4.3; 0.77 | 1660 | 2.7 | 1210 | 450 |

The oxidation states for copper, nickel, and zinc species in the bimetallic materials after oxidation and reduction were determined using XAS (see Table 3A). The copper species in Cu—Ni/BEA were a mix of metallic (80%) and ionic (20%) species, similar to that observed for Cu/BEA (82% metallic, 18% ionic). For the nickel species, 24% of Ni atoms reduced to nickel metal, and 76% remained as Ni(2+). This data indicates that the Cu—Ni/BEA material contained ca. 0.17 wt % metallic nickel particles and/or metallic Cu—Ni alloy particles. The copper species in Cu—Zn/BEA were a mix of metallic (66%) and ionic (34%) species, again similar to that observed for Cu/BEA. The zinc species remained Zn(2+) after reduction, consistent with the IE-Zn/BEA above (see Table 1A and Table 1B above).

TABLE 3A

Fraction of ionic and metallic oxidation states in bimetallic catalysts, determined by XAS after in situ reduction in $H_2$ at 300° C.

| Catalyst | Ionic Cu (%) | Metallic Cu (%) | Ionic Zn (%) | Ionic Ni (%) | Metallic Ni (%) |
|---|---|---|---|---|---|
| Cu/BEA | 18 | 82 | — | — | — |
| Cu—Ni/BEA | 20 | 80 | — | 76 | 24 |
| Cu—Zn/BEA | 34 | 66 | 100 | — | — |

TABLE 3B

EXAFS fitting parameters of beta-supported metal catalysts

| Catalysts | Treatment | Edge (Energy – eV) | CN | R (Å) | $\sigma^2$ ($\times 10^3$ Å$^2$) | $E_0$ (eV) |
|---|---|---|---|---|---|---|
| IE-Cu/BEA | 150° C., 20% $O_2$/He | Cu K (8985.5) | 4.2 (Cu—O) | 1.94 | 4.9 | 5.6 |
| | 300° C., 3.5% $H_2$/He | Cu K (8981.9) | 3.8 (Cu—O) | 1.93 | 4.8 | 7.0 |
| IW-Cu/BEA | 500° C., 20% $O_2$/He | Cu K (8984.9) | 4.0 (Cu—O) | 1.93 | 6.4 | 6.6 |
| | 300° C., 3.5% $H_2$/He | Cu K (8979.0) | 0.6 (Cu—O) | 1.95 | 4.6 | 13.5 |
| | | | 9.3 (Cu—Cu) | 2.54 | 8.8 | 4.7 |
| IE-Ni/BEA | 300° C., 20% $O_2$/He | Ni K (8343.6) | 4.3 (Ni—O) | 2.02 | 4.8 | 2.5 |
| | 300° C., 3.5% $H_2$/He | Ni K (8343.6) | 4.8 (Ni—O) | 2.03 | 4.8 | 1.8 |
| IW-Cu-IE-Ni/BEA | 300° C., 20% $O_2$/He | Ni K (8343.6) | 4.7 (Ni—O) | 2.03 | 4.8 | −2.4 |
| | 300° C., 3.5% $H_2$/He | Ni K (8343.6) | 3.9 (Ni—O) | 2.05 | 4.8 | −0.1 |
| | | | 5.1 (Ni—Ni) | 2.61 | 11.6 | 8.0 |
| | 300° C., 20% $O_2$/He | Cu K (8985.2) | 4.4 (Cu—O) | 1.95 | 6.0 | 7.0 |
| | 300° C., 3.5% $H_2$/He | Cu K (8979.0) | 0.6 (Cu—O) | 1.95 | 4.6 | 13.9 |
| | | | 9.1 (Cu—Cu) | 2.54 | 8.8 | 2.54 |
| IE-Zn/BEA | 300° C., 20% $O_2$/He | Zn K (9663.1) | 3.8 | 1.99 | 6.2 | 1.9 |
| | 300° C., 3.5% $H_2$/He | Zn K (9663.3) | 4.1 | 2.00 | 6.2 | 2.1 |
| IW-Cu-IE-Zn/BEA | 300° C., 20% $O_2$/He | Zn K (9662.9) | 3.6 (Zn—O) | 1.96 | 6.2 | 1.5 |
| | 300° C., 3.5% $H_2$/He | Zn K (9663.3) | 4.0 (Zn—O) | 1.97 | 6.2 | 0.0 |
| | 300° C., 20% $O_2$/He | Cu K (8985.2) | 4.2 (Cu—O) | 1.95 | 6.3 | 6.5 |
| | 300° C., 3.5% $H_2$/He | Cu K (8979.0) | 1.1 (Cu—O) | 1.94 | 4.6 | 13.3 |
| | | | 6.5 (Cu—Cu) | 2.54 | 8.8 | 4.9 |

Figure 3A:
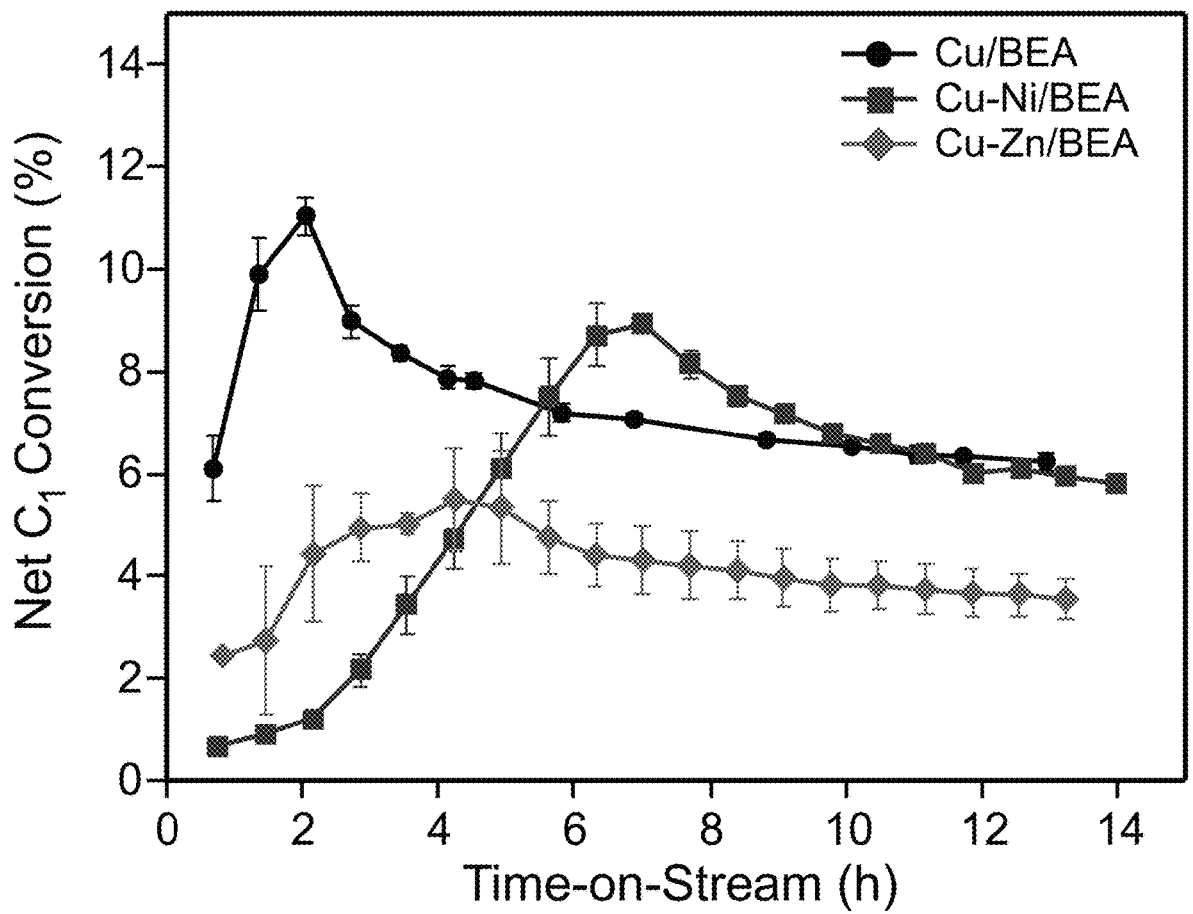
FIGS. 3A and 3B illustrate, according to some embodiments of the present disclosure, plots of (FIG. 3A) net $C_1$ conversion and (FIG. 3B) turn over number (TON) versus TOS. Reaction conditions were 200° C., 103 kPa, DME WHSV of ca. 2.2 $h^{-1}$, $p_{DME}$ and $p_{H2}$ each ca. 47 kPa, remainder $p_{Ar}$. Error bars for Cu/BEA data are presented as the standard error of the mean (SEM) calculated from replicate experiments (n≥3). Error bars for Cu—Ni/BEA and Cu—Zn/BEA data are presented as the range from two replicate experiments (n=2).
Figure 4:
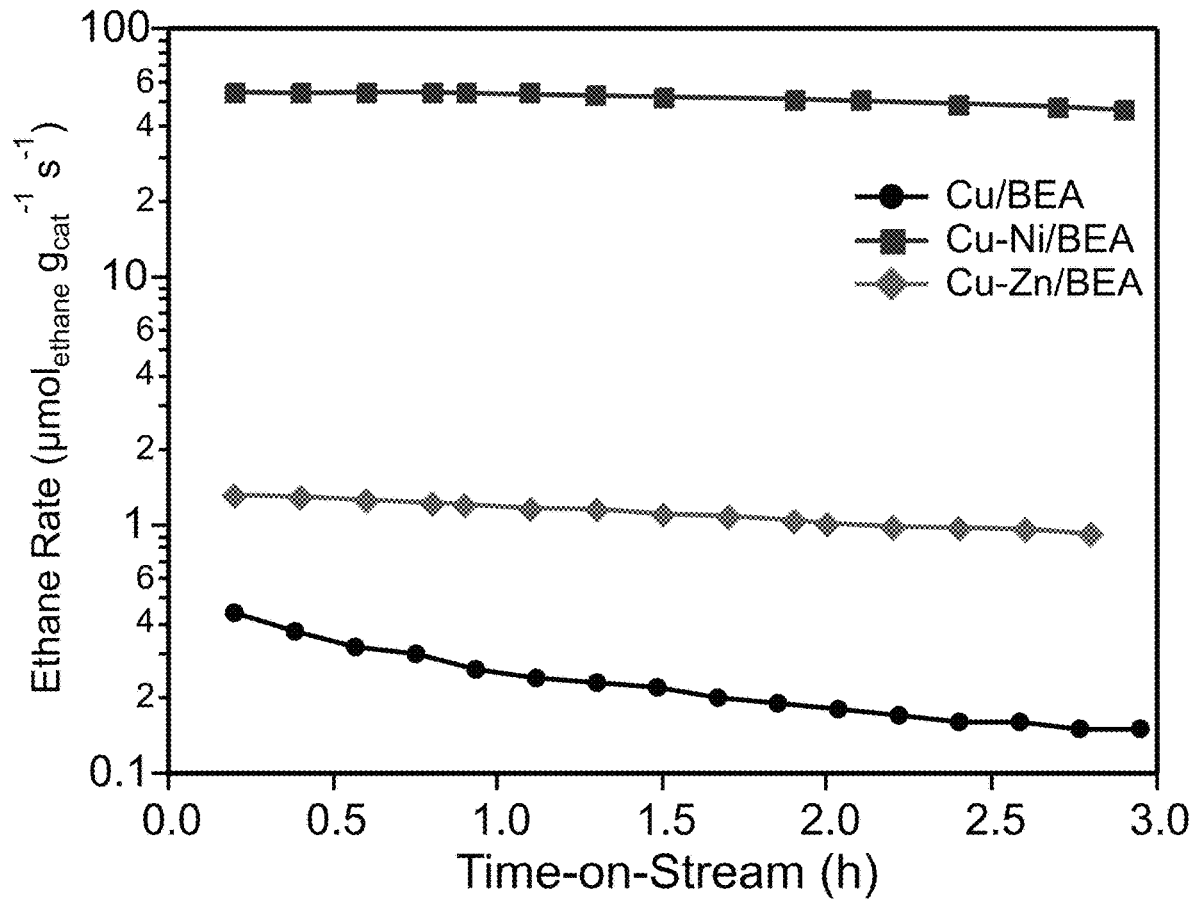
FIG. 4 illustrates the rate of ethane formation via ethene hydrogenation versus TOS, according to some embodiments of the present disclosure. Reaction conditions were 100° C., 195 kPa, ethylene WHSV of ca. 7.0 $h^{-1}$, $p_{ethylene}$ and $p_{H2}$ were 2 and 20 kPa, respectively, with the remainder $p_{He}$.

Catalysts were tested in the DME-to-hydrocarbons reaction with co-fed $H_2$ at 200° C., at a reaction pressure of 103 kPa, and a DME WHSV of ca. 2.2 h$^{-1}$ ($p_{DME}=p_{H2}=47$ kPa, $p_{Ar}=9$ kPa). The DME-to-hydrocarbons reaction over monometallic Zn/BEA and Ni/BEA catalysts is not reported here due to low activity in their corresponding experiments compared to Cu/BEA. Net $C_1$ conversions less than 10% were targeted to compare pseudo-intrinsic catalyst performance at similar conversions after the initial break-in period (see FIG. 3A). The Cu—Ni/BEA catalyst exhibited a longer break-in period than the other catalysts but achieved a comparable steady-state activity to that of Cu/BEA after about 10 hours on stream (i.e. time on stream (TOS)). The Cu—Zn/BEA was less active than the other catalysts, exhibiting a conversion of ca. 3.8% at 10 hours TOS versus ca. 6.5% at 10 hours for Cu/BEA and Cu—Ni/BEA. The Cu—Zn/BEA catalyst displayed comparable hydrogenation activity to Cu/BEA as measured by ethylene hydrogenation (see FIG. 4).

Figure 3B:
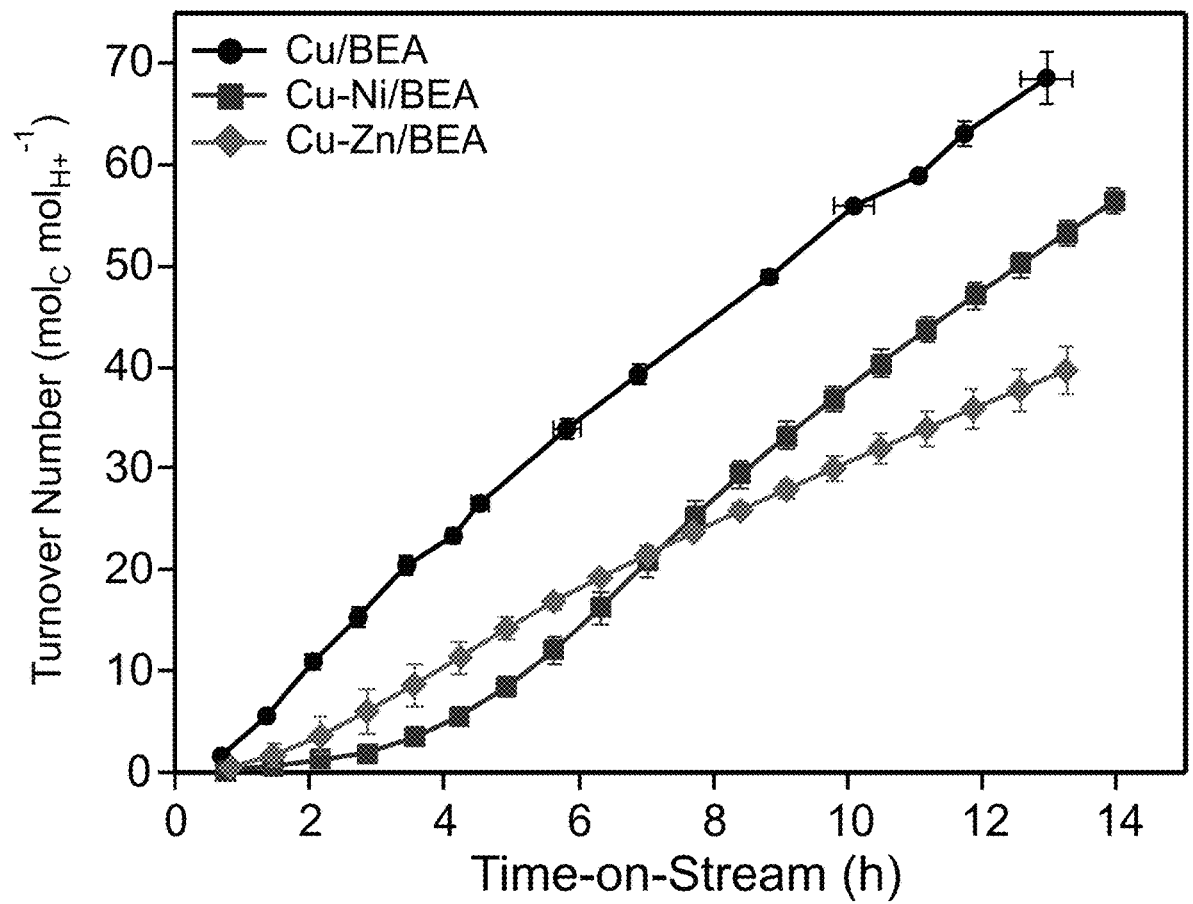
Figure 5:
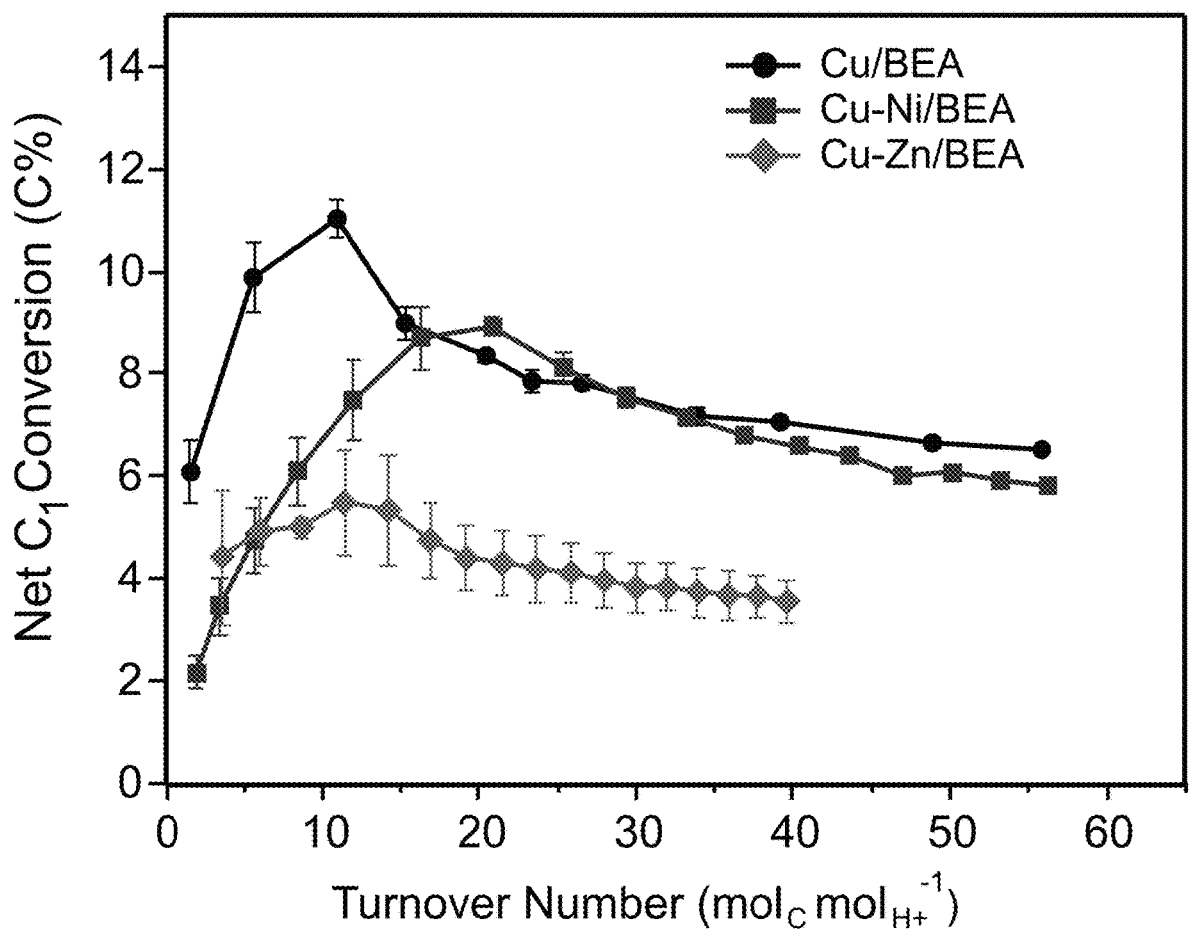
FIG. 5 illustrates net $C_1$ conversion versus turnover number (TON), according to some embodiments of the present disclosure. Reaction conditions were 200° C., 103 kPa, DME WHSV of ca. 2.2 $h^{-1}$, $p_{DME}$ and $p_{H2}$ each ca. 47 kPa, remainder $p_{Ar}$. Error bars for Cu/BEA data are presented as the SEM calculated from replicate experiments (n≥3). Error bars for Cu—Ni/BEA and Cu—Zn/BEA data are presented as the range from two replicate experiments (n=2).

The turnover number (TON) normalizes catalyst loading, acid site density, and DME flow rate, facilitating the comparison of transient data on catalysts which are continuously deactivating. FIG. 3B presents the TON as a function of TOS. Comparing the TON values at 10 hours TOS, the Cu/BEA catalyst was the most active, reaching a TON of 58 mol$_C$ mol$_{H+}^{-1}$, followed by Cu—Ni/BEA at 41 and Cu—Zn/BEA at 32 mol$_C$ mol$_{H+}^{-1}$. A common TON value of 42±2 mol$_C$ mol$_{H+}^{-1}$ was reached for each catalyst, providing a point of comparison for the selectivity values of interest to the P:O ratio. The TOS (and conversion) corresponding to ca. 42 turnovers for each catalyst was 6.9 (7.0% C), 10 (6.6% C), and 13 hours (3.6% C) for Cu/BEA, Cu—Ni/BEA, and Cu—Zn/BEA, respectively. A plot of conversion versus TON is illustrated in FIG. 5.

Figure 6A:
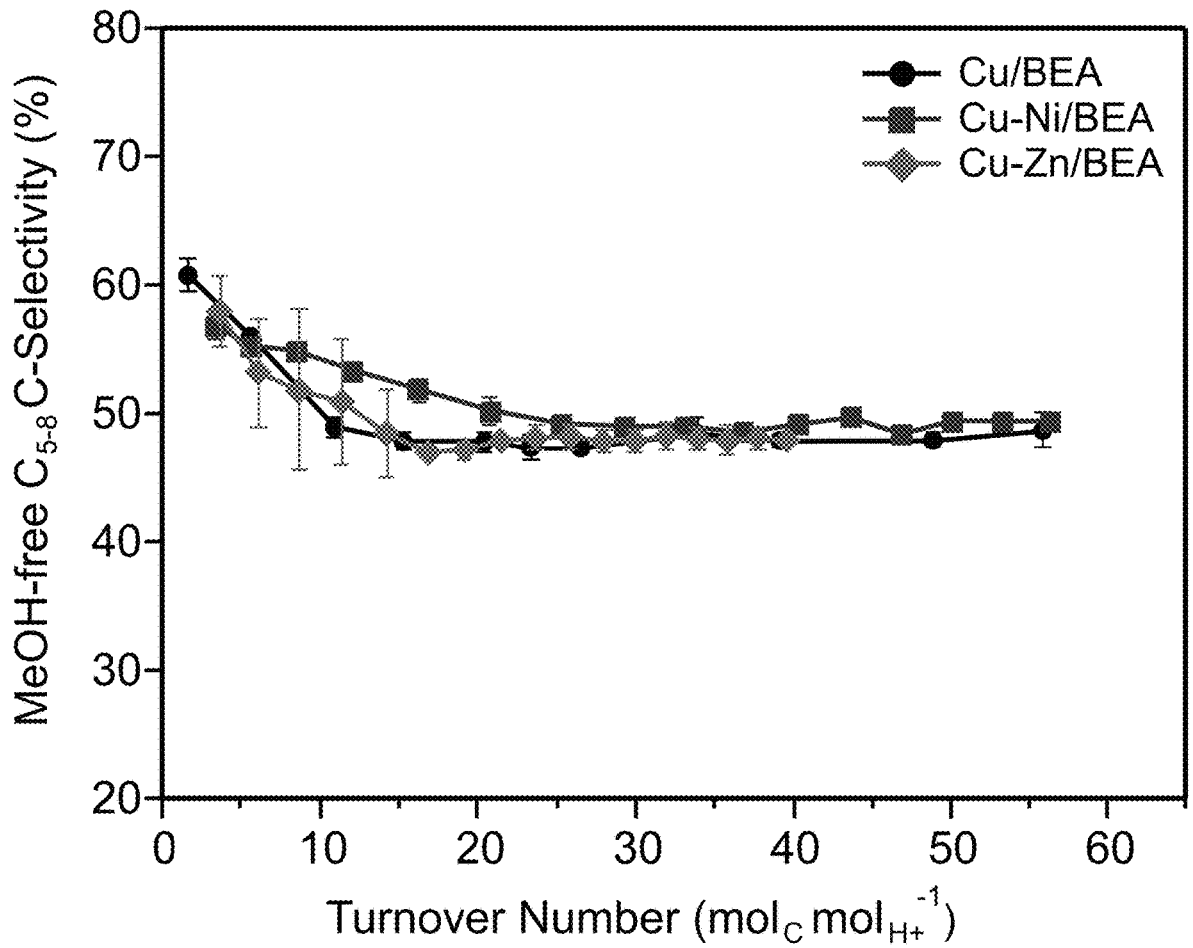
FIGS. 6A and 6B illustrate methanol-free carbon selectivity for (FIG. 6A) total high-octane gasoline range $C_{5-8}$ hydrocarbons versus TON, and (FIG. 6B) by carbon number taken at TON=42±2 $mol_C$ $mol_{H+}^{-1}$, according to some embodiments of the present disclosure. "Naph" refers to single-ring naphthenic hydrocarbons of $C_{7-12}$ (i.e., methylated cyclohexanes). Reaction conditions were 200° C., 103 kPa, DME WHSV of ca. 2.2 $h^{-1}$, $p_{DME}$ and $p_{H2}$ each ca. 47 kPa, remainder $p_{Ar}$. Error bars for Cu/BEA data are presented as the SEM calculated from replicate experiments (n≥3 for (A), n=4 for (B)). Error bars for Cu—Ni/BEA and Cu—Zn/BEA data are presented as the range from two experiments (n=2).
Figure 6B:
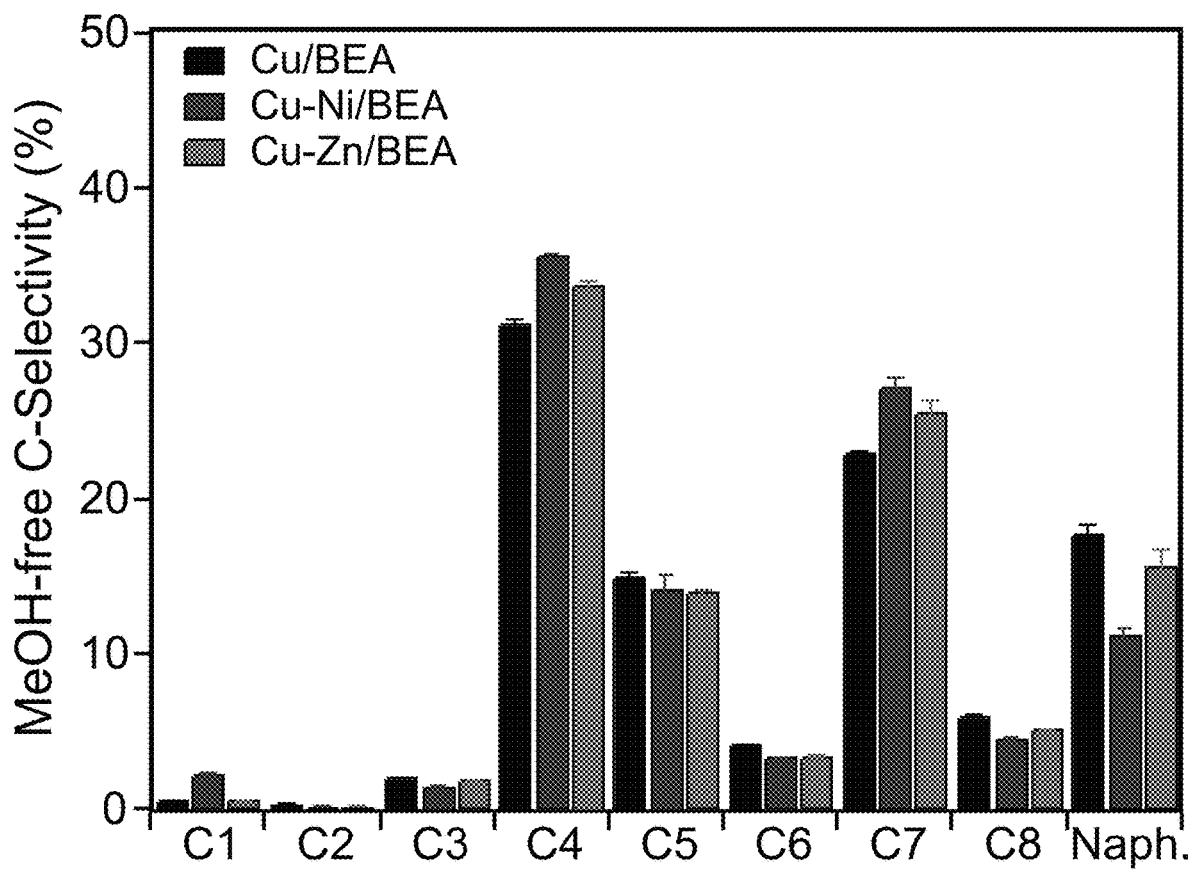
Figure 7:
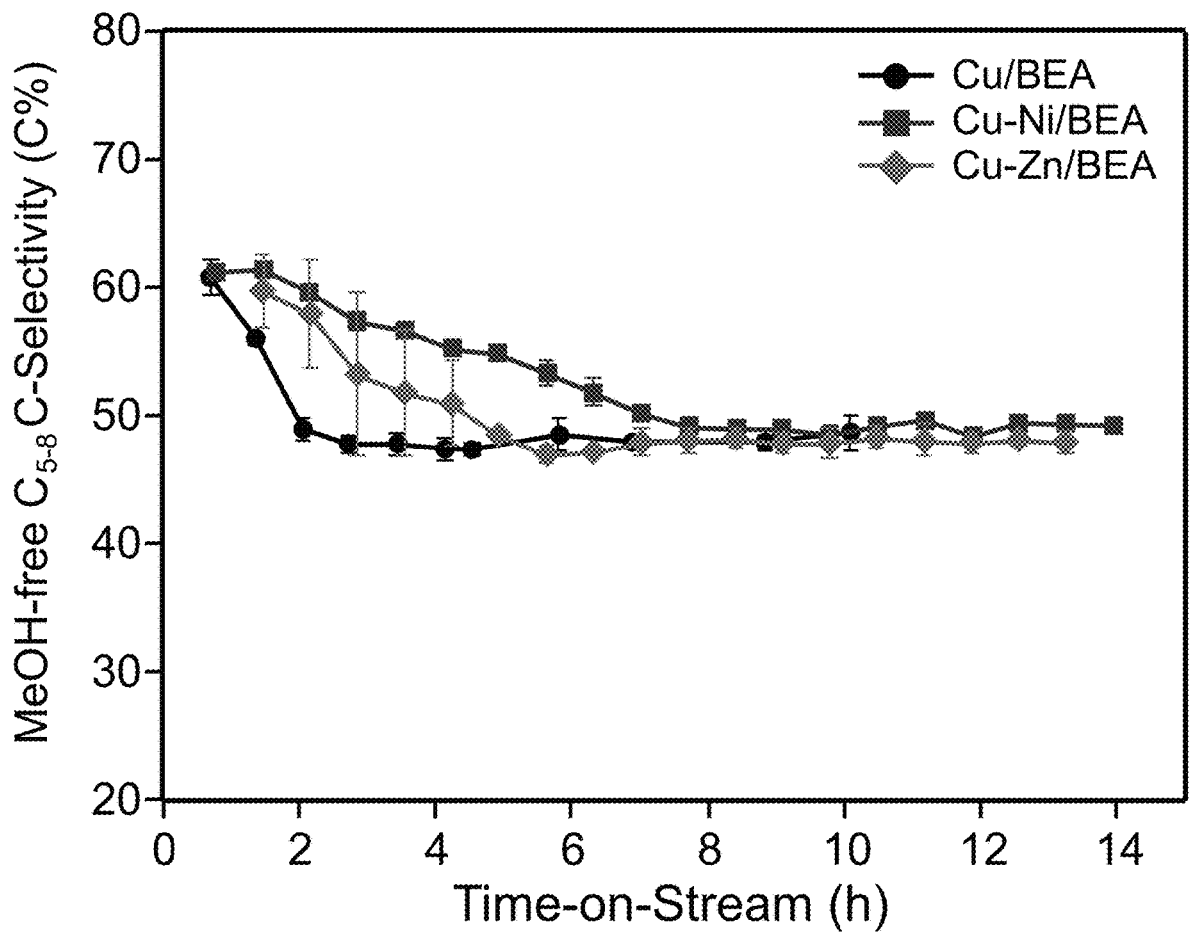
FIG. 7 illustrates methanol-free carbon selectivity for high-octane gasoline range $C_{5-8}$ hydrocarbons versus TOS, according to some embodiments of the present disclosure. Reaction conditions were 200° C., 103 kPa, DME WHSV of ca. 2.2 $h^{-1}$, $p_{DME}$ and $p_{H2}$ each ca. 47 kPa, remainder $p_{Ar}$. Error bars for Cu/BEA data are presented as the SEM calculated from replicate experiments (n≥3). Error bars for Cu—Ni/BEA and Cu—Zn/BEA data are presented as the range from two replicate experiments (n=2).
Figure 8A:
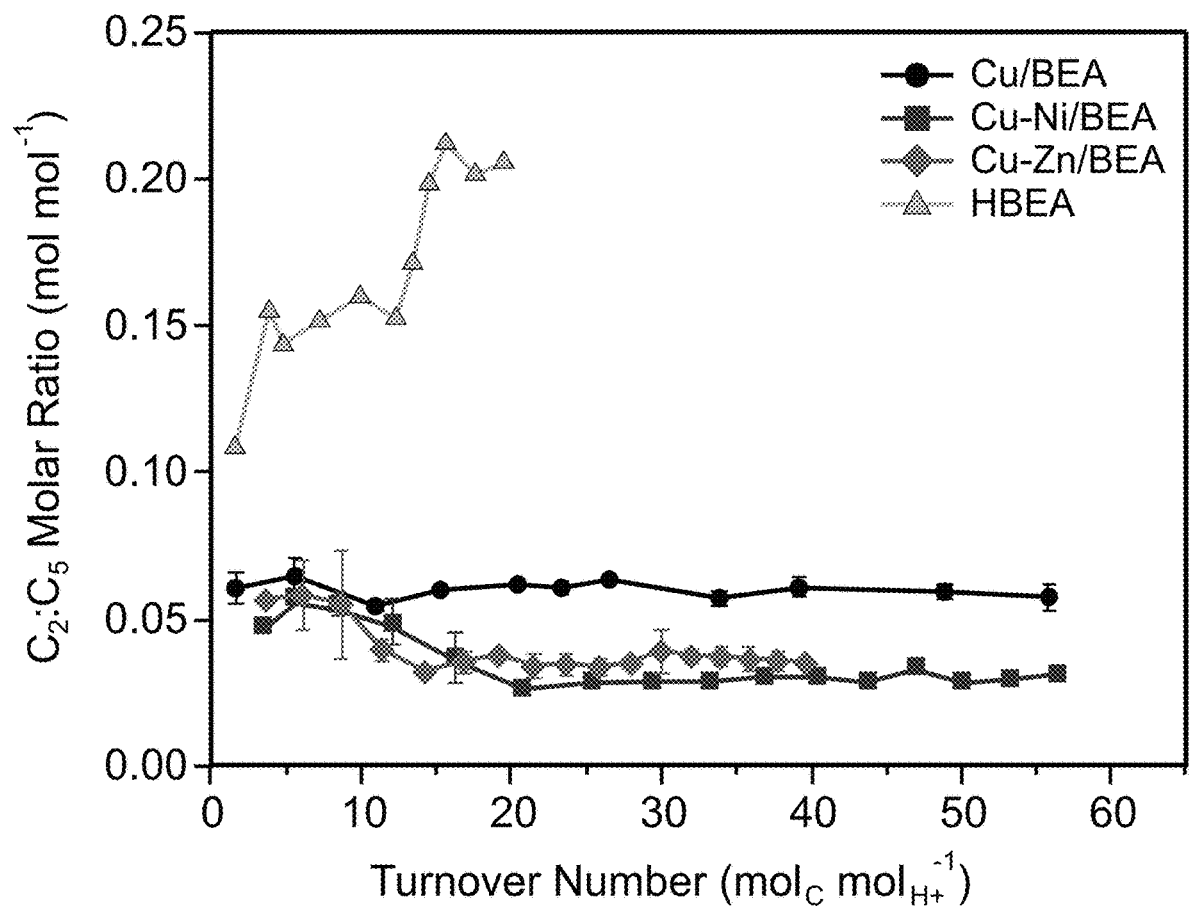
FIG. 8A illustrates the ratio of $C_2$ (i.e., ethane and ethylene) to $C_5$ (e.g., 2-methylbutane, 2-methylbutene) hydrocarbons versus TON as a measure of the relative propagation of the olefin and aromatics cycles, according to some embodiments of the present disclosure.
Figure 8B:
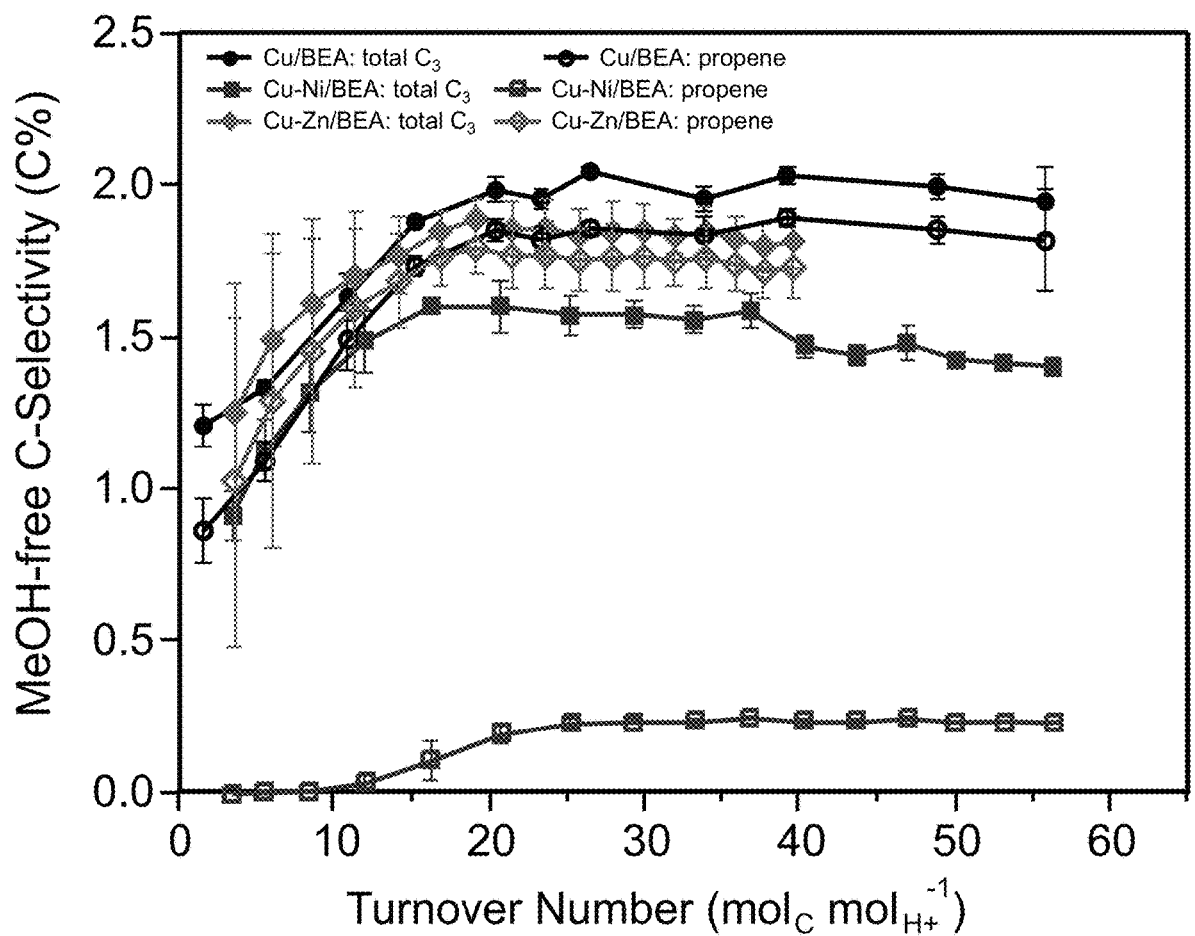
FIG. 8B illustrates methanol-free selectivity to $C_3$ hydrocarbons (filled symbols) and propene (empty symbols) as a function of TON, according to some embodiments of the present disclosure. Reaction conditions were 200° C., 103 kPa, DME WHSV of ca. 2.2 $h^{-1}$, $p_{DME}$ and $p_{H2}$ each ca. 47 kPa, remainder $p_{Ar}$. Error bars for Cu/BEA data are presented as the SEM calculated from replicate experiments (n≥3). Error bars for Cu—Ni/BEA and Cu—Zn/BEA data are presented as the range from two replicate experiments (n=2).

The methanol-free $C_{5-8}$ (e.g., isopentane, 2-methyl-2-butene, 3-methylpentane, 2,2-dimethylbutane, 2,3-dimethylbutane, 2,2,3,-trimethylbutane, 2,4-dimethylpentane, 2,3-dimethylpentane, and/or 2-methylhexane) product carbon-selectivity stabilized at ca. 50 C % for each catalyst after 25 turnovers (see FIG. 6A), corresponding to between about 4 hours and 7 hours TOS (see FIG. 7). Comparable methanol-free product carbon-selectivity at a TON of 42 mol$_C$ mol$_{H+}^{-1}$ was observed for the three catalysts, and was consistent with the high selectivity for $C_4$ and $C_7$ (e.g., isobutane, 2,2,3-trimethylbutane, 2,3,-dimethylpentane, and/or 2-methylhexane) that is characteristic for DME homologation over BEA and Cu/BEA (see FIG. 6B). Products having carbon numbers greater than $C_8$ (e.g., 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,5-dimethylhexane, n-octane, 1,3-dimethylcyclohexane, 1,4-dimethylcyclohexane, trimethylcyclohexanes, tetramethylcyclohexanes, 2,2,3-trimethylpentane, 2,3,3-trimethylpentane, 2,3,4-trimethylpentane, 2,2,4-trimethylpentane, dimethylheptanes, tetramethylpentanes, trimethylheptanes, and/or tetramethylhexanes) were investigated, and the production of naphthenes (i.e., cycloalkanes and/or alkylated cycloalkanes such as methylated cyclohexane) over all three catalysts was observed. These heavy cyclic products can be attributed to cyclization reactions of dienes with mono-olefins followed by hydrogenation (e.g., Diels-Alder reactions), intramolecular cyclizations of long-chain trienes followed by hydrogenation, and/or hydrogenation of aromatic intermediates such as hexamethylbenzene, which is the only aromatic product observed in this chemistry over BEA zeolite catalysts. The observed 11% to 18% of naphthene products are predominantly $C_{8+}$ cyclic products (i.e., $C_{5-8}$ cyclic fraction was less than 5% C of the total cyclic product selectivity for all catalysts). The consistent $C_{5-8}$ selectivities exhibited by all catalysts suggests that the fundamental hydrocarbon pool chemistry is largely unchanged over these bimetallic catalysts. Based on the similar selectivities exhibited by the catalysts at TON of ca. 42 $mol_C$ $mol_{H+}^{-1}$ and the absence of a direct correlation between $C_{5-8}$ selectivity or P:O ratio with conversion (see FIGS. 8A and 8B), the HOG product P:O ratio was explored in the context of the relative hydrogenation and dehydrogenation activity of the catalysts.

Figure 9:
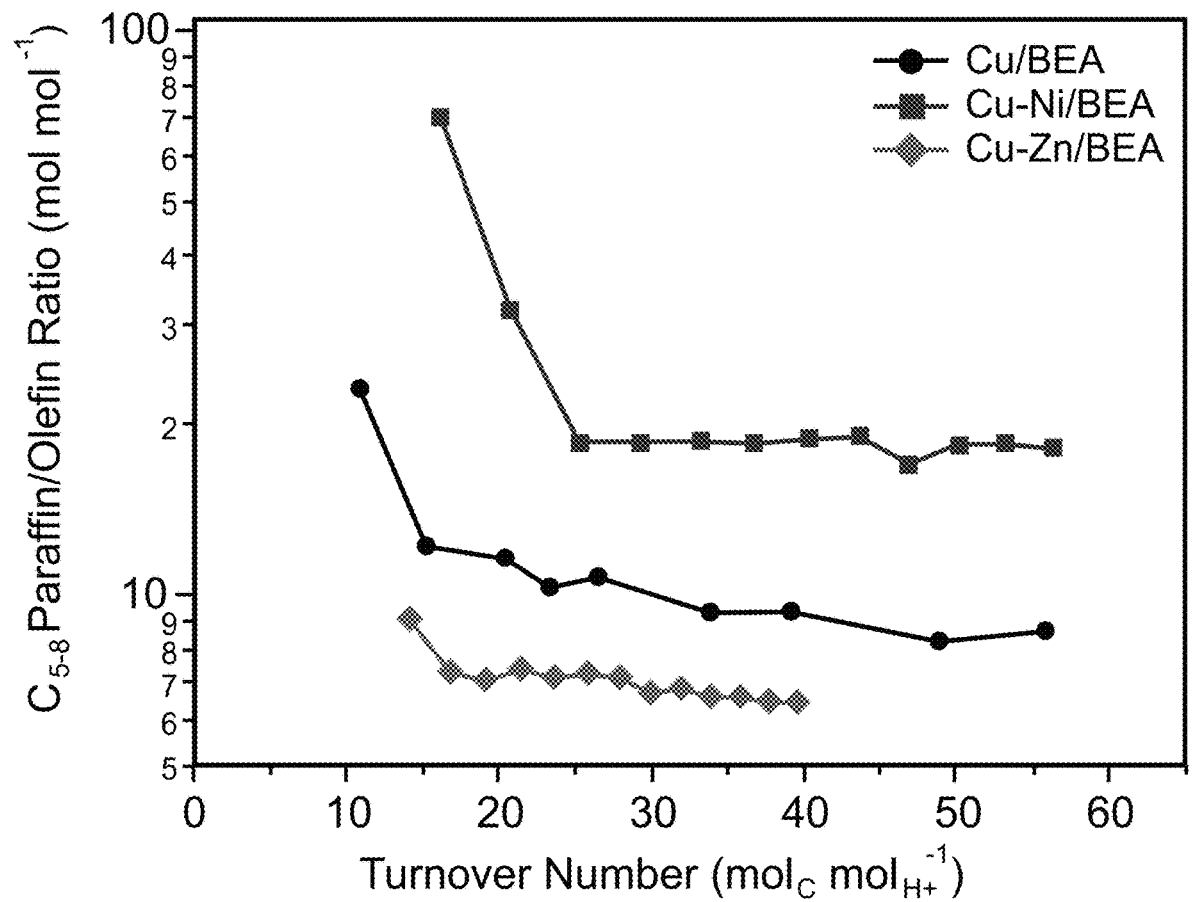
FIG. 9 illustrates the paraffin:olefin ratio (mol $mol^{-1}$) for high-octane-range (HOG-range) $C_{5-8}$ hydrocarbons as a function of turnover number, according to some embodiments of the present disclosure. Reaction conditions were 200° C., 103 kPa, DME WHSV of ca. 2.2 $h^{-1}$, $p_{DME}$ and $p_{H2}$ each ca. 47 kPa, remainder $p_{Ar}$. Error bars for Cu/BEA data are presented as the SEM calculated from replicate experiments (n≥3). Error bars for Cu—Ni/BEA and Cu—Zn/BEA data are presented as the range from two replicate experiments (n=2).

The P:O ratio (mol mol$^{-1}$) (paraffin:olefin ration) for the HOG-range ($C_{5-8}$ hydrocarbons) is presented in FIG. 9 as a function of TON. The P:O ratio stabilized after the initial break-in period of between about 15 and 20 turnovers, giving 19.0, 9.2, and 6.5 mol mol$^{-1}$ at TON of 42 for Cu—Ni/BEA, Cu/BEA, and Cu—Zn/BEA, respectively. The increased paraffin content over Cu—Ni/BEA versus Cu/BEA may be attributed to greater hydrogenation activity at the reduced Ni and Cu—Ni alloys. Despite the increased dehydrogenation activity exhibited by ionic Ni versus ionic Cu in the isobutane dehydrogenation probe reaction, metallic Ni-based hydrogenation activity appears to have a greater effect on the resulting product slate in DME homologation. This analysis is supported by the >150-fold increase in ethylene hydrogenation rate exhibited by Cu—Ni/BEA compared to Cu/BEA and Cu—Zn/BEA (see FIG. 4). Considering the comparable ethylene hydrogenation rates demonstrated by Cu/BEA and Cu—Zn/BEA, the decreased P:O ratio exhibited by Cu—Zn/BEA is attributed to enhanced dehydrogenation activity at the ionic Zn sites, consistent with the results from the isobutane probe reaction. Compared to Cu/BEA, Cu—Ni/BEA and Cu—Zn/BEA demonstrate shifts in net hydrogenation and dehydrogenation activity, resulting in hydrocarbon products with markedly different P:O ratios (i.e., 19.0 versus 6.5 mol mol$^{-1}$, respectively). Importantly, this was accomplished without requiring a separate unit operation or a mixed catalyst bed (e.g., Cu/BEA mixed with an additional hydrogenation or dehydrogenation catalyst).

Liquid products were not isolated at the volumes necessary for ASTM-type fuel property testing, however, the RON, MON, and corresponding S value were calculated using the method reported by Ghosh et al. (*Ind. Eng. Chem. Res.* 2006, 337). As used herein, a "research octane number" or RON is an experimentally-determined number obtained by running fuel in a test engine at 600 rpm with a variable compression ratio under controlled conditions, and the results are compared to those for mixtures of isooctane (RON=100) and n-heptane (RON=0). During the test the compression ratio is varied to challenge the fuel's anti-knocking tendency—increased compression ratio will require a higher octane fuel to prevent knocking. As used herein, a "motor octane number" or MON is an experimentally-determined number obtained by running a test engine at 900 rpm. This test preheats the fuel mixture and uses variable ignition timing to determine knock resistance.

Figure 10:
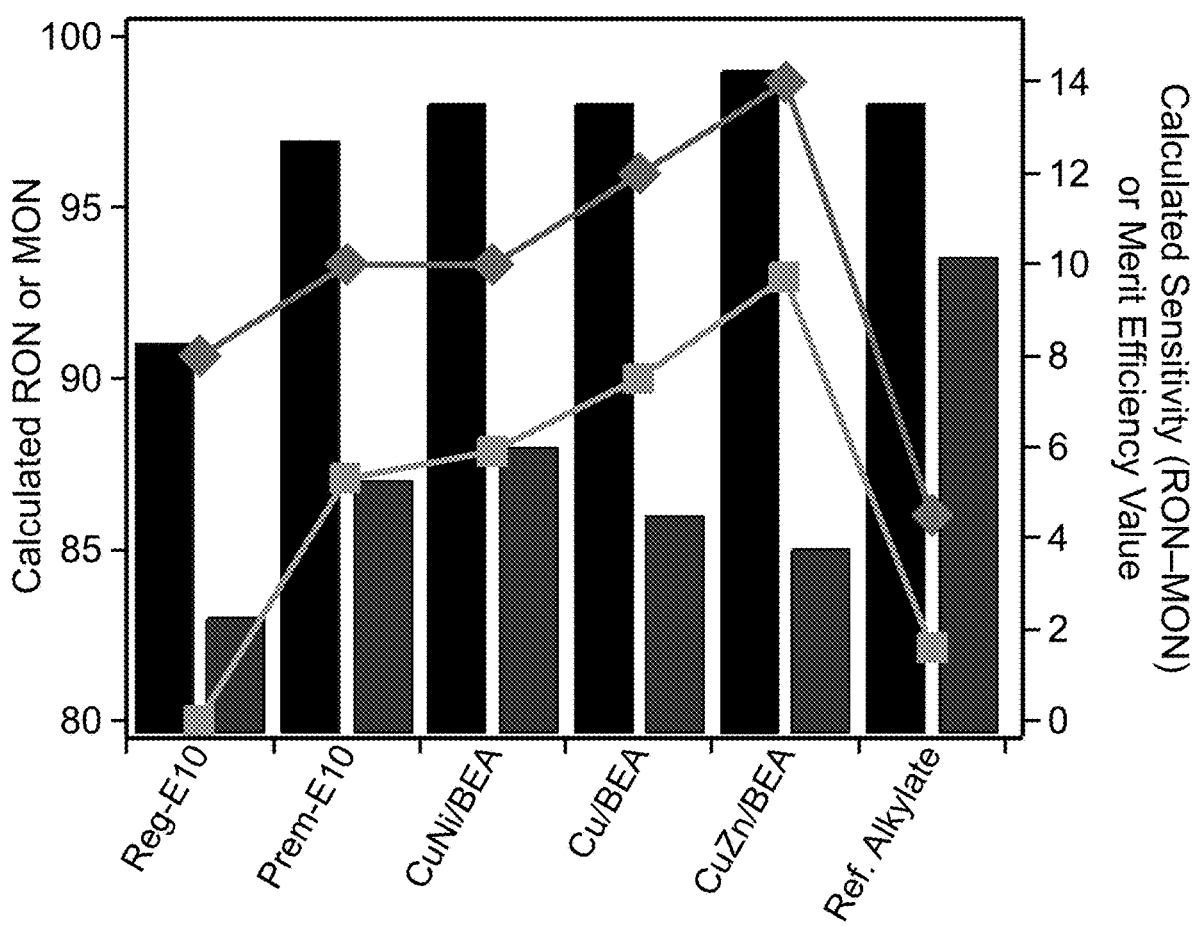
FIG. 10 illustrates calculated research octane numbers (RON), motor octane numbers (MON), S (S=RON-MON), and merit efficiency function values for the $C_{5-8}$ hydrocarbon products over Cu/BEA and bimetallic catalysts compared against regular-E10 and premium-E10 gasolines used in the U.S. Data reported at TON of ca. 42 for each catalyst, according to some embodiments of the present disclosure.

These calculations were performed on the $C_{5-8}$ product mixture at the TON of ca. 42 $mol_C$ $mol_{H+}^{-1}$. This selected $C_{5-8}$ product mixture represents the HOG product from a conceptual distillation to separate light species (e.g., unreacted DME and $H_2$, $C_{1-4}$ products) and heavy species (e.g., $C_{8+}$ naphthenes) from the desired $C_{5-8}$ products (see FIG. 1). The values are presented in FIG. 10 and compared with two gasoline benchmarks—regular U.S. gasoline (Reg-E10) and premium U.S. gasoline (Prem-E10) both containing 10 vol % ethanol. The products from each catalyst demonstrated high RONs in a range between about 98 and about 99, exceeding that of premium fuel (having a value of about 97), thus highlighting the desirable high-octane nature of this fuel product compared to a traditional MTG product that resembles regular gasoline, which has a RON value of about 91. The MONs for the HOG products decreased with decreasing P:O ratio (i.e., increasing olefin content), from about 88 for Cu—Ni/BEA to about 87 for Cu/BEA and about 85 for Cu—Zn/BEA. The corresponding S values increased from about 10 to a range between about 12 and about 14. For Cu—Ni/BEA, the product has the same S as premium fuel, but with a higher RON and MON. For Cu—Zn/BEA, the product has a notably higher S of about 14, and maintains a high RON (about 99).

The importance of both high RON and high S is further contextualized using the recently developed gasoline merit efficiency function. This metric quantifies the increased efficiency for a gasoline fuel in a spark-ignition engine compared to Regular-E10 gasoline (see NREL report NREL/TP-5400-67584). For example, the higher RON and S of Premium-E10 fuel versus Regular-E10 results in a merit value of 5.3 (see FIG. 10, Table 4), corresponding to a ~5.3% increase in engine efficiency. The product from Cu—Ni/BEA has a RON that is 1 unit greater than Premium-E10 with the same S, giving a slightly greater efficiency value of 5.9. The higher S values for the products from Cu/BEA (about 12) and Cu—Zn/BEA (about 14) result in efficiency values of about 7.5 and about 9.7, respectively. These increased merit values highlight the fuel efficiency benefit from increasing S in a high RON mixture, rather than focusing solely on increasing the RON.

TABLE 4

Merit efficiency function values calculated using Equation 1 for the $C_{5-8}$ HOG product taken at TON = 42 ± 2 for each catalyst compared to that for Premium-E10 gasoline. Merit Efficiency Function Value

| | |
|---|---|
| Regular-E10 | 0 |
| Premium-E10 | 5.3 |
| Cu—Ni/BEA | 5.9 |
| Cu/BEA | 7.5 |
| Cu—Zn/BEA | 9.7 |

Among other things, some embodiments of the present disclosure relate to mixtures, for example fuels and/or crude mixtures that may be processed to produce fuels, that include at least one of the following compositional properties (Reference numerals refer to the streams illustrated in FIG. 1):

a ratio of [ethane+ethene]/[isopentane+isopentene] of less than about 0.15 on a molar basis (intermediate stream 115A);

a content of aromatics (not including hexamethylbenzene) of less than about 1 wt % (light compounds 142, HOG 146, and jet fuel 148);

a content of iso-paraffins between about 65 wt % and about 95 wt %, inclusively (crude product 137);

a content of mononaphthenes between about 2 wt % and about 20 wt %, inclusively (crude product 137);

a content of normal paraffins of less than about 1.5 wt % (crude product 137, HOG 146, 144 heavy aromatic compounds, and 148 jet fuel);

a content of naphthalenes of less than about 0.2 wt % (crude product 137);

a ratio of 2,2,3-trimethylbutane:2,4-dimethlypentane of greater than about 10:1 on a weight basis (crude product 137 and HOG 146);

a ratio of 2,2,3-trimethylbutane:2-methylhexane of greater than about 7:1 on a weight basis (crude product 137 and HOG 146);

the simultaneous presence of isopentane, 2,3-dimethylbutane, 2-methylpentane, 3-methylpentane, 2,4-dimethylpentane, 2,2,3-dimethylbutane, 2-methylhexane, 3-methylhexane, 2,2,4-trimethylpentane, 2,2,3-trimethylpentane, 2,5-dimethylhexane, 2,4-dimethylhexane, 2,3,4-trimethylpentane, 2,3-dimethylhexane, 2,2,5-trimethylhexane, and 2,2,4-trimethylheptane (crude product 137);

the presence of methylated cyclohexanes with carbon numbers from $C_7$ to $C_{12}$ (crude product 137 and jet fuel 148);

the absence of hydrocarbons with carbon number >$C_{13}$ at concentrations of greater than about 0.05 wt % (crude product 137, light compounds 142, HOG 146, and jet fuel 148); and the presence of hexamethylbenzene (crude product 137 and heavy aromatic compounds 144).

In some embodiments of the present disclosure, distilling the crude mixture may result in a fuel mixture having a research octane number greater than about 100 and a motor octane number greater than about 95. For example, distilling a crude mixture using a batch-type spinning band distillation system, operated at atmospheric pressure, with a reflux condenser held at 10° C. to remove all components that exist as vapor in the still head at temperatures below 70° C. and above 82° C. (i.e., keep the fraction between 70° C. and 82° C.), the resultant fuel mixture may have a research octane number (RON) greater than about 100 and a motor octane number (MON) greater than about 95.

Experimental:

General. Beta zeolite (BEA) having a $SiO_2$:$Al_2O_3$ ratio of 27 was obtained in ammonium form from Tosoh and had a particle/agglomerate size range of 45-125 µm. It was calcined under flowing air at 550° C. to give the proton-form. DME was purchased from Sigma-Aldrich. UHP $H_2$ and UHP Ar were purchased from General Air and the 1% isobutane/Ar was purchased from Airgas. All gases were used as received. All volumetric flow rates are given at NTP (20° C., 101.3 kPa), and all pressures are absolute.

Catalyst preparation. Catalysts for isobutane dehydrogenation experiments were prepared by aqueous ion-exchange of H-form BEA (0.99 g) with $Cu(NO_3)_2 \cdot 2.5H_2O$ (0.061 g), $Ni(NO_3)_2 \cdot 6H_2O$ (0.077 g) or $Zn(NO_3)_2 \cdot 6H_2O$ (0.077 g) in 40 mL of deionized water. The suspension was stirred for 2-3 hours at room temperature, followed by isolation of the material via centrifugation at 7500 rpm for 3 minutes, and rinsing with 30 mL of deionized water. These materials are termed IE-M/BEA. Cu/BEA was prepared as previously described, having 4.3 wt % Cu via an incipient wetness procedure. Bimetallic catalysts were prepared analogously to Cu/BEA, via aqueous incipient-wetness of IE-M/BEA catalysts with $Cu(NO_3)_2 \cdot 2.5H_2O$. All catalysts were calcined ex situ in a box furnace at 500° C. (2° C. min$^{-1}$ ramp rate) with flowing air for at least 6 hours prior to loading into the reactor.

Isobutane dehydrogenation. Isobutane dehydrogenation activity was evaluated using a packed bed reactor system. Pre-oxidized catalyst (ca. 360 mg), diluted with inert silicon carbide (ca. 5.4 g), was loaded in the isothermal zone of a stainless steel tubular packed bed reactor while being supported by quartz chips and quartz wool. The catalyst was heated to 300° C. (at 2° C. min$^{-1}$) in Ar (5 cm$^3$ min$^{-1}$) and dried for at least 2 h. Subsequently, the catalyst was exposed to 1% isobutane/Ar (25 cm$^3$ min$^{-1}$) at 300° C. and 195 kPa for >8 h while analytical samples were collected. The WHSV of isobutane was 0.10 $g_{isobutane}$ $g_{cat}^{-1}$ h$^{-1}$, and the isobutane partial pressure was 84 kPa. Prior report from our group has demonstrated that $Cu^{2+}$ species are rapidly converted to $Cu^{1+}$ during isobutane conversion, and that reductive pre-treatment of IE-Cu/BEA does not affect its $H_2$ STY for isobutane dehydrogenation. Reactor inlet lines were heated to 150° C. to preheat influent gases and outlet lines were heated to 200° C. to prevent condensation of hydrocarbons. The gas composition was quantified using an Agilent 7890 GC equipped with a flame ionization detector for analysis of oxygenates and hydrocarbons and two thermal conductivity detectors for analysis of permanent gases and water. GC response factors for reactants and products were calibrated using traceable gravimetric gas standards. The $H_2$ site time yield (STY, in mol$_{H2}$ mol$_M^{-1}$ s$^{-1}$) was calculated according to Equation 1:

$$STY_{H2} = \frac{\dot{n}_{H2}}{m_M} \quad (1)$$

where $\dot{n}_{H2}$ is the molar formation rate of $H_2$ normalized by total catalyst mass and mm is the metal loading of M (i.e., Zn, Ni or Cu) normalized by total catalyst mass, taken from Table 3B.

Ethylene Hydrogenation. Ethylene hydrogenation activity was evaluated using a fixed bed reactor system with co-fed $H_2$. Pre-oxidized catalyst (ca. 360 mg), diluted with inert silicon carbide (ca. 5.4 g), was loaded in a quartz tube reactor, supported by quartz wool with a thermocouple to monitor and control reactor temperature positioned at the top of the catalyst bed. The catalyst was heated to 300° C. (at 2° C. min$^{-1}$) in Ar (5 cm$^3$ min$^{-1}$) and dried for at least 2 h. Subsequently, the catalyst was exposed to 2.5% ethylene/He (25 cm$^3$ min$^{-1}$) at 100° C. and 195 kPa for >7 h while analytical samples were collected. The WHSV of ethylene was 7.0 $g_{ethylene}$ $g_{cat}^{-1}$ h$^{-1}$, with $p_{ethylene}$=2 kPa, and $p_{H2}$=20 kPa, with the remainder $p_{He}$. Reactor system lines heated to >100° C. to preheat influent gases and prevent condensation of effluent products. The gas composition was quantified using an Agilent 490 Micro GC equipped with four thermal conductivity detectors for analysis of oxygenates, hydrocarbons, permanent gases and water. GC response factors for reactants and products were calibrated using traceable gravimetric gas standards. The ethylene conversion ($X_{ethylene}$), ethane production rate ($r_{ethane}$), and ethane selectivity ($S_{ethane}$) were calculated according to Equations 2-4, respectively:

$$X_{ethylene} = \frac{\dot{n}_{ethylene,in} - \dot{n}_{ethylene,out}}{\dot{n}_{ethylene,in}} * 100\% \quad (2)$$

$$r_{ethane} = \frac{\dot{n}_{etane,out}}{m_{cat}} * 100\% \quad (3)$$

$$S_{ethane} = \frac{\dot{n}_{ethylene,out}}{\dot{n}_{ethylene,in} - \dot{n}_{ethylene,out}} * 100\% \quad (4)$$

where $\dot{n}_{ethylene,in}$ and $\dot{n}_{ethylene,out}$ are the molar flow rate of ethylene in and out of the reactor, respectively and $\dot{n}_{ethane,out}$ is the flow rate of ethane out of the reactor. Molar flow rates are in mol s$^{-1}$. The m$_{cat}$ is the total catalyst mass loading (in grams).

DME homologation. Pre-oxidized catalyst powders were pressed (22 kN), crushed in a porcelain mortar and pestle, and sieved to 212-300 μm (50-70 mesh). The catalyst (0.325 g) was diluted with ca. 5.3-5.8 g low surface-area, inert silicon carbide to achieve a constant catalyst bed volume, and to minimize channeling, axial dispersion, and temperature gradients in the bed. Catalysts were loaded into a 7.9 mm ID stainless-steel tubular reactor and positioned within the isothermal zone using quartz chips and quartz wool. A four-point thermocouple positioned within the catalyst bed was used to monitor reaction temperature. The reaction temperature during an experiment was maintained within ±0.5° C. of the set point. The catalyst was reduced in flowing H$_2$ at 25 cm$^3$ min$^{-1}$ for at least 3 hours at 300° C. before cooling to 200° C. Immediately following the reduction, the catalyst was exposed to the reaction mixture, and reactor outlet gas sampling began. In all experiments, the DME WHSV was ca. 2.2 g$_{DME}$-g$_{cat}^{-1}$-h$^{-1}$ (referred to as h$^{-1}$). The reaction gas flow rates were 6.1, 6.1, 1.0 cm$^3$ min$^{-1}$ for DME, H$_2$, Ar, respectively, where Ar was used as an internal standard. Time-on-stream (TOS) is defined as the cumulative time elapsed from the start of DME flow. The gas composition at the inlet of the reactor was quantified at the conclusion of each experiment. Reactor inlet and outlet gases were sampled through heated (170° C.) lines with an Agilent 7890 GC instrument equipped with a flame ionization detector for analysis of oxygenates and hydrocarbons and two thermal conductivity detectors for analysis of permanent gases. GC responses for reactants and products were calibrated using traceable gravimetric gas standards. Catalyst performance was evaluated from inlet flow and GC measurements using Ar as an internal standard. TON values are reported as the cumulative mol of carbon in hydrocarbon products per mol of Brønsted acid sites in the reactor at each time point, as represented in Equation 5:

$$\text{TON}(t) = \frac{1}{N_{H+}} \int_0^t dt'\, n_c(t') \quad (5)$$

there t is TOS in h, N$_{H+}$ is the moles of Brønsted acid sites, and n$_c$(t') is the total carbon incorporated (mol carbon h$^{-1}$) in all products except methanol, carbon monoxide and carbon dioxide at time t'. The net C$_1$ conversion, X (in carbon %), was calculated according to Equation 6 based on the hydrocarbon product formation rate, the methanol formation rate, and the inlet DME molar flow rate:

$$X = \frac{\dot{n}_{C,HC-products} - \dot{n}_{C,MeOH}}{\dot{n}_{C,DME,in}} * 100\% \quad (6)$$

where $\dot{n}_{C,DME,in}$, $\dot{n}_{C,HC-products}$, and $\dot{n}_{C,MeOH}$ represent the molar flow rates of carbon (mol$_C$ s$^{-1}$) in DME, hydrocarbon products, and methanol, respectively. The methanol-free product carbon selectivity, S$_i$(in carbon %), was calculated via Equation 7:

$$S_i = \frac{\dot{n}_{c,i}}{\sum \dot{n}_{c,i}} * 100\% \quad (7)$$

where $\dot{n}_{C,i}$ represents the effluent molar flow rate of carbon in individual products (mol s$^{-1}$), excluding methanol. Data for Cu/BEA is reported as the mean of at least 3 independent experiments. The standard error of the mean (SEM) was included as error bars in data figures and was calculated via Equation 8:

$$SEM = \frac{\sigma}{\sqrt{n}} \quad (8)$$

where σ is the standard deviation, and n is the number of data points used in the reported mean. For data at TON=ca. 42 (i.e., FIGS. 5 and 7), an average of 4 independent experiments were used (n=4), and for all other DME homologation data n≥3, for each data point. The maximum standard error across all reported Cu/BEA data points for TON was 3.23, for net C$_1$ conversion was 0.69%, for methanol-free product carbon selectivity was 1.5%, and for C$_{5-8}$ P:O ratio was 7.35. Experiments with Cu—Ni/BEA and Cu—Zn/BEA are reported as the mean of 2 independent experiments. The standard error was not calculated for these data. Errors bars for these Cu—Ni/BEA and Cu—Zn/BEA data represent the range of the two data points used to calculate the mean.

Fuel compositions: Crude product that may be used as fuels themselves and/or processed to produce fuel mixtures may be produced as described herein, using some embodiments of the zeolite catalysts and methods described above. For example, crude product sample (with sample no. 6776-026-05) was synthesized using a 5 wt % Cu/BEA extrudate catalyst, the extrudate being ⅛" diameter cylinders of average length between 1 cm and 2 cm, consisting of the BEA zeolite and alumina binder. This exemplary catalyst was loaded into a 1.5 inch schedule 40 tube that was 154 inches long and contacted with flowing hydrogen gas at 300° C. for several hours to activate the catalyst. The reactor tube temperature was maintained by circulating hot oil across the exterior surface of the reactor tube, with the oil temperature maintained by a thermostatic bath. A mixture of hydrogen and dimethyl ether (DME) were then directed to the reactor at ratios (H$_2$ to DME) of 0.70, 0.85, and 1.00, temperatures of 200° C., 205° C., and 210° C., pressures of 100 psig, 105 psig, and 110 psig, and space velocities of 184 standard liters of gas per kilogram catalyst per hour (SL/kg/hr), 368 SL/kg/hr, 767 SL/kg/hr, 920 SL/kg/hr, 1074 SL/kg/hr, and 1290 SL/kg/hr for a total of about 35 hours prior to collecting the crude product (sample no. 6776-026-05). During liquid collection the catalyst was operated at 210° C., 110 psig, 0.7 hydrogen to dimethyl ether, and 1444 standard liters of gas per kilogram catalyst per hour for 8.5 hours followed by operation at 210° C., 105 psig, 1.0 hydrogen to dimethyl ether, and 767 SL/kg/hr for 4.9 h, generating a total of 828 mL of the liquid hydrocarbon crude product. This crude product example is representative of the lowest octane, highest mono-naphthene, lowest iso-paraffins crude product fuel synthesized to date and represents the low end of high octane gasoline fuel compositions and high end of jet/kerosene fuel compositions. Table 5 below summarizes the compound types (e.g. paraffins, iso-paraffins, aromatics, etc.) making up crude product sample no. 6776-026-05 (corresponding to crude product 137 in FIG. 1) as determined by GC using a flame ionization detector (FID). These compound types of crude product sample no. 6776-026-05 values are summarized graphically in FIG. 11. The specific components identified by GC in crude product sample no. 6776-026-05 are summarized in Table 12 provided below. Note that all values in the following tables report compositions in weight percent as determined by ASTM D6730-01R16.

TABLE 5

Crude Product Sample No. 6776-026-05 Composition Summary (wt %)

| CARBON# | Paraffin | I-Paraffins | Aromatics | Naphthenes | Olefins | Oxygenates | TOTAL |
|---|---|---|---|---|---|---|---|
| 1 | — | — | — | — | — | 0.111 | 0.111 |
| 2 | — | — | — | — | — | 0.203 | 0.203 |
| 3 | — | — | — | — | — | — | 0.000 |
| 4 | — | — | — | — | — | — | 0.000 |
| 5 | — | 0.043 | — | — | — | — | 0.043 |
| 6 | 0.011 | 0.747 | 0.010 | 0.026 | — | — | 0.795 |
| 7 | 0.035 | 33.177 | 10.299 | 0.614 | — | — | 44.125 |
| 8 | 0.028 | 10.682 | 0.032 | 2.059 | — | — | 12.800 |
| 9 | 0.191 | 10.913 | 0.564 | 5.636 | 0.562 | — | 17.865 |
| 10 | 0.256 | 7.040 | 0.035 | 6.380 | 0.470 | — | 14.181 |
| 11 | 0.023 | 1.443 | — | 2.891 | 0.098 | — | 4.455 |
| 12 | — | 0.109 | 0.287 | 1.186 | — | — | 1.582 |
| 13 | — | — | — | 0.187 | — | — | 0.187 |
| 14 | — | — | — | — | — | — | 0.000 |
| 15 | — | — | — | — | — | — | 0.000 |
| TOTAL | 0.544 | 64.155 | 11.227 | 18.978 | 1.129 | 0.315 | 96.347 |

Another liquid crude product, corresponding to crude product 137 in FIG. 1 (sample no. 6776-031-16), was synthesized using a 10 wt % Cu/BEA extrudate catalyst, the extrudate being ⅛" diameter cylinders of average length between 1 cm and 2 cm, consisting of the BEA zeolite and alumina binder. The catalyst was loaded into a 1.5 inch schedule 40 tube that was 154 inches long and activated with flowing hydrogen gas at 300° C. for several hours. The reactor tube temperature was maintained by circulating hot oil across the exterior surface of the reactor tube, with oil temperature maintained by a thermostatic bath. A mixture of $H_2$ and DME were fed to the reactor at a ratio of 0.7, temperature of 230° C., pressure 110 psig, and 1434 SL/kg/hr for approximately 79 hours to produce 1372 mL of liquid hydrocarbon crude product, followed by 704 SL/kg/h for approximately 68 hours to produce 2343 mL of liquid hydrocarbon crude product, followed by 518 SL/kg/h for approximately 21 h to produce 938 mL of liquid hydrocarbon crude product. This last liquid crude product sample is representative of the highest octane, lowest mono-naphthene, highest iso-paraffins crude product synthesized to date and represents the high end of high octane gasoline fuel compositions and the low end of jet/kerosene fuel compositions. Liquid crude product samples 6776-026-05 and 6776-031-16 were combined resulting in a single crude product fuel mixture. Table 6 below summarizes the compound types making up crude product sample no. 6776-031-16 as determined by GC using a flame ionization detector (FTD). These compound types are summarized graphically in FIG. 12. The specific components identified by GC in crude product sample no. 6776-031-16 are summarized in Table 13 provide below.

TABLE 6

Crude Product Sample No. 6776-031-16 Composition Summary (wt %)

| CARBON# | Paraffin | I-Paraffins | Aromatics | Naphthenes | Olefins | Oxygenates | Plus | TOTAL |
|---|---|---|---|---|---|---|---|---|
| 1 | — | — | — | — | — | 1.447 | — | 1.447 |
| 2 | — | — | — | — | — | 1.676 | — | 1.676 |
| 3 | — | — | — | — | — | — | — | 0.000 |
| 4 | — | — | — | — | — | — | — | 0.000 |
| 5 | 0.067 | 3.238 | — | — | — | — | — | 3.304 |
| 6 | 0.032 | 6.209 | — | 0.050 | — | — | — | 6.290 |
| 7 | — | 81.962 | 0.809 | 0.060 | — | — | — | 82.831 |
| 8 | — | 2.878 | — | 0.034 | — | — | — | 2.912 |
| 9 | — | 1.143 | — | 0.123 | — | — | — | 1.265 |
| 10 | — | 0.235 | — | — | — | — | — | 0.235 |
| 11 | — | — | — | — | — | — | — | 0.000 |
| 12 | — | — | — | — | — | — | — | 0.000 |
| 13 | — | — | — | — | — | — | — | 0.000 |
| 14 | — | — | — | — | — | — | — | 0.000 |
| 15 | — | — | — | — | — | — | — | 0.000 |
| TOTAL | 0.098 | 95.664 | 0.809 | 0.266 | 0.000 | 3.123 | 0.000 | 99.960 |

Crude product mixtures, which may be utilized as fuels themselves, may be processed to form refined fuels as described herein. For example, the combined liquid crude product sample described above was distilled batch-wise in 250-1000 mL aliquots using a B&R micro spinning band distillation system. The crude product was heated to boiling (starting at about 55° C. at the start of the experiment and ending at about 250° C. at the end of the experiment) in a round-bottom glass kettle using an electric heating mantle. Vapors traveled vertically up through a vapor-liquid contacting column to a reflux condenser, maintained at 10° C. to condense vapors back to liquid. The outlet of the condenser was open to atmosphere, allowing the condensed liquids to drip back toward the vapor-liquid contacting column via gravity, and allowing the system to remain at atmospheric pressure. A screw-type PTFE band was rotated within the vapor-liquid contacting column at thousands of RPM to force condensed vapors (liquids) back to the kettle. In doing so, the condensed vapors contacted rising vapors from the kettle to achieve vapor-liquid equilibrium. A thermocouple placed in the column head was used to indicate the vapor liquid equilibrium temperature. Kettle temperatures of about 55° C. to about 250° C. resulted in equilibrated column head temperatures of about 65° C. to about 180° C. A sample valve periodically removed condensed vapors from the column head into a sample container, with the sample rate controlled to maintain a nominal 20:1 reflux ratio (20 volumes of liquid returned to the column for every volume of liquid removed as sample).

In some embodiments of the present disclosure, fuel mixtures, e.g. gasoline samples, were obtained from the combined crude product mixture described above by first removing all compounds boiling at less than 70° C. (adjusted to atmospheric pressure at mean sea level) and setting it aside. Gasoline product was then collected from 70 to 82° C. All aliquots of crude products were distilled in this way and all gasoline fractions combined into a single sample: sample no. 6776-044-12-W. The RON and MON of the resultant liquid mixture was estimated to be 108.1 and 96.7, respectively. In addition, RON was also determined via ASTM-D2699: Standard Test Method for Research Octane Number of Spark-Ignition Engine Fuel, yielding a value of 105. MON was also determined via ASTM-D2700: Standard Test Method for Motor Octane Number of Spark-Ignition Engine Fuel, yielding a value of 97. Sample no. 6776-044-12-W represents a refined high octane gasoline composition (high octane gasoline 146 in FIG. 1). Table 7 below summarizes the compound types making up high octane gasoline sample no. 6776-044-12-W as determined by GC using a flame ionization detector (FID). The specific components identified by GC in high octane gasoline sample no. 6776-044-12-W are summarized in Table 14 provided below.

TABLE 7

High Octane Gasoline Sample No. 6776-044-12-W Composition Summary (wt %)

| CARBON# | Paraffin | I-Paraffins | Aromatics | Naphthenes | Olefins | Oxygenates | TOTAL |
|---|---|---|---|---|---|---|---|
| 1 | — | — | — | — | — | — | 0.000 |
| 2 | — | — | — | — | — | — | 0.000 |
| 3 | — | — | — | — | — | — | 0.000 |
| 4 | — | — | — | — | — | — | 0.000 |
| 5 | 0.033 | 1.640 | — | — | 0.007 | — | 1.680 |
| 6 | 0.097 | 13.083 | — | 0.317 | — | — | 13.497 |
| 7 | 0.007 | 84.100 | 0.029 | 0.462 | — | — | 84.597 |
| 8 | — | 0.207 | — | 0.012 | — | — | 0.219 |
| 9 | — | 0.007 | — | — | — | — | 0.007 |
| 10 | — | — | — | — | — | — | 0.000 |
| 11 | — | — | — | — | — | — | 0.000 |
| 12 | — | — | — | — | — | — | 0.000 |
| 13 | — | — | — | — | — | — | 0.000 |
| 14 | — | — | — | — | — | — | 0.000 |
| 15 | — | — | — | — | — | — | 0.000 |
| TOTAL | 0.137 | 99.036 | 0.029 | 0.791 | 0.007 | 0.000 | 100.000 |

To show the ability to further increase the octane value of resultant processed fuels, (e.g. gasoline), a single aliquot of gasoline was produced from the combined crude product mixture described above, again by first removing all compounds boiling at less than 70° C. (adjusted to atmospheric pressure at mean sea level) and setting those materials aside, followed by collecting condensed distillate at a distillation temperature of 76.0° C. (e.g. midpoint in the 70 to 82° C. range) (sample no. 6776-077-17). Analysis of 6776-077-17 provided an estimate for RON of 112.5 and an estimate for MON of 99.0. Sample no. 6776-077-17 represents the highest octane refined high-octane gasoline composition to date. Table 8 below summarizes the compound types making up high octane gasoline sample no. 6776-077-17 as determined by GC using a flame ionization detector (FID) (high octane gasoline 146 in FIG. 1). The specific components identified by GC in high octane gasoline sample no. 6776-077-17 are summarized in Table 15 provide below.

TABLE 8

High Octane Gasoline Sample No. 6776-077-17 Composition Summary (wt %)

| CARBON# | Paraffin | I-Paraffins | Aromatics | Naphthenes | Olefins | Oxygenates | TOTAL |
|---|---|---|---|---|---|---|---|
| 1 | — | — | — | — | — | — | 0.000 |
| 2 | — | — | — | — | — | — | 0.000 |
| 3 | — | — | — | — | — | — | 0.000 |
| 4 | — | — | — | — | — | — | 0.000 |
| 5 | — | 0.016 | — | — | — | — | 0.016 |
| 6 | 0.052 | 0.447 | 0.040 | 0.425 | 0.023 | — | 0.986 |
| 7 | — | 98.520 | — | 0.440 | 0.028 | — | 98.988 |
| 8 | — | 0.010 | — | — | — | — | 0.010 |
| 9 | — | — | — | — | — | — | 0.000 |
| 10 | — | — | — | — | — | — | 0.000 |
| 11 | — | — | — | — | — | — | 0.000 |
| 12 | — | — | — | — | — | — | 0.000 |
| 13 | — | — | — | — | — | — | 0.000 |
| 14 | — | — | — | — | — | — | 0.000 |
| 15 | — | — | — | — | — | — | 0.000 |
| TOTAL | 0.052 | 98.992 | 0.040 | 0.865 | 0.051 | 0.000 | 100.000 |

In some embodiments of the present disclosure, liquid fuel mixtures, e.g. jet fuel, were further obtained by recovering and setting aside liquids boiling above 82° C. and less than 153° C. and then collecting the liquids boiling between 153° C. and 200° C. Liquids in the kettle did not produce vapors in the column head above about 180° C. and were kept as "residual" material. All condensed liquids boiling between 153° C. and 200° C. were combined into a single liquid sample, sample no. 6776-109-28. Analysis of this liquid provided quantitative compositional information, with a nominal composition of 58.1 wt % mononaphthenes, 5.1 wt % aromatics, 4.1 wt % monoolefins, 24.8 wt % iso-paraffins, and 1.3 wt % normal paraffins. RON and MON were estimated at 26 and 27, respectively. Density was measured via ASTM D4052: Standard Test Method for Density, Relative Density, and API Gravity of Liquids by Digital Density Meter, yielding a value of 0.777. Flash point was measured via ASTM D6450: Standard Test Method for Flash Point by Continuously Closed Cup Tester, yielding a value of 41.5° C. Freeze point was measured via ASTM D2386: Standard Test Method for Freezing Point of Aviation Fuels, yielding a value less than −80° C. Energy density was calculated from compositional analysis (ASTM D6730) and the ratio of C/H in the fuel, yielding a higher heating value of 46.6 MJ/kg and a lower heating value of 43.8 MJ/kg. Table 9 below summarizes the compound types making up jet fuel sample no. 6776-109-28 as determined by GC using a flame ionization detector (FTD) (j et fuel 148 in FIG. 1). The specific components identified by GC in jet fuel sample no. 6776-109-28 are summarized in Table 16 provide below.

TABLE 9

Jet Fuel Sample No. 6776-109-28 Composition Summary (wt %)

| CARBON# | Paraffin | I-Paraffins | Aromatics | Naphthenes | Olefins | Oxygenates | TOTAL |
|---|---|---|---|---|---|---|---|
| 1 | — | — | — | — | — | — | 0.000 |
| 2 | — | — | — | — | — | — | 0.000 |
| 3 | — | — | — | — | — | — | 0.000 |
| 4 | — | — | — | — | — | — | 0.000 |
| 5 | — | 0.036 | — | — | — | — | 0.036 |
| 6 | — | — | — | — | — | — | 0.000 |
| 7 | — | 0.067 | — | 0.007 | — | — | 0.075 |
| 8 | — | 0.155 | — | 0.191 | 0.013 | — | 0.359 |

TABLE 9-continued

Jet Fuel Sample No. 6776-109-28 Composition Summary (wt %)

| CARBON# | Paraffin | I-Paraffins | Aromatics | Naphthenes | Olefins | Oxygenates | TOTAL |
|---|---|---|---|---|---|---|---|
| 9 | 0.237 | 0.192 | 2.960 | 4.807 | 0.948 | — | 9.144 |
| 10 | 1.008 | 15.170 | 2.000 | 40.418 | 2.413 | — | 61.010 |
| 11 | 0.080 | 9.185 | 0.095 | 12.445 | 0.678 | — | 22.482 |
| 12 | — | — | — | 0.278 | — | — | 0.278 |
| 13 | — | — | — | — | — | — | 0.000 |
| 14 | — | — | — | — | — | — | 0.000 |
| 15 | — | — | — | — | — | — | 0.000 |
| TOTAL | 1.325 | 24.805 | 5.055 | 58.147 | 4.052 | 0.000 | 93.384 |

All liquid fuel mixtures, both crude product and processed crude product, were analyzed using ASTM D6730: Standard Test Method for Determination of Individual Components in Spark Ignition Engine Fuels by 100-Metre Capillary (with Precolumn) High-Resolution Gas Chromatography. The analysis provided quantitative compositional information. Except where indicated, the RON and MON of the liquid was estimated using the results from ASTM D6730 applied to the method of Ghosh (Ghosh, P.; Hickey, K. J.; Jaffe, S. B. "Development of a Detailed Gasoline Composition-Based Octane Model" 2006, *Ind. Eng. Chem. Res.*, 45, 337-345).

Sample no. 6776-107-27 represents heavy aromatic molecules that may exist in the crude product due to significant concentrations of heavy components. Heavy aromatics are very low in concentration or below detection limits in this sample. Table 10 below summarizes the compound types making up heavy aromatic molecules sample no. 6776-107-27 as determined by GC using a flame ionization detector (FID) (heavy aromatic compounds 144 in FIG. 1). The specific components identified by GC in heavy aromatic molecules sample no. 6776-107-27 are summarized in Table 17 provided below.

TABLE 10

Heavy Aromatic Molecules Sample No. 6776-107-27 Composition Summary (wt %)

| CARBON# | Paraffin | I-Paraffins | Aromatics | Naphthenes | Olefins | Oxygenates | TOTAL |
|---|---|---|---|---|---|---|---|
| 1 | — | — | — | — | — | — | 0.000 |
| 2 | — | — | — | — | — | — | 0.000 |
| 3 | — | — | — | — | — | — | 0.000 |
| 4 | — | — | — | — | — | — | 0.000 |
| 5 | — | 0.031 | — | — | — | — | 0.031 |
| 6 | — | — | — | — | 0.013 | — | 0.013 |
| 7 | 0.006 | 0.041 | — | — | — | — | 0.048 |
| 8 | — | 0.047 | — | 0.012 | — | — | 0.059 |
| 9 | — | 0.011 | 0.421 | 0.017 | 0.008 | — | 0.457 |
| 10 | 0.068 | 0.045 | 0.747 | 1.148 | 0.073 | — | 2.081 |
| 11 | 1.247 | 0.277 | 0.631 | 3.020 | 1.508 | — | 6.682 |
| 12 | — | — | 17.498 | 16.718 | — | — | 34.216 |
| 13 | 0.677 | — | 0.829 | 6.444 | — | — | 7.950 |
| 14 | 0.314 | — | 0.169 | — | — | — | 0.484 |
| 15 | — | — | — | — | — | — | 0.000 |
| TOTAL | 2.312 | 0.452 | 20.296 | 27.358 | 1.601 | 0.000 | 52.019 |

Table 11 summarizes other physical property values for some of the above-referenced fuels.

TABLE 11

Fuel Physical Properties Summary

| PROPERTY | Crude 6776-026-05 | Crude 6776-031-16 | HOG 6776-044-12-W | HOG 6776-077-17 | Jet 6776-109-28 |
|---|---|---|---|---|---|
| Avg MW | 112.993 | 93.900 | 97.435 | 100.012 | 142.126 |
| Avg SG | 0.736 | 0.688 | 0.684 | 0.689 | 0.777 |
| Avg API @ 60.0 F. | 59.094 | 74.236 | 75.472 | 73.955 | 47.568 |
| RVP (psi) | 2.030 | 4.798 | 4.255 | 3.466 | 0.224 |
| Tot H | 14.192 | 15.915 | 16.127 | 16.077 | 13.512 |
| C/H | 5.776 | 5.196 | 5.201 | 5.220 | 5.899 |
| % Oxygen (wgt) | 0.126 | 1.305 | 0.000 | 0.000 | 0.000 |
| Aromatics with 6C (% weight) | 0.000 | 0.000 | 0.000 | 0.000 | 0.000 |

TABLE 12

Crude Product Sample No. 6776-026-05 Individual Components

| GROUP | TIME | COMPONENT | % WGT | % VOL | % MOL |
|---|---|---|---|---|---|
| Paraffin | 33.379 | n-Hexane | 0.011 | 0.013 | 0.015 |
| Paraffin | 53.924 | n-Heptane | 0.035 | 0.038 | 0.040 |
| Paraffin | 73.082 | n-Octane | 0.028 | 0.029 | 0.028 |
| Paraffin | 86.237 | n-Nonane | 0.191 | 0.196 | 0.168 |
| Paraffin | 97.251 | n-Decane | 0.256 | 0.258 | 0.203 |
| Paraffin | 105.173 | n-Undecane | 0.023 | 0.023 | 0.017 |
| I-Paraffins | 14.069 | i-Pentane | 0.043 | 0.051 | 0.067 |
| I-Paraffins | 26.398 | 2,3-Dimethylbutane | 0.415 | 0.462 | 0.544 |
| I-Paraffins | 27.419 | 2-Methylpentane | 0.206 | 0.232 | 0.270 |
| I-Paraffins | 29.882 | 3-Methylpentane | 0.126 | 0.140 | 0.166 |
| I-Paraffins | 39.307 | 2,4-Dimethylpentane | 1.584 | 1.733 | 1.786 |
| I-Paraffins | 39.878 | 2,2,3-Trimethylbutane | 27.059 | 28.871 | 30.509 |
| I-Paraffins | 43.915 | 3,3-Dimethylpentane | 0.014 | 0.015 | 0.016 |
| I-Paraffins | 47.064 | 2-Methylhexane | 3.887 | 4.218 | 4.383 |
| I-Paraffins | 48.757 | 3-Methylhexane | 0.616 | 0.660 | 0.694 |
| I-Paraffins | 50.799 | 3-Ethylpentane | 0.018 | 0.019 | 0.021 |
| I-Paraffins | 51.176 | 2,2,4-Trimethylpentane | 0.076 | 0.081 | 0.075 |
| I-Paraffins | 58.325 | 2,2-Dimethylhexane | 0.021 | 0.022 | 0.021 |
| I-Paraffins | 60.162 | 2,2,3-Trimethylpentane | 0.416 | 0.428 | 0.412 |
| I-Paraffins | 60.459 | 2,5-Dimethylhexane | 2.673 | 2.838 | 2.644 |
| I-Paraffins | 60.757 | 2,4-Dimethylhexane | 1.990 | 2.093 | 1.968 |
| I-Paraffins | 61.907 | 3,3-Dimethylhexane | 0.016 | 0.017 | 0.016 |
| I-Paraffins | 63.555 | 2,3,4-Trimethylpentane | 0.813 | 0.832 | 0.804 |
| I-Paraffins | 65.985 | 2,3-Dimethylhexane | 1.788 | 1.848 | 1.768 |
| I-Paraffins | 67.305 | 2-Methylheptane | 1.354 | 1.429 | 1.339 |
| I-Paraffins | 67.530 | 4-Methylheptane | 0.344 | 0.359 | 0.340 |
| I-Paraffins | 67.638 | 3,4-Dimethylhexane | 0.172 | 0.176 | 0.170 |
| I-Paraffins | 68.615 | 3-Methylheptane | 1.020 | 1.064 | 1.008 |
| I-Paraffins | 70.480 | 2,2,5-Trimethylhexane | 2.804 | 2.920 | 2.470 |
| I-Paraffins | 75.421 | 2,3,5-Trimethylhexane | 1.992 | 2.031 | 1.754 |
| I-Paraffins | 76.577 | 2,4-Dimethylheptane | 0.731 | 0.757 | 0.644 |
| I-Paraffins | 77.335 | 2,2,3-Trimethylhexane | 0.087 | 0.089 | 0.076 |
| I-Paraffins | 77.502 | 2,6-Dimethylheptane | 1.231 | 1.278 | 1.084 |
| I-Paraffins | 78.372 | 2,5-Dimethylheptane | 2.169 | 2.232 | 1.910 |
| I-Paraffins | 78.510 | 2-Methyl-4-ethylhexane | 0.160 | 0.162 | 0.141 |
| I-Paraffins | 81.023 | 2,3-Dimethylheptane | 0.877 | 0.889 | 0.772 |
| I-Paraffins | 81.246 | 3,3-Diethylpentane | 0.108 | 0.105 | 0.095 |
| I-Paraffins | 81.354 | 3,4-Dimethylheptane | 0.095 | 0.096 | 0.084 |
| I-Paraffins | 82.038 | 4-Methyloctane | 0.183 | 0.187 | 0.161 |
| I-Paraffins | 82.168 | 2-Methyloctane | 0.478 | 0.493 | 0.421 |
| I-Paraffins | 83.494 | C10-IsoParaffin-1 | 0.402 | 0.407 | 0.319 |
| I-Paraffins | 83.947 | C10-Isoparaffin-2 | 0.833 | 0.843 | 0.662 |
| I-Paraffins | 84.703 | 2,2,4-trimethylheptane | 0.644 | 0.652 | 0.511 |
| I-Paraffins | 86.114 | Octane, 3,3-dimethyl- | 0.441 | 0.446 | 0.350 |
| I-Paraffins | 88.129 | 2,3-Dimethyloctane | 1.417 | 1.440 | 1.125 |
| I-Paraffins | 88.331 | 2,3,6-trimethylheptane | 0.522 | 0.384 | 0.414 |
| I-Paraffins | 89.113 | C10-IsoParaffin-1(1) | 0.419 | 0.424 | 0.333 |
| I-Paraffins | 89.553 | 2,7-Dimethyloctane | 0.192 | 0.194 | 0.152 |
| I-Paraffins | 89.671 | C10-IsoParaffin-3 | 0.360 | 0.363 | 0.286 |
| I-Paraffins | 89.757 | 2,4-Dimethyloctane | 0.025 | 0.025 | 0.019 |
| I-Paraffins | 90.047 | 2,6-Dimethyloctane | 0.485 | 0.489 | 0.385 |
| I-Paraffins | 90.587 | 3,6-Dimethyloctane | 0.103 | 0.103 | 0.082 |
| I-Paraffins | 90.654 | C10 Isoparaffin-4 | 0.118 | 0.118 | 0.093 |
| I-Paraffins | 92.844 | 4-Methylnonane | 0.054 | 0.054 | 0.043 |
| I-Paraffins | 92.959 | 2,2,6-Trimethyloctane | 0.419 | 0.425 | 0.333 |
| I-Paraffins | 93.092 | 2-Methylnonane | 0.059 | 0.059 | 0.047 |
| I-Paraffins | 93.348 | 3-Ethyloctane | 0.019 | 0.019 | 0.015 |
| I-Paraffins | 94.473 | C11-Isoparaffin-2 | 0.494 | 0.489 | 0.357 |
| I-Paraffins | 94.908 | C10-IsoParaffin-6 | 0.194 | 0.195 | 0.154 |
| I-Paraffins | 96.094 | 3-Ethyl-3-methylheptane | 0.335 | 0.332 | 0.242 |
| I-Paraffins | 97.846 | C11-Isoparaffin-3 | 0.128 | 0.127 | 0.093 |
| I-Paraffins | 97.935 | 2,5,6-Trimethyloctane | 0.068 | 0.067 | 0.049 |
| I-Paraffins | 98.061 | 3-Ethylnonane | 0.211 | 0.209 | 0.153 |
| I-Paraffins | 98.424 | C11 Isoparaffin-4 | 0.152 | 0.150 | 0.110 |
| I-Paraffins | 98.713 | C11-Isoparaffin-5 | 0.172 | 0.171 | 0.125 |
| I-Paraffins | 101.341 | C11-Isoparaffin-8 | 0.044 | 0.043 | 0.032 |
| I-Paraffins | 101.905 | C11-Isoparaffin-9 | 0.049 | 0.049 | 0.036 |
| I-Paraffins | 102.423 | C11-Isoparaffin-10 | 0.065 | 0.065 | 0.047 |
| I-Paraffins | 102.927 | C11-Isoparaffin-11 | 0.060 | 0.059 | 0.043 |
| I-Paraffins | 106.486 | C12-IsoParaffin-1 | 0.017 | 0.017 | 0.012 |
| I-Paraffins | 106.642 | C12-IsoParaffin-2 | 0.092 | 0.091 | 0.061 |
| Mono-Aromatics | 42.468 | Benzene | 0.010 | 0.008 | 0.014 |
| Mono-Aromatics | 64.122 | Toluene | 10.299 | 8.746 | 12.628 |
| Mono-Aromatics | 80.662 | m-Xylene | 0.021 | 0.018 | 0.023 |
| Mono-Aromatics | 80.803 | p-Xylene | 0.010 | 0.009 | 0.011 |
| Mono-Aromatics | 92.117 | 1,3,5-Trimethylbenzene | 0.390 | 0.332 | 0.367 |

TABLE 12-continued

Crude Product Sample No. 6776-026-05 Individual Components

| GROUP | TIME | COMPONENT | % WGT | % VOL | % MOL |
|---|---|---|---|---|---|
| Mono-Aromatics | 94.541 | 1,2,4-Trimethylbenzene | 0.079 | 0.066 | 0.074 |
| Mono-Aromatics | 101.470 | 1-Methyl-2-n-propylbenzene | 0.035 | 0.030 | 0.030 |
| Mono-Aromatics | 102.210 | C9-Aromatic-1 | 0.096 | 0.079 | 0.090 |
| Mono-Aromatics | 123.346 | Hexamethylbenzene | 0.287 | 0.200 | 0.200 |
| Mono-Naphthenes | 37.838 | Methylcyclopentane | 0.026 | 0.026 | 0.035 |
| Mono-Naphthenes | 49.499 | 1t,3-Dimethylcyclopentane | 0.250 | 0.246 | 0.288 |
| Mono-Naphthenes | 50.044 | 1c,3-Dimethylcyclopentane | 0.140 | 0.139 | 0.161 |
| Mono-Naphthenes | 56.963 | Methylcyclohexane | 0.204 | 0.196 | 0.235 |
| Mono-Naphthenes | 57.865 | 1,1,3-Trimethylcyclopentane | 0.142 | 0.140 | 0.143 |
| Mono-Naphthenes | 59.577 | Ethylcyclopentane | 0.019 | 0.018 | 0.022 |
| Mono-Naphthenes | 61.482 | 1c,2t,4-Trimethylcyclopentane | 0.094 | 0.091 | 0.095 |
| Mono-Naphthenes | 68.323 | 1,3-dimethyl-t-cyclohexane | 0.355 | 0.339 | 0.357 |
| Mono-Naphthenes | 70.732 | 3c-Ethylmethylcyclopentane | 0.106 | 0.102 | 0.107 |
| Mono-Naphthenes | 71.572 | 1t,2-Dimethylcyclohexane | 0.041 | 0.039 | 0.041 |
| Mono-Naphthenes | 72.780 | 1c,4-Dimethylcyclohexane | 0.988 | 0.930 | 0.995 |
| Mono-Naphthenes | 76.228 | 1c,2-Dimethylcyclohexane | 0.107 | 0.099 | 0.108 |
| Mono-Naphthenes | 77.042 | 1,1,4-Trimethylcyclohexane | 0.504 | 0.481 | 0.451 |
| Mono-Naphthenes | 77.788 | 1c,3c,5-Trimethylcyclohexane | 0.109 | 0.104 | 0.098 |
| Mono-Naphthenes | 78.104 | C9-MonoNaph-1 | 0.535 | 0.510 | 0.479 |
| Mono-Naphthenes | 78.750 | C9-MonoNaph-2 | 0.081 | 0.077 | 0.073 |
| Mono-Naphthenes | 78.963 | C9-MonoNaph-3 | 0.025 | 0.024 | 0.023 |
| Mono-Naphthenes | 79.843 | 1c,2t,4t-Trimethylcyclohexane | 0.519 | 0.490 | 0.464 |
| Mono-Naphthenes | 80.378 | C9-MonoNaph-4 | 0.363 | 0.346 | 0.325 |
| Mono-Naphthenes | 81.518 | C9-MonoNapth-5 | 0.063 | 0.060 | 0.057 |
| Mono-Naphthenes | 82.711 | C9 MonoNaph-6 | 0.049 | 0.045 | 0.044 |
| Mono-Naphthenes | 82.944 | C9 MonoNaph-7 | 0.938 | 0.864 | 0.840 |
| Mono-Naphthenes | 83.282 | Cyclohexane, 1,2,4-trimethyl-, | 0.480 | 0.457 | 0.429 |
| Mono-Naphthenes | 83.617 | C9 MonoNaph-8 | 0.288 | 0.265 | 0.258 |
| Mono-Naphthenes | 84.189 | Cyclopentane, 1-methyl-2-propyl- | 0.225 | 0.188 | 0.239 |
| Mono-Naphthenes | 84.334 | Cyclohexane, 1-ethyl-4-methyl-, trans- | 0.124 | 0.118 | 0.111 |
| Mono-Naphthenes | 84.607 | 1,1,2-Trimethylcyclohexane | 0.069 | 0.063 | 0.061 |
| Mono-Naphthenes | 85.105 | C10-MonoNaph-1 | 0.019 | 0.019 | 0.015 |
| Mono-Naphthenes | 85.145 | i-Butylcyclopentane | 0.010 | 0.010 | 0.009 |
| Mono-Naphthenes | 86.544 | 1-ethyl-4-t-methylcyclohexane | 0.328 | 0.299 | 0.293 |
| Mono-Naphthenes | 86.851 | C9-MonoNaphthene-9 | 0.119 | 0.110 | 0.107 |
| Mono-Naphthenes | 87.415 | 1,2,3,5-c-Tetramethylcyclohex | 0.158 | 0.151 | 0.141 |
| Mono-Naphthenes | 88.865 | C10-MonoNaph-2 | 0.603 | 0.557 | 0.485 |
| Mono-Naphthenes | 89.238 | Propylcyclohexane | 0.873 | 0.802 | 0.782 |
| Mono-Naphthenes | 90.312 | C10-MonoNaph-3 | 0.301 | 0.279 | 0.243 |
| Mono-Naphthenes | 90.986 | C10-MonoNaph-4 | 0.498 | 0.461 | 0.401 |
| Mono-Naphthenes | 91.186 | C10-MonoNaph-6 | 0.756 | 0.699 | 0.609 |
| Mono-Naphthenes | 91.397 | C10-MonoNaph-7 | 0.038 | 0.035 | 0.031 |
| Mono-Naphthenes | 91.473 | C10-MonoNaph-8 | 0.421 | 0.389 | 0.339 |
| Mono-Naphthenes | 91.569 | C10-MonoNaph-9 | 0.145 | 0.134 | 0.117 |
| Mono-Naphthenes | 91.713 | C10-MonoNaph-10 | 0.158 | 0.146 | 0.127 |
| Mono-Naphthenes | 92.294 | C10-MonoNaph-11 | 0.045 | 0.042 | 0.036 |
| Mono-Naphthenes | 92.464 | C10-MonoNaph-12 | 0.164 | 0.152 | 0.132 |
| Mono-Naphthenes | 92.563 | C10-MonoNaph-13 | 0.028 | 0.026 | 0.023 |
| Mono-Naphthenes | 92.665 | C10-MonoNaph-14 | 0.026 | 0.024 | 0.021 |
| Mono-Naphthenes | 93.684 | C10-MonoNaph-15 | 0.161 | 0.149 | 0.130 |
| Mono-Naphthenes | 93.850 | C10-MonoNaph-16 | 0.222 | 0.206 | 0.179 |
| Mono-Naphthenes | 93.982 | C10-MonoNaph-17 | 0.223 | 0.206 | 0.179 |
| Mono-Naphthenes | 94.156 | C10-MonoNaph-18 | 0.244 | 0.226 | 0.197 |
| Mono-Naphthenes | 94.271 | C10-MonoNaph-19 | 0.316 | 0.292 | 0.255 |
| Mono-Naphthenes | 94.999 | C10-MonoNaph-20 | 0.319 | 0.295 | 0.257 |
| Mono-Naphthenes | 95.176 | C10-MonoNaph-21 | 0.151 | 0.140 | 0.122 |
| Mono-Naphthenes | 95.326 | C10-MonoNaph-22 | 0.122 | 0.112 | 0.098 |
| Mono-Naphthenes | 95.379 | C10-MonoNaph-23 | 0.048 | 0.044 | 0.038 |
| Mono-Naphthenes | 95.862 | 1t-Methyl-2-n-propylcyclohexan | 0.118 | 0.108 | 0.095 |
| Mono-Naphthenes | 96.342 | C10-MonoNaph-25 | 0.095 | 0.088 | 0.077 |
| Mono-Naphthenes | 96.429 | C10-MonoNaph-26 | 0.082 | 0.075 | 0.066 |
| Mono-Naphthenes | 96.698 | C10-MonoNaph-27 | 0.178 | 0.165 | 0.143 |
| Mono-Naphthenes | 98.322 | sec-Butylcyclohexane | 0.101 | 0.091 | 0.081 |
| Mono-Naphthenes | 98.537 | C10-MonoNaph-28 | 0.591 | 0.547 | 0.476 |
| Mono-Naphthenes | 99.201 | C10-MonoNaph-29 | 0.055 | 0.051 | 0.044 |
| Mono-Naphthenes | 99.391 | C11-MonoNaph-1 | 0.154 | 0.139 | 0.113 |
| Mono-Naphthenes | 99.558 | C11-MonoNaph-2 | 0.086 | 0.078 | 0.063 |
| Mono-Naphthenes | 99.683 | C11-MonoNaph-3 | 0.195 | 0.176 | 0.143 |
| Mono-Naphthenes | 99.916 | C11-MonoNaph-4 | 0.041 | 0.040 | 0.030 |
| Mono-Naphthenes | 100.206 | C11-MonoNaph-5 | 0.074 | 0.073 | 0.054 |
| Mono-Naphthenes | 100.507 | C11-MonoNaph-6 | 0.187 | 0.185 | 0.137 |
| Mono-Naphthenes | 100.680 | C11-MonoNaph-7 | 0.315 | 0.312 | 0.231 |
| Mono-Naphthenes | 100.797 | C11-MonoNaph-8 | 0.405 | 0.400 | 0.296 |
| Mono-Naphthenes | 100.989 | C11-MonoNaph-9 | 0.224 | 0.221 | 0.164 |
| Mono-Naphthenes | 101.192 | C11-MonoNaph-11 | 0.196 | 0.194 | 0.144 |
| Mono-Naphthenes | 101.588 | C11-MonoNaph-12 | 0.104 | 0.103 | 0.076 |

TABLE 12-continued

Crude Product Sample No. 6776-026-05 Individual Components

| GROUP | TIME | COMPONENT | % WGT | % VOL | % MOL |
|---|---|---|---|---|---|
| Mono-Naphthenes | 102.021 | C11-MonoNaph-13 | 0.016 | 0.016 | 0.012 |
| Mono-Naphthenes | 102.543 | C11-MonoNaph-14 | 0.437 | 0.433 | 0.320 |
| Mono-Naphthenes | 102.679 | C11-MonoNaph-15 | 0.105 | 0.104 | 0.077 |
| Mono-Naphthenes | 103.070 | C11-MonoNaph-17 | 0.035 | 0.035 | 0.026 |
| Mono-Naphthenes | 103.324 | C11-MonoNaph-18 | 0.134 | 0.133 | 0.098 |
| Mono-Naphthenes | 103.610 | C11-MonoNaph-19 | 0.194 | 0.192 | 0.142 |
| Mono-Naphthenes | 103.960 | C11-MonoNaph-21 | 0.143 | 0.142 | 0.105 |
| Mono-Naphthenes | 104.251 | C12-MonoNaph-1 | 0.065 | 0.059 | 0.043 |
| Mono-Naphthenes | 106.290 | C12-MonoNaph-2 | 0.072 | 0.066 | 0.048 |
| Mono-Naphthenes | 106.771 | C12-MonoNaph-3 | 0.156 | 0.143 | 0.104 |
| Mono-Naphthenes | 107.218 | C12-MonoNaph-4 | 0.089 | 0.082 | 0.060 |
| Mono-Naphthenes | 107.297 | C12-MonoNaph-5 | 0.101 | 0.093 | 0.068 |
| Mono-Naphthenes | 107.676 | C12-MonoNaph-6 | 0.018 | 0.017 | 0.012 |
| Mono-Naphthenes | 107.908 | C12-MonoNaph-7 | 0.057 | 0.053 | 0.038 |
| Mono-Naphthenes | 108.079 | C12-MonoNaph-8 | 0.033 | 0.031 | 0.022 |
| Mono-Naphthenes | 108.236 | C12-MonoNaph-9 | 0.081 | 0.075 | 0.055 |
| Mono-Naphthenes | 108.318 | C12-MonoNaph-10 | 0.028 | 0.026 | 0.019 |
| Mono-Naphthenes | 108.396 | C12-MonoNaph-11 | 0.105 | 0.096 | 0.070 |
| Mono-Naphthenes | 108.632 | C12-MonoNaph-13 | 0.058 | 0.053 | 0.039 |
| Mono-Naphthenes | 108.753 | C12-MonoNaph-15 | 0.028 | 0.025 | 0.019 |
| Mono-Naphthenes | 109.073 | C12-MonoNaph-17 | 0.104 | 0.095 | 0.070 |
| Mono-Naphthenes | 109.639 | C12-MonoNaph-18 | 0.019 | 0.017 | 0.013 |
| Mono-Naphthenes | 110.140 | C12-MonoNaph-19 | 0.057 | 0.052 | 0.038 |
| Mono-Naphthenes | 110.261 | C12-MonoNaph-20 | 0.017 | 0.016 | 0.012 |
| Mono-Naphthenes | 110.735 | C12-MonoNaph-21 | 0.015 | 0.014 | 0.010 |
| Mono-Naphthenes | 111.029 | C12-MonoNaph-22 | 0.060 | 0.055 | 0.040 |
| Mono-Naphthenes | 111.181 | C12-MonoNaph-23 | 0.024 | 0.022 | 0.016 |
| Mono-Naphthenes | 111.579 | C13-MonoNaph-1 | 0.037 | 0.034 | 0.023 |
| Mono-Naphthenes | 112.266 | C13-MonoNaph-4 | 0.037 | 0.034 | 0.023 |
| Mono-Naphthenes | 113.215 | C13-MonoNaph-5 | 0.031 | 0.029 | 0.019 |
| Mono-Naphthenes | 113.569 | C13-MonoNaph-6 | 0.015 | 0.013 | 0.009 |
| Mono-Naphthenes | 113.970 | C13-MonoNaph-7 | 0.028 | 0.026 | 0.017 |
| Mono-Naphthenes | 114.174 | C13-MonoNaph-8 | 0.013 | 0.012 | 0.008 |
| Mono-Naphthenes | 114.277 | C13-MonoNaph-9 | 0.015 | 0.014 | 0.010 |
| Mono-Naphthenes | 115.138 | C13-MonoNaph-10 | 0.011 | 0.010 | 0.007 |
| n-Olefins | 86.033 | t-Nonene-3 | 0.104 | 0.112 | 0.093 |
| n-Olefins | 95.748 | 4-Decene | 0.033 | 0.032 | 0.026 |
| n-Olefins | 97.627 | 3-Decene | 0.087 | 0.086 | 0.070 |
| Iso-Olefins | 76.421 | t-2,2-Dimethylheptene-3 | 0.046 | 0.050 | 0.041 |
| Iso-Olefins | 85.935 | t-2-Methyloctene-3 | 0.116 | 0.125 | 0.103 |
| Iso-Olefins | 87.935 | C10 Iso-olefin-5 | 0.030 | 0.032 | 0.024 |
| Iso-Olefins | 90.793 | C10-IsoOlefin-8 | 0.033 | 0.035 | 0.027 |
| Iso-Olefins | 90.908 | C10-IsoOlefin-9 | 0.038 | 0.040 | 0.031 |
| Iso-Olefins | 94.719 | C10-IsoOlefin-15 | 0.031 | 0.032 | 0.025 |
| Iso-Olefins | 95.581 | 3-Nonene, 3-methyl-, (E)- | 0.034 | 0.034 | 0.028 |
| Iso-Olefins | 103.215 | C11-IsoOlefin-2 | 0.098 | 0.097 | 0.072 |
| Naphtheno-Olefins | 79.694 | C9 Naph-Olefin-1 | 0.075 | 0.075 | 0.068 |
| Naphtheno-Olefins | 81.688 | C9-NaphOlefin-3 | 0.056 | 0.057 | 0.051 |
| Naphtheno-Olefins | 82.311 | C9-NaphOlefin-2 | 0.095 | 0.096 | 0.087 |
| Naphtheno-Olefins | 85.747 | Cyclopentene, 1,2,3,4,5-pentamethyl- | 0.071 | 0.065 | 0.058 |
| Naphtheno-Olefins | 87.574 | C10-NaphOlefin-1 | 0.113 | 0.104 | 0.092 |
| Naphtheno-Olefins | 88.565 | C9-Naphtheno-olefin-5 | 0.069 | 0.070 | 0.063 |
| Oxygenates | 7.843 | Dimethylether | 0.203 | 0.227 | 0.499 |
| Oxygenates | 8.847 | Methanol | 0.111 | 0.103 | 0.392 |

TABLE 13

Crude Product Sample No. 6776-031-16 Individual Components

| GROUP | TIME | COMPONENT | % WGT | % VOL | % MOL |
|---|---|---|---|---|---|
| Paraffin | 33.363 | n-Hexane | 0.025 | 0.026 | 0.028 |
| Paraffin | 53.933 | n-Heptane | 0.023 | 0.023 | 0.022 |
| Paraffin | 86.268 | n-Nonane | 0.025 | 0.025 | 0.020 |
| Paraffin | 97.286 | n-Decane | 0.022 | 0.021 | 0.015 |
| I-Paraffins | 14.046 | i-Pentane | 0.271 | 0.303 | 0.374 |
| I-Paraffins | 26.371 | 2,3-Dimethylbutane | 1.344 | 1.408 | 1.551 |
| I-Paraffins | 27.394 | 2-Methylpentane | 0.469 | 0.498 | 0.541 |
| I-Paraffins | 29.858 | 3-Methylpentane | 0.349 | 0.364 | 0.402 |
| I-Paraffins | 39.345 | 2,4-Dimethylpentane | 2.557 | 2.635 | 2.538 |
| I-Paraffins | 40.012 | 2,2,3-Trimethylbutane | 78.285 | 78.640 | 77.691 |
| I-Paraffins | 43.898 | 3,3-Dimethylpentane | 0.056 | 0.056 | 0.056 |
| I-Paraffins | 47.066 | 2-Methylhexane | 3.664 | 3.743 | 3.636 |

TABLE 13-continued

Crude Product Sample No. 6776-031-16 Individual Components

| GROUP | TIME | COMPONENT | % WGT | % VOL | % MOL |
|---|---|---|---|---|---|
| I-Paraffins | 48.763 | 3-Methylhexane | 0.480 | 0.485 | 0.477 |
| I-Paraffins | 51.179 | 2,2,4-Trimethylpentane | 0.078 | 0.078 | 0.068 |
| I-Paraffins | 58.332 | 2,2-Dimethylhexane | 0.022 | 0.021 | 0.019 |
| I-Paraffins | 60.169 | 2,2,3-Trimethylpentane | 0.538 | 0.521 | 0.469 |
| I-Paraffins | 60.454 | 2,5-Dimethylhexane | 0.816 | 0.816 | 0.711 |
| I-Paraffins | 60.755 | 2,4-Dimethylhexane | 0.940 | 0.931 | 0.818 |
| I-Paraffins | 63.552 | 2,3,4-Trimethylpentane | 0.572 | 0.552 | 0.498 |
| I-Paraffins | 64.173 | 2,3,3-Trimethylpentane | 1.038 | 0.991 | 0.904 |
| I-Paraffins | 65.992 | 2,3-Dimethylhexane | 0.719 | 0.700 | 0.626 |
| I-Paraffins | 67.312 | 2-Methylheptane | 0.285 | 0.283 | 0.248 |
| I-Paraffins | 67.540 | 4-Methylheptane | 0.126 | 0.124 | 0.110 |
| I-Paraffins | 67.657 | 3,4-Dimethylhexane | 0.077 | 0.074 | 0.067 |
| I-Paraffins | 68.627 | 3-Methylheptane | 0.226 | 0.222 | 0.196 |
| I-Paraffins | 70.483 | 2,2,5-Trimethylhexane | 0.808 | 0.792 | 0.627 |
| I-Paraffins | 75.433 | 2,3,5-Trimethylhexane | 0.608 | 0.584 | 0.472 |
| I-Paraffins | 76.595 | 2,4-Dimethylheptane | 0.146 | 0.142 | 0.113 |
| I-Paraffins | 77.358 | 2,2,3-Trimethylhexane | 0.021 | 0.020 | 0.016 |
| I-Paraffins | 77.519 | 2,6-Dimethylheptane | 0.167 | 0.163 | 0.129 |
| I-Paraffins | 78.378 | 2,5-Dimethylheptane | 0.378 | 0.367 | 0.293 |
| I-Paraffins | 78.528 | 2-Methyl-4-ethylhexane | 0.034 | 0.032 | 0.026 |
| I-Paraffins | 81.043 | 2,3-Dimethylheptane | 0.158 | 0.150 | 0.122 |
| I-Paraffins | 81.270 | 3,3-Diethylpentane | 0.025 | 0.023 | 0.019 |
| I-Paraffins | 81.376 | 3,4-Dimethylheptane | 0.022 | 0.021 | 0.017 |
| I-Paraffins | 82.061 | 4-Methyloctane | 0.021 | 0.020 | 0.016 |
| I-Paraffins | 82.193 | 2-Methyloctane | 0.046 | 0.045 | 0.036 |
| I-Paraffins | 83.518 | C10-IsoParaffin-1 | 0.069 | 0.066 | 0.048 |
| I-Paraffins | 83.965 | C10-Isoparaffin-2 | 0.123 | 0.117 | 0.086 |
| I-Paraffins | 84.726 | 2,2,4-trimethylheptane | 0.118 | 0.113 | 0.083 |
| I-Paraffins | 86.138 | Octane, 3,3-dimethyl- | 0.078 | 0.075 | 0.055 |
| I-Paraffins | 88.145 | 2,3-Dimethyloctane | 0.196 | 0.188 | 0.137 |
| I-Paraffins | 88.342 | 2,3,6-trimethylheptane | 0.073 | 0.051 | 0.051 |
| I-Paraffins | 89.136 | C10-IsoParaffin-1(1) | 0.043 | 0.041 | 0.030 |
| I-Paraffins | 89.581 | 2,7-Dimethyloctane | 0.022 | 0.021 | 0.016 |
| I-Paraffins | 89.694 | C10-IsoParaffin-3 | 0.042 | 0.040 | 0.030 |
| I-Paraffins | 90.067 | 2,6-Dimethyloctane | 0.059 | 0.056 | 0.041 |
| I-Paraffins | 90.678 | C10 Isoparaffin-4 | 0.020 | 0.018 | 0.014 |
| I-Paraffins | 92.985 | 2,2,6-Trimethyloctane | 0.068 | 0.065 | 0.047 |
| I-Paraffins | 94.501 | C11-Isoparaffin-2 | 0.053 | 0.049 | 0.034 |
| I-Paraffins | 96.122 | 3-Ethyl-3-methylheptane | 0.062 | 0.057 | 0.039 |
| Mono-Aromatics | 64.108 | Toluene | 0.397 | 0.317 | 0.428 |
| Mono-Aromatics | 92.143 | 1,3,5-Trimethylbenzene | 0.036 | 0.029 | 0.030 |
| Mono-Aromatics | 123.384 | Hexamethylbenzene | 0.028 | 0.018 | 0.017 |
| Mono-Naphthenes | 37.908 | Methylcyclopentane | 0.062 | 0.057 | 0.073 |
| Mono-Naphthenes | 49.518 | 1t,3-Dimethylcyclopentane | 0.077 | 0.072 | 0.078 |
| Mono-Naphthenes | 50.060 | 1c,3-Dimethylcyclopentane | 0.044 | 0.041 | 0.044 |
| Mono-Naphthenes | 56.988 | Methylcyclohexane | 0.048 | 0.043 | 0.049 |
| Mono-Naphthenes | 57.889 | 1,1,3-Trimethylcyclopentane | 0.035 | 0.033 | 0.031 |
| Mono-Naphthenes | 68.342 | 1,3-dimethyl-t-cyclohexane | 0.055 | 0.050 | 0.049 |
| Mono-Naphthenes | 72.808 | 1c,4-Dimethylcyclohexane | 0.130 | 0.115 | 0.115 |
| Mono-Naphthenes | 77.065 | 1,1,4-Trimethylcyclohexane | 0.058 | 0.052 | 0.046 |
| Mono-Naphthenes | 78.129 | C9-MonoNaph-1 | 0.059 | 0.053 | 0.046 |
| Mono-Naphthenes | 79.867 | 1c,2t,4t-Trimethylcyclohexane | 0.060 | 0.053 | 0.047 |
| Mono-Naphthenes | 80.403 | C9-MonoNaph-4 | 0.033 | 0.030 | 0.026 |
| Mono-Naphthenes | 82.969 | C9 MonoNaph-7 | 0.101 | 0.088 | 0.080 |
| Mono-Naphthenes | 83.318 | Cyclohexane, 1,2,4-trimethyl-, | 0.065 | 0.058 | 0.051 |
| Mono-Naphthenes | 83.646 | C9 MonoNaph-8 | 0.024 | 0.021 | 0.019 |
| Mono-Naphthenes | 84.215 | Cyclopentane, 1-methyl-2-propyl- | 0.034 | 0.027 | 0.032 |
| Mono-Naphthenes | 86.575 | 1-ethyl-4-t-methylcyclohexane | 0.035 | 0.030 | 0.028 |
| Mono-Naphthenes | 88.888 | C10-MonoNaph-2 | 0.057 | 0.050 | 0.040 |
| Mono-Naphthenes | 89.262 | Propylcyclohexane | 0.104 | 0.090 | 0.082 |
| Mono-Naphthenes | 90.332 | C10-MonoNaph-3 | 0.024 | 0.021 | 0.017 |
| Mono-Naphthenes | 91.014 | C10-MonoNaph-4 | 0.058 | 0.051 | 0.041 |
| Mono-Naphthenes | 91.207 | C10-MonoNaph-6 | 0.064 | 0.056 | 0.045 |
| Mono-Naphthenes | 91.496 | C10-MonoNaph-8 | 0.030 | 0.026 | 0.022 |
| Mono-Naphthenes | 94.015 | C10-MonoNaph-17 | 0.027 | 0.023 | 0.019 |
| Mono-Naphthenes | 94.204 | C10-MonoNaph-18 | 0.035 | 0.031 | 0.025 |
| Mono-Naphthenes | 94.294 | C10-MonoNaph-19 | 0.030 | 0.026 | 0.022 |
| Mono-Naphthenes | 95.033 | C10-MonoNaph-20 | 0.035 | 0.030 | 0.025 |
| Mono-Naphthenes | 95.900 | 1t-Methyl-2-n-propylcyclohexan | 0.021 | 0.019 | 0.015 |
| Mono-Naphthenes | 96.455 | C10-MonoNaph-26 | 0.019 | 0.017 | 0.014 |
| Mono-Naphthenes | 96.728 | C10-MonoNaph-27 | 0.023 | 0.020 | 0.016 |
| Mono-Naphthenes | 98.563 | C10-MonoNaph-28 | 0.052 | 0.045 | 0.037 |
| Mono-Naphthenes | 100.711 | C11-MonoNaph-7 | 0.025 | 0.023 | 0.016 |
| Mono-Naphthenes | 100.830 | C11-MonoNaph-8 | 0.031 | 0.029 | 0.020 |
| Mono-Naphthenes | 102.572 | C11-MonoNaph-14 | 0.040 | 0.037 | 0.026 |
| Iso-Olefins | 76.440 | t-2,2-Dimethylheptene-3 | 0.025 | 0.025 | 0.019 |

TABLE 13-continued

Crude Product Sample No. 6776-031-16 Individual Components

| GROUP | TIME | COMPONENT | % WGT | % VOL | % MOL |
|---|---|---|---|---|---|
| Naphtheno-Olefins | 79.719 | C9 Naph-Olefin-1 | 0.021 | 0.020 | 0.017 |
| Naphtheno-Olefins | 87.600 | C10-NaphOlefin-1 | 0.021 | 0.018 | 0.015 |
| Oxygenates | 7.833 | Dimethylether | 0.436 | 0.458 | 0.942 |
| Oxygenates | 8.724 | Methanol | 0.781 | 0.684 | 2.425 |
| Unidentified | 73.999 | Unidentified | 0.016 | 0.014 | 0.014 |
| Unidentified | 79.913 | Unidentified | 0.021 | 0.019 | 0.017 |
| Unidentified | 83.877 | Unidentified | 0.022 | 0.021 | 0.016 |
| Unidentified | 87.698 | Unidentified | 0.023 | 0.016 | 0.016 |
| Unidentified | 96.608 | Unidentified | 0.017 | 0.013 | 0.012 |
| Unidentified | 99.035 | Unidentified | 0.040 | 0.037 | 0.026 |
| Unidentified | 129.638 | Unidentified | 0.049 | 0.034 | 0.026 |

TABLE 14

High Octane Gasoline Sample No. 6776-044-12-W Individual Components

| GROUP | CARBON# | COMPONENT | TIME | % WGT | % VOL | % MOL |
|---|---|---|---|---|---|---|
| Paraffin | 5 | n-Pentane | 16.573 | 0.033 | 0.036 | 0.044 |
| Paraffin | 6 | n-Hexane | 32.928 | 0.097 | 0.100 | 0.110 |
| Paraffin | 7 | n-Heptane | 53.478 | 0.007 | 0.007 | 0.007 |
| I-Paraffins | 5 | i-Pentane | 13.753 | 1.640 | 1.809 | 2.214 |
| I-Paraffins | 6 | 2,2-Dimethylbutane | 21.173 | 0.041 | 0.044 | 0.047 |
| I-Paraffins | 6 | 2,3-Dimethylbutane | 25.962 | 6.932 | 7.163 | 7.838 |
| I-Paraffins | 6 | 2-Methylpentane | 26.967 | 4.229 | 4.426 | 4.781 |
| I-Paraffins | 6 | 3-Methylpentane | 29.411 | 1.881 | 1.936 | 2.127 |
| I-Paraffins | 7 | 2,4-Dimethylpentane | 38.876 | 5.464 | 5.553 | 5.313 |
| I-Paraffins | 7 | 2,2,3-Trimethylbutane | 39.496 | 74.546 | 73.851 | 72.486 |
| I-Paraffins | 7 | 3,3-Dimethylpentane | 43.451 | 0.026 | 0.026 | 0.025 |
| I-Paraffins | 7 | 2-Methylhexane | 46.587 | 3.614 | 3.641 | 3.514 |
| I-Paraffins | 7 | 3-Methylhexane | 48.296 | 0.439 | 0.437 | 0.427 |
| I-Paraffins | 7 | 3-Ethylpentane | 50.35 | 0.010 | 0.009 | 0.009 |
| I-Paraffins | 8 | 2,2,4-Trimethylpentane | 50.735 | 0.015 | 0.014 | 0.012 |
| I-Paraffins | 8 | 2,2,3-Trimethylpentane | 59.719 | 0.013 | 0.012 | 0.011 |
| I-Paraffins | 8 | 2,5-Dimethylhexane | 59.981 | 0.092 | 0.091 | 0.079 |
| I-Paraffins | 8 | 2,4-Dimethylhexane | 60.289 | 0.060 | 0.058 | 0.051 |
| I-Paraffins | 8 | 2,3,4-Trimethylpentane | 63.105 | 0.012 | 0.011 | 0.010 |
| I-Paraffins | 8 | 2,3-Dimethylhexane | 65.539 | 0.016 | 0.015 | 0.014 |
| I-Paraffins | 9 | 2,2,5-Trimethylhexane | 70.067 | 0.007 | 0.007 | 0.005 |
| Mono-Aromatics | 7 | Toluene | 63.642 | 0.029 | 0.023 | 0.031 |
| Mono-Naphthenes | 6 | Methylcyclopentane | 37.347 | 0.306 | 0.279 | 0.354 |
| Mono-Naphthenes | 6 | Cyclohexane | 43.701 | 0.012 | 0.010 | 0.014 |
| Mono-Naphthenes | 7 | 1t,3-Dimethylcyclopentane | 49.024 | 0.275 | 0.251 | 0.273 |
| Mono-Naphthenes | 7 | 1c,3-Dimethylcyclopentane | 49.579 | 0.126 | 0.115 | 0.125 |
| Mono-Naphthenes | 7 | Methylcyclohexane | 56.505 | 0.060 | 0.054 | 0.060 |
| Mono-Naphthenes | 8 | 1,1,3-Trimethylcyclopentane | 57.425 | 0.012 | 0.011 | 0.011 |
| Iso-Olefins | 5 | 2-Methylbutene-2 | 19.206 | 0.007 | 0.008 | 0.010 |

TABLE 15

High Octane Gasoline Sample No. 6776-077-17 Individual Components

| GROUP | CARBON# | COMPONENT | TIME | % WGT | % VOL | % MOL |
|---|---|---|---|---|---|---|
| Paraffin | 6 | n-Hexane | 32.964 | 0.052 | 0.054 | 0.060 |
| I-Paraffins | 5 | i-Pentane | 13.805 | 0.016 | 0.018 | 0.022 |
| I-Paraffins | 6 | 2,3-Dimethylbutane | 26.033 | 0.133 | 0.138 | 0.154 |
| I-Paraffins | 6 | 2-Methylpentane | 27.039 | 0.141 | 0.149 | 0.163 |
| I-Paraffins | 6 | 3-Methylpentane | 29.478 | 0.173 | 0.180 | 0.201 |
| I-Paraffins | 7 | 2,4-Dimethylpentane | 38.923 | 8.094 | 8.287 | 8.078 |
| I-Paraffins | 7 | 2,2,3-Trimethylbutane | 39.556 | 87.411 | 87.235 | 87.242 |
| I-Paraffins | 7 | 3,3-Dimethylpentane | 43.476 | 0.017 | 0.017 | 0.017 |
| I-Paraffins | 7 | 2-Methylhexane | 46.608 | 2.717 | 2.758 | 2.712 |
| I-Paraffins | 7 | 3-Methylhexane | 48.321 | 0.281 | 0.282 | 0.280 |
| I-Paraffins | 8 | 2,5-Dimethylhexane | 60.023 | 0.010 | 0.010 | 0.008 |
| Mono-Aromatics | 6 | Benzene | 42.044 | 0.040 | 0.031 | 0.051 |
| Mono-Naphthenes | 6 | Methylcyclopentane | 37.367 | 0.379 | 0.349 | 0.451 |

TABLE 15-continued

High Octane Gasoline Sample No. 6776-077-17 Individual Components

| GROUP | CARBON# | COMPONENT | TIME | % WGT | % VOL | % MOL |
|---|---|---|---|---|---|---|
| Mono-Naphthenes | 6 | Cyclohexane | 43.71 | 0.046 | 0.040 | 0.054 |
| Mono-Naphthenes | 7 | 1t,3-Dimethylcyclopentane | 49.044 | 0.294 | 0.271 | 0.300 |
| Mono-Naphthenes | 7 | 1c,3-Dimethylcyclopentane | 49.598 | 0.120 | 0.111 | 0.123 |
| Mono-Naphthenes | 7 | Methylcyclohexane | 56.533 | 0.026 | 0.023 | 0.026 |
| Iso-Olefins | 6 | 2-Methylpentene-2 | 34.492 | 0.008 | 0.008 | 0.009 |
| Iso-Olefins | 7 | 4,4-Dimethyl-t-pentene-2 | 36.949 | 0.014 | 0.014 | 0.015 |
| Iso-Olefins | 7 | 1-Pentene, 2,3-dimethyl- | 44.324 | 0.014 | 0.014 | 0.014 |
| Naphtheno-Olefins | 6 | 1-Methylcyclopentene | 42.184 | 0.015 | 0.013 | 0.018 |

TABLE 16

Jet Fuel Sample No. 6776-109-28 Individual Components

| GROUP | CARBON# | COMPONENT | TIME | % WGT | % VOL | % MOL |
|---|---|---|---|---|---|---|
| Paraffin | 9 | n-Nonane | 87.225 | 0.237 | 0.257 | 0.263 |
| Paraffin | 10 | n-Decane | 98.207 | 1.008 | 1.074 | 1.007 |
| Paraffin | 11 | n-Undecane | 106.061 | 0.080 | 0.083 | 0.072 |
| I-Paraffins | 5 | i-Pentane | 14.852 | 0.036 | 0.045 | 0.070 |
| I-Paraffins | 7 | 2,2,3-Trimethylbutane | 41.11 | 0.029 | 0.033 | 0.041 |
| I-Paraffins | 7 | 2-Methylhexane | 48.465 | 0.032 | 0.037 | 0.046 |
| I-Paraffins | 7 | 3-Methylhexane | 50.172 | 0.006 | 0.007 | 0.009 |
| I-Paraffins | 8 | 2,2,3-Trimethylpentane | 61.632 | 0.006 | 0.006 | 0.007 |
| I-Paraffins | 8 | 2,5-Dimethylhexane | 61.857 | 0.047 | 0.053 | 0.059 |
| I-Paraffins | 8 | 2,4-Dimethylhexane | 62.164 | 0.033 | 0.037 | 0.041 |
| I-Paraffins | 8 | 2,3,4-Trimethylpentane | 65.008 | 0.009 | 0.010 | 0.011 |
| I-Paraffins | 8 | 2,3,3-Trimethylpentane | 65.642 | 0.013 | 0.014 | 0.017 |
| I-Paraffins | 8 | 2,3-Dimethylhexane | 67.35 | 0.017 | 0.019 | 0.021 |
| I-Paraffins | 8 | 2-Methylheptane | 68.612 | 0.019 | 0.021 | 0.023 |
| I-Paraffins | 8 | 4-Methylheptane | 68.839 | 0.003 | 0.003 | 0.003 |
| I-Paraffins | 8 | 3-Methylheptane | 69.887 | 0.008 | 0.009 | 0.010 |
| I-Paraffins | 9 | 2,2,5-Trimethylhexane | 71.692 | 0.021 | 0.023 | 0.023 |
| I-Paraffins | 9 | 2,3,5-Trimethylhexane | 76.543 | 0.014 | 0.015 | 0.016 |
| I-Paraffins | 9 | 2,4-Dimethylheptane | 77.673 | 0.003 | 0.003 | 0.003 |
| I-Paraffins | 9 | 2,6-Dimethylheptane | 78.573 | 0.015 | 0.016 | 0.016 |
| I-Paraffins | 9 | 2,5-Dimethylheptane | 79.428 | 0.028 | 0.031 | 0.031 |
| I-Paraffins | 9 | 2,3-Dimethylheptane | 82.052 | 0.031 | 0.034 | 0.035 |
| I-Paraffins | 9 | 3,3-Diethylpentane | 82.273 | 0.003 | 0.003 | 0.003 |
| I-Paraffins | 9 | 3,4-Dimethylheptane | 82.385 | 0.002 | 0.002 | 0.003 |
| I-Paraffins | 9 | 4-Methyloctane | 83.047 | 0.015 | 0.017 | 0.017 |
| I-Paraffins | 9 | 2-Methyloctane | 83.173 | 0.059 | 0.064 | 0.066 |
| I-Paraffins | 10 | C10 - IsoParaffin - 1 | 84.492 | 0.094 | 0.100 | 0.094 |
| I-Paraffins | 10 | C10 - Isoparaffin - 2 | 84.931 | 0.294 | 0.314 | 0.294 |
| I-Paraffins | 10 | 2,2,4-trimethylheptane | 85.687 | 0.271 | 0.289 | 0.270 |
| I-Paraffins | 10 | C10-isoparaffin-x | 88.648 | 0.000 | 0.000 | 0.000 |
| I-Paraffins | 10 | 2,3-Dimethyloctane | 89.093 | 2.182 | 2.340 | 2.179 |
| I-Paraffins | 10 | 2,3,6-trimethylheptane | 89.303 | 1.025 | 0.797 | 1.024 |
| I-Paraffins | 10 | 2,2-Dimethyloctane | 89.437 | 0.050 | 0.054 | 0.050 |
| I-Paraffins | 10 | C10 - IsoParaffin - 1(1) | 90.074 | 1.491 | 1.593 | 1.489 |
| I-Paraffins | 10 | 2,5-Dimethyloctane | 90.359 | 0.011 | 0.011 | 0.011 |
| I-Paraffins | 10 | 2,7-Dimethyloctane | 90.515 | 0.892 | 0.949 | 0.891 |
| I-Paraffins | 10 | C10 - IsoParaffin - 3 | 90.658 | 1.180 | 1.257 | 1.179 |
| I-Paraffins | 10 | 2,4-Dimethyloctane | 91.007 | 1.909 | 2.039 | 1.907 |
| I-Paraffins | 10 | 2,6-Dimethyloctane | 91.077 | 0.095 | 0.101 | 0.095 |
| I-Paraffins | 10 | 3,6-Dimethyloctane | 91.537 | 0.436 | 0.461 | 0.436 |
| I-Paraffins | 10 | C10 Isoparaffin -4 | 91.606 | 0.488 | 0.518 | 0.488 |
| I-Paraffins | 10 | 3-Methyl-5-ethylheptane | 92.997 | 0.238 | 0.255 | 0.238 |
| I-Paraffins | 10 | 4-Methylnonane | 93.774 | 0.552 | 0.585 | 0.551 |
| I-Paraffins | 10 | 2,2,6-Trimethyloctane | 93.907 | 1.502 | 1.607 | 1.500 |
| I-Paraffins | 10 | 2-Methylnonane | 94.029 | 0.975 | 1.043 | 0.974 |
| I-Paraffins | 10 | 3-Ethyloctane | 94.314 | 0.208 | 0.218 | 0.208 |
| I-Paraffins | 10 | 3-Ethyl-3-methylheptane | 97.045 | 1.277 | 1.334 | 1.161 |
| I-Paraffins | 11 | C11-Isoparaffin-2 | 95.414 | 2.431 | 2.539 | 2.210 |
| I-Paraffins | 11 | C11-Isoparaffin-3 | 98.76 | 0.851 | 0.889 | 0.774 |
| I-Paraffins | 11 | 2,5,6-Trimethyloctane | 98.853 | 0.594 | 0.621 | 0.540 |
| I-Paraffins | 11 | 3-Ethylnonane | 98.981 | 1.236 | 1.291 | 1.123 |
| I-Paraffins | 11 | C11 Isoparaffin-4 | 99.33 | 1.298 | 1.355 | 1.180 |
| I-Paraffins | 11 | C11-Isoparaffin-5 | 99.672 | 0.548 | 0.573 | 0.499 |
| I-Paraffins | 11 | C11-Isoparaffin-6 | 99.956 | 0.767 | 0.801 | 0.698 |
| I-Paraffins | 11 | C11 - IsoParaffin - 15 | 101.159 | 0.790 | 0.825 | 0.718 |
| I-Paraffins | 11 | C11-Isoparaffin-8 | 102.238 | 0.197 | 0.206 | 0.179 |
| I-Paraffins | 11 | C11-Isoparaffin-9 | 102.813 | 0.279 | 0.292 | 0.254 |
| I-Paraffins | 11 | C11- Isoparaffin-10 | 103.317 | 0.194 | 0.203 | 0.176 |

TABLE 16-continued

Jet Fuel Sample No. 6776-109-28 Individual Components

| GROUP | CARBON# | COMPONENT | TIME | % WGT | % VOL | % MOL |
|---|---|---|---|---|---|---|
| Mono-Aromatics | 9 | 1,3,5-Trimethylbenzene | 93.06 | 1.525 | 1.370 | 1.803 |
| Mono-Aromatics | 9 | 1,2,4-Trimethylbenzene | 95.507 | 0.587 | 0.521 | 0.694 |
| Mono-Aromatics | 9 | C9 - Aromatic - 1 | 103.111 | 0.430 | 0.373 | 0.508 |
| Mono-Aromatics | 10 | i-Butylbenzene | 97.54 | 0.633 | 0.576 | 0.670 |
| Mono-Aromatics | 10 | sec-Butylbenzene | 97.984 | 0.479 | 0.432 | 0.507 |
| Mono-Aromatics | 10 | 1-Methyl-4-n-propylbenzene | 101.243 | 0.031 | 0.028 | 0.032 |
| Mono-Aromatics | 10 | 1,2-Diethylbenzene | 101.961 | 0.374 | 0.330 | 0.396 |
| Mono-Aromatics | 10 | 1-Methyl-2-n-propylbenzene | 102.364 | 0.158 | 0.141 | 0.167 |
| Mono-Aromatics | 10 | 1,2-Dimethyl-4-ethylbenzene | 103.833 | 0.183 | 0.163 | 0.194 |
| Mono-Aromatics | 10 | 1,2-Dimethyl-3-ethylbenzene | 105.505 | 0.142 | 0.124 | 0.151 |
| Mono-Aromatics | 11 | 1-Ethyl-2-i-propylbenzene | 105.85 | 0.040 | 0.035 | 0.038 |
| Mono-Aromatics | 11 | 1-Methyl-1-n-butylbenzene | 105.893 | 0.056 | 0.048 | 0.053 |
| Indenes | 9 | Indan | 99.136 | 0.419 | 0.337 | 0.503 |
| Mono-Naphthenes | 7 | Methylcyclohexane | 58.426 | 0.007 | 0.007 | 0.010 |
| Mono-Naphthenes | 8 | 1,1,3-Trimethylcyclopentane | 59.334 | 0.003 | 0.003 | 0.003 |
| Mono-Naphthenes | 8 | 1,3-dimethyl-c-cyclohexane | 69.996 | 0.002 | 0.002 | 0.003 |
| Mono-Naphthenes | 8 | Cyclopentane, 1-methyl-2-propyl- | 85.204 | 0.186 | 0.164 | 0.249 |
| Mono-Naphthenes | 9 | 1,1,4-Trimethylcyclohexane | 78.165 | 0.014 | 0.014 | 0.016 |
| Mono-Naphthenes | 9 | C9 - MonoNaph - 1 | 79.224 | 0.014 | 0.014 | 0.015 |
| Mono-Naphthenes | 9 | 1c,2t,4t-Trimethylcyclohexane | 80.927 | 0.039 | 0.039 | 0.044 |
| Mono-Naphthenes | 9 | C9 - MonoNaph - 4 | 81.449 | 0.034 | 0.034 | 0.038 |
| Mono-Naphthenes | 9 | C9 - MonoNapth - 5 | 82.574 | 0.007 | 0.007 | 0.008 |
| Mono-Naphthenes | 9 | C9 MonoNaph - 6 | 83.767 | 0.017 | 0.016 | 0.019 |
| Mono-Naphthenes | 9 | C9 MonoNaph - 7 | 83.972 | 0.189 | 0.183 | 0.213 |
| Mono-Naphthenes | 9 | Cyclohexane, 1,2,4-trimethyl-, | 84.315 | 0.177 | 0.178 | 0.199 |
| Mono-Naphthenes | 9 | C9 MonoNaph - 8 | 84.651 | 0.154 | 0.150 | 0.174 |
| Mono-Naphthenes | 9 | Cyclohexane, 1-ethyl-4-methyl-, trans- | 85.351 | 0.109 | 0.109 | 0.122 |
| Mono-Naphthenes | 9 | 1,1,2-Trimethylcyclohexane | 85.646 | 0.115 | 0.112 | 0.129 |
| Mono-Naphthenes | 9 | i-Butylcyclopentane | 86.279 | 0.006 | 0.006 | 0.006 |
| Mono-Naphthenes | 9 | 1,1-Methylethylcyclohexane | 87.468 | 0.036 | 0.035 | 0.041 |
| Mono-Naphthenes | 9 | 1-ethyl-4-t-methylcyclohexane | 87.548 | 0.531 | 0.512 | 0.598 |
| Mono-Naphthenes | 9 | C9-MonoNaphthene-9 | 87.847 | 0.196 | 0.191 | 0.221 |
| Mono-Naphthenes | 9 | 1,2,3,5-c-Tetramethylcyclohex | 88.408 | 0.346 | 0.348 | 0.389 |
| Mono-Naphthenes | 9 | 1-Methyl-2-propyl-cyclopentan | 88.648 | 0.047 | 0.046 | 0.053 |
| Mono-Naphthenes | 9 | Propylcyclohexane | 90.242 | 2.778 | 2.691 | 3.127 |
| Mono-Naphthenes | 10 | C10 - MonoNaph - 1 | 86.103 | 0.017 | 0.018 | 0.017 |
| Mono-Naphthenes | 10 | C10-MonoNaph-2 | 89.867 | 2.614 | 2.553 | 2.649 |
| Mono-Naphthenes | 10 | C10-MonoNaph-3 | 91.298 | 2.077 | 2.028 | 2.104 |
| Mono-Naphthenes | 10 | C10-MonoNaph-4 | 91.976 | 1.846 | 1.802 | 1.870 |
| Mono-Naphthenes | 10 | C10-MonoNaph-5 | 92.127 | 1.153 | 1.126 | 1.169 |
| Mono-Naphthenes | 10 | C10-MonoNaph-6 | 92.188 | 3.076 | 3.003 | 3.116 |
| Mono-Naphthenes | 10 | C10-MonoNaph-7 | 92.351 | 0.351 | 0.343 | 0.356 |
| Mono-Naphthenes | 10 | C10-MonoNaph-8 | 92.472 | 3.000 | 2.929 | 3.040 |
| Mono-Naphthenes | 10 | C10-MonoNaph-9 | 92.562 | 0.924 | 0.902 | 0.936 |
| Mono-Naphthenes | 10 | C10-MonoNaph-10 | 92.692 | 0.656 | 0.641 | 0.665 |
| Mono-Naphthenes | 10 | C10-MonoNaph-11 | 93.262 | 0.422 | 0.412 | 0.427 |
| Mono-Naphthenes | 10 | C10-MonoNaph-12 | 93.427 | 1.560 | 1.523 | 1.580 |
| Mono-Naphthenes | 10 | C10-MonoNaph-13 | 93.54 | 0.440 | 0.430 | 0.446 |
| Mono-Naphthenes | 10 | C10-MonoNaph-15 | 94.652 | 1.799 | 1.757 | 1.823 |
| Mono-Naphthenes | 10 | C10-MonoNaph-16 | 94.822 | 1.577 | 1.540 | 1.598 |
| Mono-Naphthenes | 10 | C10-MonoNaph-17 | 94.952 | 1.521 | 1.485 | 1.541 |
| Mono-Naphthenes | 10 | C10-MonoNaph-18 | 95.08 | 0.862 | 0.842 | 0.874 |
| Mono-Naphthenes | 10 | C10-MonoNaph-19 | 95.252 | 1.583 | 1.545 | 1.604 |
| Mono-Naphthenes | 10 | i-Butylcyclohexane | 95.84 | 0.721 | 0.704 | 0.730 |
| Mono-Naphthenes | 10 | C10-MonoNaph-20 | 95.928 | 1.772 | 1.731 | 1.796 |
| Mono-Naphthenes | 10 | C10-MonoNaph-21 | 96.139 | 1.533 | 1.497 | 1.553 |
| Mono-Naphthenes | 10 | C10-MonoNaph-22 | 96.271 | 0.548 | 0.535 | 0.555 |
| Mono-Naphthenes | 10 | C10-MonoNaph-23 | 96.369 | 0.542 | 0.529 | 0.549 |
| Mono-Naphthenes | 10 | C10-MonoNaph-24 | 96.774 | 0.751 | 0.733 | 0.760 |
| Mono-Naphthenes | 10 | 1t-Methyl-2-n-propylcyclohexan | 96.893 | 0.238 | 0.231 | 0.241 |
| Mono-Naphthenes | 10 | C10-MonoNaph-25 | 97.267 | 0.841 | 0.821 | 0.852 |
| Mono-Naphthenes | 10 | C10-MonoNaph-26 | 97.345 | 0.543 | 0.530 | 0.550 |
| Mono-Naphthenes | 10 | C10-MonoNaph-27 | 97.656 | 1.091 | 1.065 | 1.105 |
| Mono-Naphthenes | 10 | sec-Butylcyclohexane | 99.256 | 0.409 | 0.390 | 0.414 |
| Mono-Naphthenes | 10 | C10-MonoNaph-28 | 99.487 | 3.390 | 3.310 | 3.435 |
| Mono-Naphthenes | 10 | n-ButylCyclohexane | 99.999 | 0.919 | 0.877 | 0.931 |
| Mono-Naphthenes | 10 | C10-MonoNaph-29 | 100.122 | 0.569 | 0.556 | 0.577 |
| Mono-Naphthenes | 10 | C11-MonoNaph-1 | 100.332 | 1.074 | 1.026 | 0.990 |
| Mono-Naphthenes | 11 | C11-MonoNaph-2 | 100.496 | 0.811 | 0.774 | 0.747 |
| Mono-Naphthenes | 11 | C11-MonoNaph-3 | 100.612 | 1.299 | 1.240 | 1.197 |
| Mono-Naphthenes | 11 | C11-MonoNaph-4 | 100.972 | 0.909 | 0.949 | 0.838 |
| Mono-Naphthenes | 11 | C11-MonoNaph-5 | 101.111 | 0.501 | 0.524 | 0.462 |
| Mono-Naphthenes | 11 | C11-MonoNaph-6 | 101.458 | 1.030 | 1.076 | 0.949 |
| Mono-Naphthenes | 11 | C11-MonoNaph-7 | 101.618 | 1.364 | 1.425 | 1.257 |
| Mono-Naphthenes | 11 | C11-MonoNaph-8 | 101.732 | 1.622 | 1.694 | 1.495 |

TABLE 16-continued

Jet Fuel Sample No. 6776-109-28 Individual Components

| GROUP | CARBON# | COMPONENT | TIME | % WGT | % VOL | % MOL |
|---|---|---|---|---|---|---|
| Mono-Naphthenes | 11 | C11-MonoNaph-9 | 101.93 | 0.633 | 0.661 | 0.584 |
| Mono-Naphthenes | 11 | C11-MonoNaph-11 | 102.136 | 1.137 | 1.188 | 1.048 |
| Mono-Naphthenes | 11 | C11-MonoNaph-12 | 102.52 | 0.425 | 0.444 | 0.392 |
| Mono-Naphthenes | 11 | C11-MonoNaph-13 | 103.001 | 0.191 | 0.200 | 0.176 |
| Mono-Naphthenes | 11 | C11-MonoNaph-14 | 103.457 | 0.775 | 0.810 | 0.714 |
| Mono-Naphthenes | 11 | C11-MonoNaph-15 | 103.606 | 0.590 | 0.616 | 0.544 |
| Mono-Naphthenes | 11 | C11-MonoNaph-17 | 103.965 | 0.179 | 0.187 | 0.165 |
| Mono-Naphthenes | 11 | C11-MonoNaph-18 | 104.234 | 0.259 | 0.271 | 0.239 |
| Mono-Naphthenes | 11 | C11-MonoNaph-19 | 104.53 | 0.342 | 0.357 | 0.315 |
| Mono-Naphthenes | 11 | C11-MonoNaph-20 | 104.802 | 0.041 | 0.043 | 0.038 |
| Mono-Naphthenes | 11 | C11-MonoNaph-21 | 104.872 | 0.231 | 0.242 | 0.213 |
| Mono-Naphthenes | 11 | C11-MonoNaph-22 | 104.927 | 0.106 | 0.111 | 0.098 |
| Mono-Naphthenes | 12 | C12-MonoNaph-1 | 105.154 | 0.278 | 0.270 | 0.235 |
| n-Olefins | 8 | Octene-1 | 74.005 | 0.013 | 0.013 | 0.016 |
| n-Olefins | 9 | t-Nonene-3 | 87.085 | 0.479 | 0.545 | 0.539 |
| n-Olefins | 10 | 4-Decene | 96.713 | 0.183 | 0.192 | 0.185 |
| n-Olefins | 10 | 3-Decene | 98.549 | 0.431 | 0.452 | 0.436 |
| Iso-Olefins | 9 | t-2-Methyloctene-3 | 86.937 | 0.161 | 0.183 | 0.181 |
| Iso-Olefins | 10 | C10 - IsoOlefin - 1 | 87.357 | 0.004 | 0.005 | 0.005 |
| Iso-Olefins | 10 | C10-IsoOlefin-4 | 88.648 | 0.047 | 0.052 | 0.048 |
| Iso-Olefins | 10 | C10 Iso-olefin - 5 | 88.989 | 0.186 | 0.207 | 0.189 |
| Iso-Olefins | 10 | C10 Iso-olefin - 6 | 89.672 | 0.008 | 0.009 | 0.008 |
| Iso-Olefins | 10 | C10 - IsoOlefin - 8 | 91.755 | 0.136 | 0.151 | 0.138 |
| Iso-Olefins | 10 | C10-IsoOlefin - 9 | 91.915 | 0.255 | 0.282 | 0.258 |
| Iso-Olefins | 10 | C10 - IsoOlefin - 11 | 94.252 | 0.101 | 0.112 | 0.103 |
| Iso-Olefins | 10 | C10-IsoOlefin -15 | 95.662 | 0.511 | 0.566 | 0.518 |
| Iso-Olefins | 10 | 3-Nonene, 3-methyl-, (E)- | 96.532 | 0.323 | 0.340 | 0.328 |
| Iso-Olefins | 11 | C11 - IsoOlefin - 1 | 102.637 | 0.397 | 0.417 | 0.366 |
| Iso-Olefins | 11 | C11 - IsoOlefin - 2 | 104.124 | 0.280 | 0.294 | 0.258 |
| Naphtheno-Olefins | 9 | C9 - NaphOlefin - 3 | 82.741 | 0.006 | 0.007 | 0.007 |
| Naphtheno-Olefins | 9 | C9 - NaphOlefin - 2 | 83.351 | 0.022 | 0.023 | 0.025 |
| Naphtheno-Olefins | 9 | C9-Naphtheno-olefin-5 | 89.557 | 0.280 | 0.298 | 0.321 |
| Naphtheno-Olefins | 10 | Cyclopentene, 1,2,3,4,5-pentamethyl- | 86.757 | 0.089 | 0.087 | 0.092 |
| Naphtheno-Olefins | 10 | C10 - NaphOlefin - 1 | 88.547 | 0.138 | 0.134 | 0.142 |
| Naphtheno-Olefins | 10 | C9-NaphthenoOlefin-6 | 89.672 | 0.000 | 0.000 | 0.000 |

TABLE 17

Heavy Aromatic Molecules Sample No. 6776-107-27 Individual Components

| GROUP | CARBON# | COMPONENT | TIME | % WGT | % VOL | % MOL |
|---|---|---|---|---|---|---|
| I-Paraffins | 5 | i-Pentane | 14.873 | 0.031 | 0.044 | 0.071 |
| I-Paraffins | 7 | 2,2,3-Trimethylbutane | 41.133 | 0.022 | 0.027 | 0.036 |
| I-Paraffins | 7 | 2-Methylhexane | 48.487 | 0.020 | 0.025 | 0.032 |
| I-Paraffins | 8 | 2,5-Dimethylhexane | 61.902 | 0.021 | 0.026 | 0.030 |
| I-Paraffins | 8 | 2,4-Dimethylhexane | 62.207 | 0.012 | 0.014 | 0.017 |
| I-Paraffins | 8 | 2,3-Dimethylhexane | 67.378 | 0.007 | 0.008 | 0.009 |
| I-Paraffins | 8 | 2-Methylheptane | 68.643 | 0.008 | 0.010 | 0.011 |
| I-Paraffins | 9 | 2,5-Dimethylheptane | 79.455 | 0.011 | 0.013 | 0.014 |
| I-Paraffins | 10 | 2,3-Dimethyloctane | 89.107 | 0.012 | 0.015 | 0.014 |
| I-Paraffins | 10 | C10 - IsoParaffin - 1(1) | 90.085 | 0.008 | 0.009 | 0.009 |
| I-Paraffins | 10 | 2,6-Dimethyloctane | 91.002 | 0.006 | 0.007 | 0.007 |
| I-Paraffins | 10 | 2,2,6-Trimethyloctane | 93.912 | 0.006 | 0.007 | 0.007 |
| I-Paraffins | 11 | C11-Isoparaffin-1 | 95.418 | 0.012 | 0.014 | 0.012 |
| I-Paraffins | 10 | C10 - IsoParaffin - 6 | 95.959 | 0.013 | 0.016 | 0.015 |
| I-Paraffins | 11 | C11-Isoparaffin-3 | 98.762 | 0.015 | 0.018 | 0.016 |
| I-Paraffins | 11 | 2,5,6-Trimethyloctane | 98.868 | 0.010 | 0.012 | 0.011 |
| I-Paraffins | 11 | 3-Ethylnonane | 98.987 | 0.042 | 0.049 | 0.044 |
| I-Paraffins | 11 | C11 Isoparaffin-4 | 99.338 | 0.019 | 0.022 | 0.020 |
| I-Paraffins | 11 | C11-Isoparaffin-6 | 99.68 | 0.128 | 0.149 | 0.135 |
| I-Paraffins | 11 | C11-Isoparaffin-9 | 102.27 | 0.012 | 0.014 | 0.013 |
| I-Paraffins | 11 | C11- Isoparaffin - 12 | 103.013 | 0.039 | 0.045 | 0.041 |
| Iso-Olefins | 6 | 2-Methylpentene-2 | 36.72 | 0.013 | 0.016 | 0.025 |
| Iso-Olefins | 9 | 3,3-Dimethylheptene-1 | 76.57 | 0.008 | 0.009 | 0.010 |
| Iso-Olefins | 10 | 3-Nonene, 3-methyl-,(E)- | 96.546 | 0.006 | 0.007 | 0.008 |
| Iso-Olefins | 10 | 2,3-Dimethyloctene-2 | 97.058 | 0.053 | 0.062 | 0.062 |
| Iso-Olefins | 11 | C11 - IsoOlefin - 1 | 102.151 | 0.412 | 0.482 | 0.441 |

TABLE 17-continued

Heavy Aromatic Molecules Sample No. 6776-107-27 Individual Components

| GROUP | CARBON# | COMPONENT | TIME | % WGT | % VOL | % MOL |
|---|---|---|---|---|---|---|
| Iso-Olefins | 11 | C11 - IsoOlefin - 2 | 103.478 | 1.081 | 1.264 | 1.158 |
| Mono-Aromatics | 10 | n-Butylbenzene | 100.973 | 0.176 | 0.177 | 0.217 |
| Mono-Aromatics | 10 | 1-Methyl-2-n-propylbenzene | 101.942 | 0.383 | 0.379 | 0.471 |
| Mono-Aromatics | 9 | 1-Methyl-2-n-C9 - Aromatic - 1 | 102.532 | 0.421 | 0.407 | 0.579 |
| Mono-Aromatics | 10 | 1,2-Dimethyl-4-ethylbenzene | 103.134 | 0.156 | 0.155 | 0.192 |
| Mono-Aromatics | 11 | 1-Ethyl-3-i-propylbenzene | 104.439 | 0.009 | 0.009 | 0.010 |
| Mono-Aromatics | 10 | 1,2-Dimethyl-3-ethylbenzene | 104.693 | 0.032 | 0.031 | 0.040 |
| Mono-Aromatics | 11 | 1-Ethyl-2-i-propylbenzene | 104.928 | 0.395 | 0.384 | 0.440 |
| Mono-Aromatics | 11 | Pentamethylbenzene | 115.894 | 0.227 | 0.197 | 0.253 |
| Mono-Aromatics | 12 | Hexamethylbenzene | 123.992 | 17.498 | 14.281 | 17.838 |
| Mono-Aromatics | 13 | Benzene, ethylpentamethyl- | 125.997 | 0.537 | 0.464 | 0.504 |
| Mono-Naphthenes | 8 | 1t,4-Dimethylcyclohexane | 71.725 | 0.012 | 0.014 | 0.018 |
| Mono-Naphthenes | 9 | C9 MonoNaph - 7 | 84.006 | 0.007 | 0.007 | 0.009 |
| Mono-Naphthenes | 10 | C10-MonoNaph-2 | 89.879 | 0.010 | 0.011 | 0.012 |
| Mono-Naphthenes | 9 | Propylcyclohexane | 90.257 | 0.011 | 0.011 | 0.014 |
| Mono-Naphthenes | 10 | C10-MonoNaph-3 | 91.301 | 0.008 | 0.008 | 0.009 |
| Mono-Naphthenes | 10 | C10-MonoNaph-4 | 91.994 | 0.006 | 0.006 | 0.007 |
| Mono-Naphthenes | 10 | C10-MonoNaph-6 | 92.182 | 0.017 | 0.019 | 0.020 |
| Mono-Naphthenes | 10 | C10-MonoNaph-8 | 92.471 | 0.013 | 0.015 | 0.016 |
| Mono-Naphthenes | 10 | C10-MonoNaph-11 | 93.268 | 0.008 | 0.009 | 0.010 |
| Mono-Naphthenes | 10 | C10-MonoNaph-12 | 93.443 | 0.006 | 0.007 | 0.007 |
| Mono-Naphthenes | 10 | C10-MonoNaph-15 | 94.656 | 0.008 | 0.009 | 0.010 |
| Mono-Naphthenes | 10 | C10-MonoNaph-16 | 94.837 | 0.007 | 0.008 | 0.009 |
| Mono-Naphthenes | 10 | C10-MonoNaph-17 | 94.966 | 0.008 | 0.008 | 0.009 |
| Mono-Naphthenes | 10 | C10-MonoNaph-19 | 95.27 | 0.008 | 0.009 | 0.009 |
| Mono-Naphthenes | 10 | C10-MonoNaph-20 | 96.147 | 0.013 | 0.014 | 0.015 |
| Mono-Naphthenes | 10 | C10-MonoNaph-22 | 96.285 | 0.006 | 0.006 | 0.007 |
| Mono-Naphthenes | 10 | C10-MonoNaph-25 | 97.55 | 0.037 | 0.040 | 0.043 |
| Mono-Naphthenes | 10 | C10-MonoNaph-26 | 97.674 | 0.016 | 0.017 | 0.018 |
| Mono-Naphthenes | 10 | sec-Butylcyclohexane | 99.15 | 0.013 | 0.014 | 0.016 |
| Mono-Naphthenes | 10 | C10-MonoNaph-28 | 99.493 | 0.474 | 0.515 | 0.558 |
| Mono-Naphthenes | 10 | C10-MonoNaph-29 | 99.983 | 0.437 | 0.475 | 0.515 |
| Mono-Naphthenes | 10 | C11-MonoNaph-1 | 100.156 | 0.052 | 0.055 | 0.056 |
| Mono-Naphthenes | 11 | C11-MonoNaph-3 | 100.338 | 0.268 | 0.285 | 0.287 |
| Mono-Naphthenes | 11 | C11-MonoNaph-4 | 100.503 | 0.203 | 0.236 | 0.218 |
| Mono-Naphthenes | 11 | C11-MonoNaph-5 | 100.85 | 0.057 | 0.067 | 0.061 |
| Mono-Naphthenes | 11 | C11-MonoNaph-6 | 101.119 | 0.293 | 0.341 | 0.314 |
| Mono-Naphthenes | 11 | C11-MonoNaph-8 | 101.285 | 0.010 | 0.011 | 0.010 |
| Mono-Naphthenes | 11 | C11-MonoNaph-9 | 101.468 | 0.452 | 0.526 | 0.485 |
| Mono-Naphthenes | 11 | C11-MonoNaph-11 | 101.749 | 0.605 | 0.704 | 0.648 |
| Mono-Naphthenes | 11 | C11-MonoNaph-12 | 102.026 | 0.016 | 0.019 | 0.017 |
| Mono-Naphthenes | 11 | C11-MonoNaph-13 | 102.473 | 0.013 | 0.015 | 0.014 |
| Mono-Naphthenes | 11 | C11-MonoNaph-14 | 102.844 | 0.200 | 0.233 | 0.214 |
| Mono-Naphthenes | 11 | C11-MonoNaph-17 | 103.342 | 0.106 | 0.124 | 0.114 |
| Mono-Naphthenes | 11 | C11-MonoNaph-18 | 103.62 | 0.108 | 0.125 | 0.115 |
| Mono-Naphthenes | 11 | C11-MonoNaph-19 | 103.857 | 0.109 | 0.127 | 0.117 |
| Mono-Naphthenes | 11 | C11-MonoNaph-20 | 103.995 | 0.177 | 0.206 | 0.189 |
| Mono-Naphthenes | 11 | C11-MonoNaph-22 | 104.147 | 0.401 | 0.466 | 0.430 |
| Mono-Naphthenes | 12 | C12-MonoNaph-1 | 104.351 | 0.007 | 0.008 | 0.007 |
| Mono-Naphthenes | 12 | C12-MonoNaph-2 | 106.824 | 0.623 | 0.674 | 0.611 |
| Mono-Naphthenes | 12 | C12-MonoNaph-3 | 107.15 | 0.732 | 0.792 | 0.718 |
| Mono-Naphthenes | 12 | C12-MonoNaph-4 | 107.513 | 0.518 | 0.560 | 0.508 |
| Mono-Naphthenes | 12 | C12-MonoNaph-5 | 107.639 | 1.634 | 1.767 | 1.603 |
| Mono-Naphthenes | 12 | C12-MonoNaph-6 | 108.037 | 0.399 | 0.432 | 0.392 |
| Mono-Naphthenes | 12 | C12-MonoNaph-7 | 108.144 | 1.785 | 1.931 | 1.752 |
| Mono-Naphthenes | 12 | C12-MonoNaph-8 | 108.366 | 1.139 | 1.232 | 1.117 |
| Mono-Naphthenes | 12 | C12-MonoNaph-9 | 108.513 | 0.382 | 0.413 | 0.375 |
| Mono-Naphthenes | 12 | C12-MonoNaph-10 | 108.678 | 1.249 | 1.351 | 1.226 |
| Mono-Naphthenes | 12 | C12-MonoNaph-11 | 108.717 | 0.378 | 0.409 | 0.371 |
| Mono-Naphthenes | 12 | C12-MonoNaph-12 | 108.91 | 0.547 | 0.592 | 0.537 |
| Mono-Naphthenes | 12 | C12-MonoNaph-13 | 109.052 | 1.594 | 1.724 | 1.564 |
| Mono-Naphthenes | 12 | C12-MonoNaph-15 | 109.436 | 0.966 | 1.045 | 0.948 |
| Mono-Naphthenes | 12 | C12-MonoNaph-16 | 109.575 | 0.130 | 0.140 | 0.127 |
| Mono-Naphthenes | 12 | C12-MonoNaph-17 | 109.875 | 2.189 | 2.367 | 2.148 |
| Mono-Naphthenes | 12 | C12-MonoNaph-19 | 110.119 | 0.055 | 0.060 | 0.054 |
| Mono-Naphthenes | 12 | C12-MonoNaph-20 | 110.239 | 0.617 | 0.667 | 0.605 |
| Mono-Naphthenes | 12 | C12-MonoNaph-21 | 110.777 | 0.677 | 0.732 | 0.664 |
| Mono-Naphthenes | 12 | C12-MonoNaph-22 | 111.025 | 0.484 | 0.524 | 0.475 |

TABLE 17-continued

Heavy Aromatic Molecules Sample No. 6776-107-27 Individual Components

| GROUP | CARBON# | COMPONENT | TIME | % WGT | % VOL | % MOL |
|---|---|---|---|---|---|---|
| Mono-Naphthenes | 12 | C12-MonoNaph-23 | 111.158 | 0.613 | 0.662 | 0.601 |
| Mono-Naphthenes | 13 | C13-MonoNaph-1 | 111.607 | 0.336 | 0.364 | 0.305 |
| Mono-Naphthenes | 13 | C13-MonoNaph-2 | 111.775 | 1.191 | 1.288 | 1.079 |
| Mono-Naphthenes | 13 | C13-MonoNaph-3 | 112.139 | 1.202 | 1.300 | 1.089 |
| Mono-Naphthenes | 13 | C13-MonoNaph-4 | 112.327 | 1.364 | 1.475 | 1.236 |
| Mono-Naphthenes | 13 | C13-MonoNaph-5 | 113.176 | 0.116 | 0.126 | 0.105 |
| Mono-Naphthenes | 13 | C13-MonoNaph-6 | 113.518 | 0.331 | 0.358 | 0.300 |
| Mono-Naphthenes | 13 | C13-MonoNaph-7 | 114.046 | 0.258 | 0.279 | 0.234 |
| Mono-Naphthenes | 13 | C13-MonoNaph-8 | 114.135 | 0.778 | 0.841 | 0.705 |
| Mono-Naphthenes | 13 | C13-MonoNaph-9 | 114.288 | 0.666 | 0.720 | 0.604 |
| Mono-Naphthenes | 13 | C13-MonoNaph-10 | 115.053 | 0.200 | 0.216 | 0.181 |
| Naphtheno/Olefino-Benzs | 13 | Naphthalene, 1,2,3,4-tetrahydro-1,1,6-trimethyl- | 127.925 | 0.293 | 0.253 | 0.278 |
| Naphtheno/Olefino-Benzs | 14 | Naphthalene, 1,2,3,4-tetrahydro-5,6,7,8-tetrameth | 128.772 | 0.169 | 0.146 | 0.149 |
| n-Olefins | 10 | 3-Decene | 98.562 | 0.013 | 0.015 | 0.016 |
| n-Olefins | 11 | 5-Undecene | 104.255 | 0.015 | 0.017 | 0.017 |
| Paraffin | 7 | n-Heptane | 55.327 | 0.006 | 0.008 | 0.010 |
| Paraffin | 10 | n-Decane | 98.218 | 0.068 | 0.081 | 0.079 |
| Paraffin | 11 | n-Undecane | 105.179 | 1.247 | 1.450 | 1.317 |
| Paraffin | 13 | n-Tridecane | 116.97 | 0.677 | 0.774 | 0.606 |
| Paraffin | 14 | n-Tetradecane | 121.311 | 0.314 | 0.357 | 0.262 |

Crude Product Examples

Example 1: A mixture comprising: a first portion comprising at least one of a paraffin or a naphthene having between 5 carbons and 13 carbons, inclusively, at a first concentration between about 75 wt % and about 99 wt %; and a second portion comprising hydrocarbons having greater than 13 carbons at a second concentration of less than 0.05 wt %.

Example 2. The mixture of Example 1, wherein the first concentration is between about 83 wt % and about 97 wt %.

Example 3. The mixture of Example 1, wherein the second concentration is between about 0.0001 wt % and about 0.05 wt %.

Example 4. The mixture of Example 1, wherein the naphthene comprises at least one of a cyclopentane or a cyclohexane.

Example 5. The mixture of Example 4, wherein at least one of the cyclopentane or the cyclohexane is methylated.

Example 6. The mixture of Example 5, wherein the cyclopentane comprises at least one of methylcyclopentane, 1t,3-dimethylcyclopentane, 1c,3-dimethylcyclopentane, methylcyclohexane, 1,1,3-trimethylcyclopentane, ethylcyclopentane, 1c,2t,4-trimethylcyclopentane, 1,3-dimethyl-t-cyclohexane, 1-methyl-2-propyl-cyclopentane, i-butylcyclopentane, and/or 3c-ethylmethylcyclopentane.

Example 7. The mixture of Example 5, wherein the cyclohexane comprises at least one of 1,3-dimethyl-t-cyclohexane, 3c-ethylmethylcyclopentane, 1t,2-dimethylcyclohexane, 1c,4-dimethylcyclohexane, 1c,2-dimethylcyclohexane, 1,1,4-trimethylcyclohexane, 1c,3c,5-trimethylcyclohexane, 1-ethyl-4-methyl-trans-cyclohexane, 1,1,2-trimethylcyclohexane, 1-ethyl-4-t-methylcyclohexane, 1,2,3,5-c-tetramethylcyclohexane, propylcyclohexane, 1t-methyl-2-n-propylcyclohexane, or sec-butylcyclohexane.

Example 8. The mixture of Example 1, wherein the paraffin comprises an iso-paraffin at a third concentration between about 60 wt % and about 99 wt %.

Example 9. The mixture of Example 8, wherein the third concentration is between about 64 wt % and about 96 wt %.

Example 10. The first mixture of Example 8, wherein the iso-paraffin comprises at least one of i-pentane, 2,3-dimethylbutane, 2-methylpentane, 3-methylpentane, 2,4-dimethylpentane, 2,2,3-trimethylbutane, 3,3-dimethylpentane, 2-methylhexane, 3-methylhexane, 3-ethylpentane, 2,2,4-trimethylpentane, 2,2-dimethylhexane, 2,2,3-trimethylpentane, 2,5-dimethylhexane, 2,4-dimethylhexane, 3,3-dimethylhexane, 2,3,4-trimethylpentane, 2,3-dimethylhexane, 2-methylheptane, 4-methylheptane, 3,4-dimethylhexane, 3-methylheptane, 2,2,5-trimethylhexane, 2,3,5-trimethylhexane, 2,4-dimethylheptane, 2,2,3-trimethylhexane, 2,6-dimethylheptane, 2,5-dimethylheptane, 2-methyl-4-ethylhexane, 2,3-dimethylheptane, 3,3-diethylpentane, 3,4-dimethylheptane, 4-methyloctane, 2-methyloctane, 2,2,4-trimethylheptane, octane, 3,3-dimethyl-, 2,3-dimethyloctane, 2,3,6-trimethylheptane, 2,7-dimethyloctane, 2,4-dimethyloctane, 2,6-dimethyloctane, 3,6-dimethyloctane, 4-methylnonane, 2,2,6-trimethyloctane, 2-methylnonane, 3-ethyloctane, 3-ethyl-3-methylheptane, 2,5,6-trimethyloctane, or 3-ethylnonane.

Example 11. The mixture of Example 1, wherein the paraffin comprises 2,2,3-trimethylbutane (TMB) and 2,4-dimethylpentane (DMP).

Example 12. The mixture of Example 11, wherein the TMB and the DMP are present at a first ratio (TMB:DMP) of greater than about 10:1.

Example 13. The mixture of Example 12, wherein the first ratio is between about 17:1 and about 31:1.

Example 14. The mixture of Example 1, wherein the paraffin comprises 2,2,3-trimethylbutane (TMB) and 2-methylhexane (MH).

Example 15. The mixture of Example 14, wherein the TMB and the MH are present at a second ratio (TMB:MH) of greater than about 5:1.

Example 16. The mixture of Example 15, wherein the second ratio is between about 6:1 and about 22:1.

Example 17. The mixture of Example 1, wherein the first portion comprises isopentane, 2,3-dimethylbutane, 2-methylpentane, 3-methylpentane, 2,4-dimethylpentane, 2,2,3-dimethylbutane, 2-methylhexane, 3-methylhexane, 2,2,4-trimethylpentane, 2,2,3-trimethylpentane, 2,5-dimethylhexane, 2,4-dimethylhexane, 2,3,4-trimethylpentane, 2,3-dimethylhexane, 2,2,5-trimethylhexane, and 2,2,4-trimethylheptane.

Example 18. The mixture of Example 1, wherein the first portion further comprising hexamethylbenzene.

Example 19. The mixture of Example 18, wherein the hexamethylbenzene is at a fourth concentration between about 0.1 wt % and about 10 wt %.

Example 20. The mixture of Example 19, wherein the fourth concentration is between about 2 wt % and about 5 wt %.

Example 21. The mixture of Example 18, wherein: the first portion further comprises an aromatic comprising at least one of n-butylbenzene, 1-methyl-2-n-propylbenzene, 1,2-dimethyl-4-ethylbenzene, 1-ethyl-3-i-propylbenzene, 1,2-dimethyl-3-ethylbenzene, 1-ethyl-2-i-propylbenzene, pentamethylbenzene, or ethylpentamethyl-benzene, and the aromatic is at a fifth concentration of less than about 1 wt %.

Example 22. The mixture of Example 21, wherein the fifth concentration is less than about 0.1 wt %.

Example 23. The mixture of Example 1, further comprising an average molecular weight between about 85 and about 120.

Example 24. The mixture of Example 23, wherein the average molecular weight is between about 93 and about 113.

Example 25. The mixture of Example 1, further comprising a specific gravity between about 0.6 and about 0.8.

Example 26. The mixture of Example 25, wherein the specific gravity is between about 0.65 and about 0.75.

High Octane Gasoline Examples

Example 1. A mixture comprising: a first portion comprising at least one of a paraffin or a naphthene having between 5 carbons and 9 carbons, inclusive, at a first concentration between about 98 wt % and about 99.999 wt %; and a second portion comprising hydrocarbons having greater than 9 carbons at a second concentration of less than 0.05 wt %.

Example 2. The mixture of Example 1, wherein the first concentration is between about 99 wt % and about 99.99 wt %.

Example 3. The mixture of Example 1, wherein the second concentration is between about 0.0001 wt % and about 0.05 wt %.

Example 4. The mixture of Example 1, wherein the naphthene comprises a cyclopentane.

Example 5. The mixture of Example 4, wherein the cyclopentane is methylated.

Example 6. The mixture of Example 7, wherein the cyclopentane comprises at least one of methylcyclopentane, cyclohexane, 1t,3-dimethylcyclopentane, 1c,3-dimethylcyclopentane, methylcyclohexane, or 1,1,3-trimethylcyclopentane.

Example 7. The mixture of Example 1, wherein the naphthene is present at a third concentration of less than about 1 wt %.

Example 8. The mixture of Example 1, wherein the paraffin comprises an iso-paraffin at a fourth concentration between about 95 wt % and about 99.9 wt %.

Example 9. The mixture of Example 8, wherein the fourth concentration is between about 98 wt % and about 99 wt %.

Example 10. The mixture of Example 8, wherein the iso-paraffin comprises at least one of i-pentane, 2,2-dimethylbutane, 2,3-dimethylbutane, 2-methylpentane, 3-methylpentane, 2,4-dimethylpentane, 2,2,3-trimethylbutane, 3,3-dimethylpentane, 2-methylhexane, 3-methylhexane, 3-ethylpentane, 2,2,4-trimethylpentane, 2,2,3-trimethylpentane, 2,5-dimethylhexane, 2,4-dimethylhexane, 2,3,4-trimethylpentane, 2,3-dimethylhexane, or 2,2,5-trimethylhexane.

Example 11. The mixture of Example 1, wherein the paraffin comprises 2,2,3-trimethylbutane (TMB) and 2,4-dimethylpentane (DMP).

Example 12. The mixture of Example 11, wherein the TMB and the DMP are present at a first ratio (TMB:DMP) of greater than about 8:1.

Example 13. The mixture of Example 12, wherein the first ratio is between about 10:1 and about 15:1.

Example 14. The mixture of Example 1, wherein the paraffin comprises 2,2,3-trimethylbutane (TMB) and 2-methylhexane (MH).

Example 15. The mixture of Example 14, wherein the TMB and the MH are present at a second ratio (TMB:MH) of greater than about 15:1.

Example 16. The mixture of Example 15, wherein the second ratio is between about 20:1 and about 35:1.

Example 17. The mixture of Example 1, wherein the first portion further comprises a normal paraffin comprising at least one of n-pentane, n-hexane, or n-heptane.

Example 18. The mixture of Example 17, wherein the normal paraffin is present at a fifth concentration of less than about 0.5 wt %.

Example 19. The mixture of Example 18, wherein the fifth concentration is between about 0.01 wt % and about 0.5 wt %.

Example 20. The mixture of Example 1, further comprising a research octane number between about 95 and about 112.

Example 21. The mixture of Example 1, further comprising a motor octane number between about 85 and about 100.

Example 23. The mixture of Example 1, further comprising an average molecular weight between about 80 and about 110.

Example 24. The mixture of Example 23, wherein the average molecular weight is between about 95 and about 105.

Jet Fuel Examples

Example 1. A mixture comprising: at least one of a paraffin or a naphthene at a first concentration between about 80 wt % and about 90 wt %; at least one of an olefin or an aromatic at a second concentration between about 5 wt % and about 15 wt %, and the mixture is substantially free of 2,2,3-trimethylbutane.

2. The mixture of Example 1, wherein the naphthene is at a third concentration between about 55 wt % and about 65 wt %.

3. The mixture of Example 1, wherein the paraffin comprises an iso-paraffin at a fourth concentration between about 20 wt % and about 30 wt %.

4. The mixture of Example 1, further comprising an average molecular weight between about 120 and about 160.

5. The mixture of Example 1, further comprising a specific gravity between about 0.65 and about 0.85.

Catalyst Examples

Example 1. A composition comprising: a BEA catalyst, copper and nickel, wherein: the nickel is present at a concentration between greater than 0 wt % and about 2.0 wt %.

Example 2. The composition of Example 1 further comprising zinc.

Example 3. The composition of Example 1, wherein the nickel is present in at least one of an ionic form and in a metallic form.

Example 4. The composition of Example 2, wherein the zinc is present in at least one of an ionic form or a metallic form.

Example 5. The composition of Example 1, wherein the copper is present in at least one of an ionic form and in a metallic form.

Example 6. The composition of Example 2, wherein the copper is present as at least one of CuNi or CuZn.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A crude mixture comprising:
   a first portion at a first concentration between about 75 wt % and about 99 wt % comprising at least one of a paraffin having between 5 carbons and 13 carbons, inclusively, or a napthene; and
   a second portion comprising hydrocarbons having greater than 13 carbons at a second concentration of less than 0.05 wt % wherein,
   the paraffin comprises an iso-paraffin, and
   the iso-paraffin comprises 2,2,3-trimethylbutane (TNB) and 2,4-dimethylpentane (DMP).

2. The crude mixture of claim 1, wherein the first concentration is between about 83 wt % and about 97 wt %.

3. The crude mixture of claim 1, wherein the second concentration is between about 0.0001 wt % and about 0.05 wt %.

4. The crude mixture of claim 1, wherein the naphthene comprises at least one of a cyclopentane or a cyclohexane.

5. The crude mixture of claim 4, wherein at least one of the cyclopentane or the cyclohexane is methylated.

6. The crude mixture of claim 5, wherein the cyclopentane comprises at least one of methylcyclopentane, 1t,3-dimethylcyclopentane, 1c,3-dimethylcyclopentane, methylcyclohexane, 1,1,3-trimethylcyclopentane, ethylcyclopentane, 1c,2t,4-trimethylcyclopentane, 1,3-dimethyl-t-cyclohexane, 1-methyl-2-propyl-cyclopentane, i-butylcyclopentane, or 3c-ethylmethylcyclopentane.

7. The crude mixture of claim 5, wherein the cyclohexane comprises at least one of 1,3-dimethyl-t-cyclohexane, 3c-ethylmethylcyclopentane, 1t,2-dimethylcyclohexane, 1c,4-dimethylcyclohexane, 1c,2-dimethylcyclohexane, 1,1,4-trimethylcyclohexane, 1c,3c,5-trimethylcyclohexane, 1-ethyl-4-methyl-trans-cyclohexane, 1,1,2-trimethylcyclohexane, 1-ethyl-4-t-methylcyclohexane, 1,2,3,5-c-tetramethylcyclohexane, propylcyclohexane, 1t-methyl-2-n-propylcyclohexane, or sec-butylcyclohexane.

8. The crude mixture of claim 1, wherein the iso-paraffin is at a third concentration between about 60 wt % and about 99 wt %.

9. The crude mixture of claim 8, wherein the third concentration is between about 64 wt % and about 96 wt %.

10. The crude mixture of claim 1, wherein the iso-paraffin further comprises at least one of i-pentane, 2,3-dimethylbutane, 2-methylpentane, 3-methylpentane, 2,4-dimethylpentane, 3,3-dimethylpentane, 2-methylhexane, 3-methylhexane, 3-ethylpentane, 2,2,4-trimethylpentane, 2,2-dimethylhexane, 2,2,3-trimethylpentane, 2,5-dimethylhexane, 2,4-dimethylhexane, 3,3-dimethylhexane, 2,3,4-trimethylpentane, 2,3-dimethylhexane, 2-methylheptane, 4-methylheptane, 3,4-dimethylhexane, 3-methylheptane, 2,2,5-trimethylhexane, 2,3,5-trimethylhexane, 2,4-dimethylheptane, 2,2,3-trimethylhexane, 2,6-dimethylheptane, 2,5-dimethylheptane, 2-methyl-4-ethylhexane, 2,3-dimethylheptane, 3,3-diethylpentane, 3,4-dimethylheptane, 4-methyloctane, 2-methyloctane, 2,2,4-trimethylheptane, octane, 3,3-dimethyl-, 2,3-dimethyloctane, 2,3,6-trimethylheptane, 2,7-dimethyloctane, 2,4-dimethyloctane, 2,6-dimethyloctane, 3,6-dimethyloctane, 4-methylnonane, 2,2,6-trimethyloctane, 2-methylnonane, 3-ethyloctane, 3-ethyl-3-methylheptane, 2,5,6-trimethyloctane, or 3-ethylnonane.

11. The ese mixture of claim 1, wherein the paraffin comprises 2,2,3-trimethylbutane (TMB) and 2,4-dimethylpentane (DMP).

12. The crude mixture of claim 1, wherein the TMB and the DMP are present at a first ratio (TMB:DMP) of greater than about 10:1.

13. The crude mixture of claim 12, wherein the first ratio is between about 17:1 and about 31:1.

14. The crude mixture of claim 1, wherein the iso-paraffin further comprises 2-methylhexane (MH).

15. The crude mixture of claim 14, wherein the TMB and the MH are present at a second ratio (TMB:MH) of greater than about 5:1.

16. The crude mixture of claim 15, wherein the second ratio is between about 6:1 and about 22:1.

17. The crude mixture of claim 1, wherein the first portion comprises at least one of isopentane, 2,3-dimethylbutane, 2-methylpentane, 3-methylpentane, 2,4-dimethylpentane, 2,2,3-dimethylbutane, 2-methylhexane, 3-methylhexane, 2,2,4-trimethylpentane, 2,2,3-trimethylpentane, 2,5-dimethylhexane, 2,4-dimethylhexane, 2,3,4-trimethylpentane, 2,3-dimethylhexane, 2,2,5-trimethylhexane, or 2,2,4-trimethylheptane.

* * * * *